US010275440B2

(12) United States Patent
Srinivasan et al.

(10) Patent No.: US 10,275,440 B2
(45) Date of Patent: Apr. 30, 2019

(54) SETUP DATA EXTRACTION FOR DEPLOYING A SOLUTION PACKAGE

(71) Applicant: Microsoft Technology Licensing, LLC, Redmond, WA (US)

(72) Inventors: Sridhar Srinivasan, Sammamish, WA (US); Muhammad Shahzad Alam, Bellevue, WA (US); Arijit Basu, Bellevue, WA (US); Satish J. Thomas, Sammamish, WA (US); Jared T. Lambert, Seattle, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 177 days.

(21) Appl. No.: 14/659,052

(22) Filed: Mar. 16, 2015

(65) Prior Publication Data

US 2016/0275064 A1     Sep. 22, 2016

(51) Int. Cl.
| | | |
|---|---|---|
| *G06F 9/44* | (2018.01) | |
| *G06F 17/24* | (2006.01) | |
| *G06F 7/24* | (2006.01) | |
| *G06Q 10/06* | (2012.01) | |
| *G06F 8/61* | (2018.01) | |

(52) U.S. Cl.
CPC ............. *G06F 17/245* (2013.01); *G06F 7/24* (2013.01); *G06Q 10/06* (2013.01); *G06F 8/63* (2013.01); *Y04S 10/54* (2013.01)

(58) Field of Classification Search
None
See application file for complete search history.

(56) References Cited

U.S. PATENT DOCUMENTS

| | | | |
|---|---|---|---|
| 7,120,896 B2 | 10/2006 | Budhiraja et al. | |
| 7,497,370 B2 | 3/2009 | Allen et al. | |
| 7,533,380 B2 | 5/2009 | Neuer et al. | |
| 7,770,151 B2 | 8/2010 | Sanjar et al. | |
| 7,774,772 B2 * | 8/2010 | Tal ........................... | G06F 8/65 717/172 |
| 7,908,589 B2 | 3/2011 | Sattler et al. | |
| 8,010,504 B2 | 8/2011 | Ashok et al. | |
| 8,108,854 B1 * | 1/2012 | Wiggins .................... | G06F 8/20 717/136 |
| 8,141,038 B2 | 3/2012 | O'Connell et al. | |
| 8,166,457 B2 | 4/2012 | Roth et al. | |

(Continued)

OTHER PUBLICATIONS

Final Office Action for U.S. Appl. No. 14/659,313 dated Sep. 8, 2016, 24 pages.

(Continued)

*Primary Examiner* — Matthew J Brophy
(74) *Attorney, Agent, or Firm* — Christopher R. Christenson; Kelly, Holt & Christenson, PLLC

(57) ABSTRACT

A user interaction is detected that identifies an environment from which data is to be pulled for deployment in a solution represented by a solution package. Setup data is automatically extracted from an instance of an application that is to be replaced by the solution. An editable representation of the setup data is displayed for user configuration or modification. Application data is then extracted from the instance of the application according to the setup data, including any user modifications represented in the editable representation.

20 Claims, 46 Drawing Sheets

(56) References Cited

U.S. PATENT DOCUMENTS

| | | | |
|---|---|---|---|
| 8,261,295 B1* | 9/2012 | Risbood | G06F 9/44505 719/328 |
| 8,321,843 B2* | 11/2012 | Lanner | G06F 9/44505 717/121 |
| 8,335,773 B2* | 12/2012 | Balko | G06F 8/71 707/694 |
| 8,370,830 B2 | 2/2013 | Jimenez-Salgado et al. | |
| 8,418,140 B2* | 4/2013 | Iyer | G06F 8/65 717/121 |
| 8,418,165 B2 | 4/2013 | Hoff et al. | |
| 8,726,272 B2* | 5/2014 | Williams | G06F 8/65 717/173 |
| 8,904,341 B2 | 12/2014 | Edwards et al. | |
| 8,978,006 B2* | 3/2015 | Hirsch | G06F 8/71 717/107 |
| 9,043,355 B1* | 5/2015 | Kapoor | G06F 9/4443 707/769 |
| 9,292,709 B1 | 3/2016 | Hundt | |
| 9,684,802 B2* | 6/2017 | Srinivasan | H04W 4/21 |
| 2003/0084438 A1* | 5/2003 | Konas | G06F 8/65 717/175 |
| 2003/0149608 A1 | 8/2003 | Kall et al. | |
| 2004/0117358 A1 | 6/2004 | von Kaenel et al. | |
| 2005/0010919 A1* | 1/2005 | Ramanathan | G06F 8/61 717/174 |
| 2005/0021348 A1 | 1/2005 | Chan et al. | |
| 2005/0289536 A1 | 12/2005 | Nayak et al. | |
| 2006/0015839 A1* | 1/2006 | Owens | G06F 8/20 717/100 |
| 2006/0230383 A1 | 10/2006 | Moulckers et al. | |
| 2006/0230389 A1 | 10/2006 | Moulckers et al. | |
| 2007/0006278 A1 | 1/2007 | Ioan Avram et al. | |
| 2007/0168209 A1 | 7/2007 | Shah | |
| 2007/0256056 A1* | 11/2007 | Stern | G06F 8/63 717/121 |
| 2008/0183514 A1 | 7/2008 | Moulckers et al. | |
| 2008/0243912 A1 | 10/2008 | Azvine et al. | |
| 2008/0312992 A1 | 12/2008 | Hoshi et al. | |
| 2009/0043778 A1 | 2/2009 | Jambunathan et al. | |
| 2009/0094074 A1 | 4/2009 | Nikovski et al. | |
| 2009/0144729 A1 | 6/2009 | Guizar | |
| 2009/0178034 A1* | 7/2009 | Stern | G06F 9/44505 717/174 |
| 2009/0205013 A1 | 8/2009 | Lowes | |
| 2010/0023934 A1 | 1/2010 | Sheehan et al. | |
| 2010/0042659 A1* | 2/2010 | Rose | G06F 8/36 717/174 |
| 2010/0180270 A1* | 7/2010 | Williams | G06F 8/65 717/168 |
| 2010/0299653 A1* | 11/2010 | Iyer | G06F 8/65 717/121 |
| 2010/0306735 A1* | 12/2010 | Hoff | G06F 8/61 717/109 |
| 2010/0333083 A1 | 12/2010 | Chancey et al. | |
| 2011/0066562 A1 | 3/2011 | Stapleton et al. | |
| 2011/0270721 A1 | 11/2011 | Kusterer | |
| 2011/0296377 A1 | 12/2011 | Morozov et al. | |
| 2012/0030067 A1 | 2/2012 | Pothukuchi et al. | |
| 2012/0047048 A1 | 2/2012 | Mueller et al. | |
| 2012/0096521 A1 | 4/2012 | Peddada | |
| 2012/0102360 A1 | 4/2012 | Kemmler et al. | |
| 2012/0173717 A1 | 7/2012 | Kohli | |
| 2012/0254431 A1 | 10/2012 | Kylau et al. | |
| 2012/0260233 A1 | 10/2012 | Bandyopadhyay et al. | |
| 2012/0284703 A1 | 11/2012 | Hoff et al. | |
| 2012/0296687 A1 | 11/2012 | Satyanarayana et al. | |
| 2012/0324069 A1 | 12/2012 | Nori et al. | |
| 2013/0055231 A1 | 2/2013 | Hyndman et al. | |
| 2013/0097096 A1 | 4/2013 | Mercer et al. | |
| 2013/0104046 A1 | 4/2013 | Casco-Arias Sanchez et al. | |
| 2013/0139164 A1 | 5/2013 | Balko | |
| 2013/0166596 A1 | 6/2013 | Stumpf et al. | |
| 2013/0167121 A1 | 6/2013 | Hoff | |
| 2013/0212707 A1 | 8/2013 | Donahue et al. | |
| 2013/0226670 A1 | 8/2013 | Hernandez et al. | |
| 2013/0232464 A1 | 9/2013 | Jacquin et al. | |
| 2013/0305244 A1 | 11/2013 | Pohlmann et al. | |
| 2013/0339254 A1 | 12/2013 | Figlin et al. | |
| 2014/0006306 A1 | 1/2014 | Koshy | |
| 2014/0013315 A1 | 1/2014 | Genevski et al. | |
| 2014/0025411 A1 | 1/2014 | Chee et al. | |
| 2014/0095400 A1 | 4/2014 | Jackson et al. | |
| 2014/0109062 A1 | 4/2014 | Mahamuni | |
| 2014/0282496 A1* | 9/2014 | Schwaninger | G06F 8/60 717/178 |
| 2015/0370576 A1* | 12/2015 | Wynn | G06F 11/3055 713/2 |
| 2016/0179956 A1* | 6/2016 | Sogani | G06F 17/30864 707/722 |
| 2016/0274885 A1* | 9/2016 | Srinivasan | G06F 8/65 |
| 2016/0274906 A1* | 9/2016 | Srinivasan | G06F 8/71 |
| 2016/0275299 A1* | 9/2016 | Srinivasan | H04W 4/21 |
| 2017/0109104 A1* | 4/2017 | Dahlberg | G06F 8/654 |

OTHER PUBLICATIONS

Non-Final Office Action for U.S. Appl. No. 14/659,333 dated Sep. 12, 2016, 24 pages.

Final Office Action for U.S. Appl. No. 14/659,190 dated Sep. 12, 2016, 29 pages.

"Configuring Hierarchy Types", Retrieved on: Jan. 23, 2015, Available at: http://help.sap.com/erp_mdg_addon70/helpdata/en/95/3f80170381493abe2f465b18169ba4/frameset.htm.

Francescomarino, et al. "Reverse Engineering of Business Processes exposed as Web Applications", In Proceedings of 13th European Conference on Software Maintenance and Reengineering, Mar. 24, 2009, pp. 139-148.

Weber, et al., "Towards a Methodology for Semantic Business Process Modeling and Configuration", In Proceedings of International Workshops on Service-Oriented Computing, Sep. 17, 2007, 13 pages.

"Microsoft Dynamics AX Features", Published on: Aug. 2, 2010, Available at: http://www.ignify.com/microsoft_dynamics_ax_features.asp.

"Infor CloudSuite", Retrieved on: Jan. 23, 2015, Available at: http://www.infor.com/cloud/.

"Oracle Accelerate Solutions for Ind. Mfg: Products and Components and Durable Goods", Retrieved on: Jan. 23, 2015, Available at: http://www.oracle.com/ocom/groups/public/@opnpublic/documents/webcontent/023961.pdf.

"SAP Warehouse Management System for Holistic Solution Competence", Published on: Oct. 4, 2013, Available at: http://www.ssi-schaefer.us/logistics-software/sap-solutions.html.

"How to Choose Between Generic and Industry Specific ERP Systems", An Epicor® White Paper, Jan. 23, 2015, 4 pages.

"Host Your Own Gallery", Published on: Jul. 2, 2014, Available at: http://www.alteryx.com/products/alteryx-server.

"How to: Deploy, Publish, and Upgrade SharePoint Solutions on a Remote Server", Published on: Sep. 26, 2012, Available at: https://msdn.microsoft.com/en-us/library/hh370987.aspx.

Osgaard, Jesper, "Connecting Dynamics Marketing to Dynamics CRM—Let the Sync Begin", Published on: Jul. 2, 2014, Available at: http://blogs.technet.com/b/lystavlen/archive/2014/07/02/connecting-dynamics-marketing-to-dynamics-crm.aspx.

Channabasavaiah, et al., "A Solution Model for Integrating BPM and Package Solutions", Published on: Dec. 14, 2011, Available at: http://www.ibm.com/developerworks/websphere/bpmjournal/1112_channa/1112_channa.html.

"Servicing Manufacturers' Needs in a Changing World", Published on: Dec. 1, 2014, Available at: http://www.worksmanagement.co.uk/Information-Technology/features/servicing-manufacturers-needs-in-a-changing-world/66256/.

"Industry and Cross Industry Solutions", Retrirved on: Jan. 23, 2015, Available at: http://americas.nttdata.com/Services/Services/Enterprise-Application-Services/SAP-Services/SAP-Offerings/Industry-and-Cross-Industry-Solutions.aspx.

(56) References Cited

OTHER PUBLICATIONS

"SAP Rapid Deployment Solutions", Published on: Sep. 10, 2013, Available at: https://websmp102.sap-ag.de/public/rds.
Krigsman, Michael, "Introducing Packaged Solutions", In White Paper, Jan. 2011, 13 pages.
Galbusera, et al., "Definition and Deployment of a Verification and Validation Package in Complex Industrial Environments", In Proceedings of International ICE Conference on Engineering, Technology and Innovation (ICE), 10 pages.
"Operating and Customizing Field Applications in SAP CRM", Retrieved on: Jan. 27, 2015 Available at: http://www.sdn.sap.com/irj/scn/go/portal/prtroot/docs/library/uuid/092d36fc-0801-0010-91b0-de3d6fe618cc?QuickLink=index&overridelayout=true&5003637273723.
"What's new: Retail features [AX 2012]", Published on: Dec. 18, 2014, Available at: https://technet.microsoft.com/en-us/library/dn527132.aspx.
"Interactive Selling Solutions for Complex Manufacturing", In White Paper of CINCOM, Jan. 2003, 10 pages.
Non-Final Office Action for U.S. Appl. No. 14/659,190 dated Feb. 24, 2016, 26 pages.
Non-Final Office Action for U.S. Appl. No. 14/659,313 dated Feb. 25, 2016, 21 pages.
Amendment for U.S. Appl. No. 14/659,313 dated Jun. 8, 2016, 15 pages.
Amendment for U.S. Appl. No. 14/659,190 dated Jun. 24, 2016, 10 pages.
Non-Final Office Action for U.S. Appl. No. 14/659,313 dated Jun. 16, 2017, 26 pages.
Non-Final Office Action for U.S. Appl. No. 14/659,190, dated May 15, 2017, 28 pages.
Amendment for U.S. Appl. No. 14/659,333 dated Dec. 19, 2016. 13 pages.
Amendment with RCE for U.S. Appl. No. 14/659,313 dated Dec. 8, 2016, 16 pages.
Amendment with RCE for U.S. Appl. No. 14/659,190 dated Dec. 19, 2016, 15 pages.
Notice of Allowance for U.S. Appl. No. 14/659,333 dated Feb. 23, 2017, 16 pages.
Final Office Action for U.S. Appl. No. 14/659,313 dated Dec. 8, 2017, 24 pages.

* cited by examiner

SHARED ASSET LIBRARY

Solution packages — 392
✓Accept  X Reject  [A] Promote
398 — Name  Scope — 400  404  406 Code — 394
✓Accept  Size  Scope
PSA Solution package  Pending: Public  Name
PSA Solution mine  Just me  Invoice  23 KB  Pending: Organization
Some other solution  Organization  PSA Solution  22 MB  Just me Configuration — 396
+ X  ✓Accept  X Reject  [A] Promote
Name  Scope
Demo Template  Pending: Public
PSA Solution  Just me ?  J. Doe

430 Create a new package
Enter the details below to get started

432 Name
Some package name

434 Internal description
Description here...

Methodology
Methodology identiifer ← 436

438 Industry

440 Release version
AB 2012 R3 RTM

442 Country
USA

444 Create    Cancel

☺  ?  J. Doe

FIG. 3F

Lifestyle Service > ACME Demo V1

↓ Create Configuration

1  Storage settings
   Decide how and where you want to store your data

2  Discover environment metadata
   Pull the configuration metadata from a running AB instance 3  Select data
   Setup a new environment based on this configuration 4  Data summary
   Review the data you are pulling before starting the operation 5  Process Data
   Pull the data from an AB environment for later use Data scope DATA TEMPLATE DETAILS
You an modify the data attributes and review the list of entities we pull by reviewing the spreadsheet below.

Entity list
2/26/2014 — 636
↑ Upload new version — 642

COMPANY SELECTION
We've found configuration in the following companies to export from ACME Demo V1, please review which company to transfer data from.
Company
ACME ▼ Download
☐ Partition number 1
☐ Company A
☐ Company B
☐ Partition number 2

PSA Jumpstart template ← 694

Groups

| Type | Process | Module |
|---|---|---|
| Group | Complete | |
| Master | 23% | |
| Transaction | 100% | ✓ |
| Parameter | 0% | |
| Setup | 0% | |
| Misc | 0% | |

| Required | | Preset | | |
|---|---|---|---|---|
| ⌄Download ⌃Upload ✓Complete ✓Approved | | | | |
| ENTITY | TYPE | VALIDATED BY | MODULE | STATUS |
| Customer | Reference | J. Deer | Finance | Not started |
| Bank Accounts | Transaction | | Acct. Rec. | |
| Items | Master | J. Deer | Human Resources | In-progress |
| Customer | Reference | J. Deer | Finance | Complete |
| Bank Accounts | Transaction | | Acct. Rec. | Approved |
| Items | Master | J. Deer | Human Resources | |
| ... | | | | |

☺ ? J. Doe

Deploy environment — High Availability (Private beta) v9

Environment name: Acme
Estimation: PR1    Advanced settings

| VIRTUAL MACHINE | INSTANCES | SIZE |
|---|---|---|
| Database server | 2 | A7 |
| AOS Server | 8 | A4 (Standard tier) |
| Business Intelligence server | 0 | A4 (Standard tier) |
| Client | 2 | A4 (Standard tier) |
| Enterprise Portal Server | 2 | A4 (Standard tier) |
| Domain server | 3 | A4 (Standard tier) |
| Remote Desktop Service | 0 | A4 (Standard tier) |

Total deployments:
2 x A7.
12 x A4 (Standard tier)
2 x A2 (Standard tier)

☐ By selecting this check box, you agree to the pricing and licensing terms below.
Software License Terms    Privacy Terms    Price List

[Deploy now]  [Save for later]  [Cancel]

730, 732, 734, 736, 738

J. Doe

US 10,275,440 B2

SETUP DATA EXTRACTION FOR DEPLOYING A SOLUTION PACKAGE

BACKGROUND

Computer systems are currently in wide use. Some computer systems are deployed by organizations, such as enterprise organizations, in order to assist the organization in performing its operations.

Some computer systems, of this type, can be modified before they are deployed at an end user organization. For instance, some systems are originally manufactured by a manufacturer. They can then be modified by an independent software vendor (ISV) or another developer to obtain a customized system. The customized system can then be sold to an end user organization, where it is even further customized before it is deployed.

At times, the computing system that is deployed at the end user may be replacing an existing solution that the organization is using. In that case, data from the existing system is sometimes entered into the new computing system.

In these types of scenarios, the base computing system manufactured by the computing system manufacturer may be a relatively generic system, that is not specific to any given industry. In order to set up an industry-specific application of the computing system, the end users or developers have often needed to carry out a great deal of configuration and customization of the generic system. Therefore, two different solutions that are generated for the same industry (even though they derive from the same base system), may be completely different, even though they are performing relatively similar functions, because they are both separately customized and configured from the base system. For instance, the operations for customizing the computing systems to that specific industry were repeated for each individual application, often by different people. Therefore, while the end solutions may operate similarly, they may be provided in a very different way.

This can cause in a wide variety of different problems as well. For instance, when the computing system manufacturer generates updates to the base system, applying updates to all the various instances of the customized applications can be difficult, time consuming and error prone because they are all different. This is the case even for two different customized applications in the same industry. Because they were developed and customized by different people, even though they perform relatively similar functions, they are different systems and therefore applying updates to each of them can be difficult as well.

The discussion above is merely provided for general background information and is not intended to be used as an aid in determining the scope of the claimed subject matter.

SUMMARY

A user interaction is detected that identifies an environment from which data is to be pulled for deployment in a solution represented by a solution package. Setup data is automatically extracted from an instance of an application that is to be replaced by the solution. An editable representation of the setup data is displayed for user configuration or modification. Application data is then extracted from the instance of the application according to the setup data, including any user modifications represented in the editable representation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 3C-3H show various examples of user interface displays.

FIGS. 14-20 show various examples of user interface displays that can be generated in creating a data package.

FIGS. 21-28 show various examples of user interface displays that can be generated in preparing a solution package for deployment and deploying it to an end user system.

DETAILED DESCRIPTION

Figure 1:
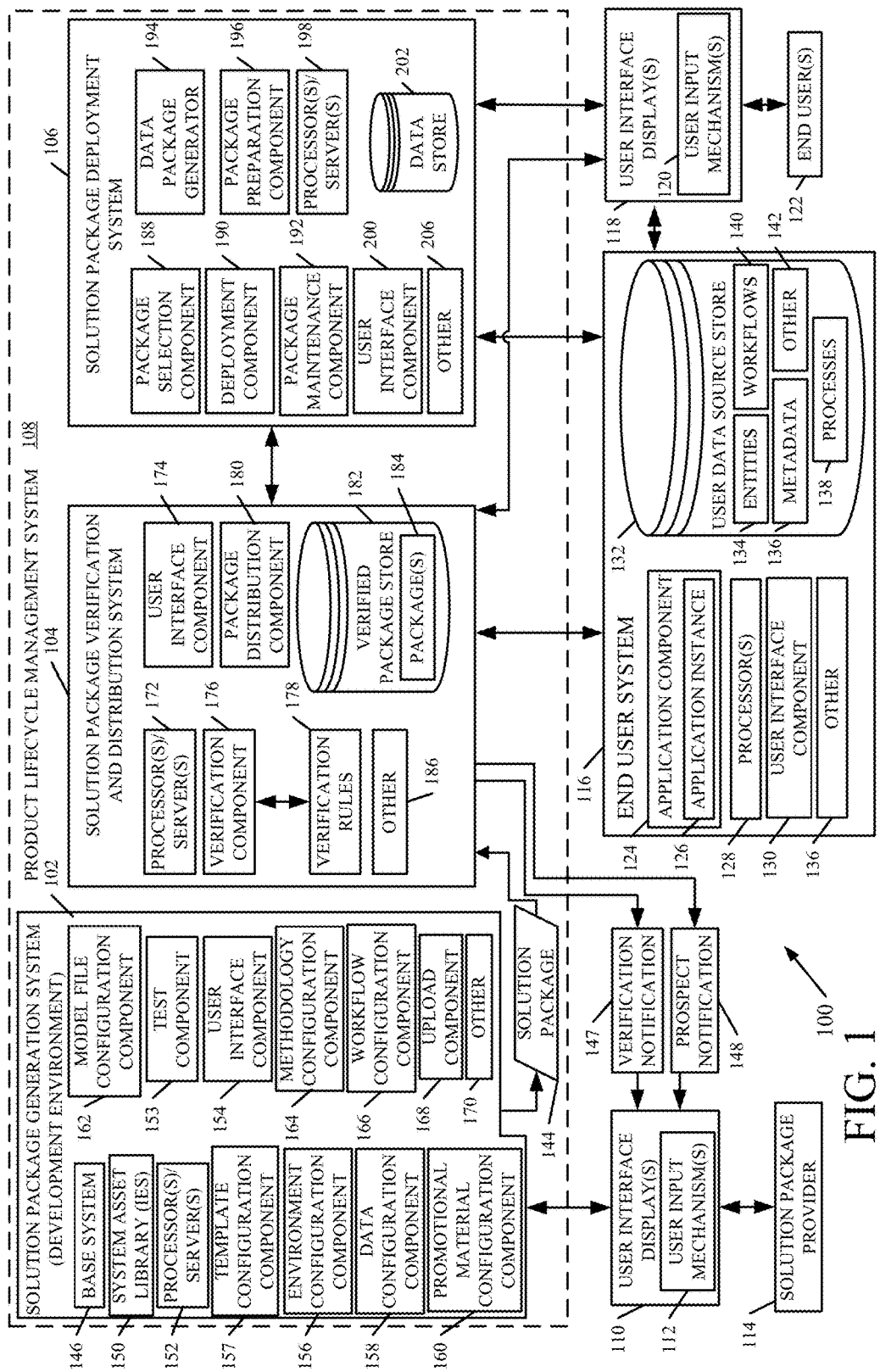
FIG. 1 is a block diagram of one example of a solution package architecture.

FIG. 1 is a block diagram of one example of a solution package architecture 100. In the example shown in FIG. 1, architecture 100 illustratively includes solution package generation system 102 (which can be in a development environment), solution package verification and distribution system 104 and solution package deployment system 106. In one example, systems 102, 104 and 106 can all be within a larger system, such as a product life cycle management system 108. In that case, users can log into or otherwise access product life cycle management system 108 and have access to all of systems 102, 104 and 106. Also, while the present discussion is somewhat directed to development components, that is for the sake of example only. It applies equally well to other areas of life cycle management, such as maintenance, upgrades, testing, release management, etc. In other examples, some or all of systems 102-106 are outside of system 108. All of these architectures are contemplated herein.

The example shown in FIG. 1 shows that solution package generation system 102 illustratively generates user interface displays 110 with user input mechanisms 112 for interaction by a user, such as a solution package provider 114. FIG. 1 also shows that, in one example, solution package verification and distribution system 104 and solution package deployment system 106 can be in communication with an end user system 116. The end user system 116, or systems 104 and 106, or all of them, can illustratively generate user interface displays 118 with user input mechanisms 120 for interaction by one or more end users 122. Although not shown, provider 114 can also illustratively communicate through user interfaces with systems 104 and 106.

Before describing the operation of architecture 100 in more detail, a brief overview will first be provided. It will also be noted that the components of the systems discussed (e.g., the package contents, rules, etc.) can be dynamic and can be continuously updated.

Solution package provider 114 may illustratively generate an industry-specific solution package 144 by customizing a base computing system 146. For instance, the base computing system 146 may be manufactured by a computing system manufacturer. It may be a relatively generic computing system that is meant to be customized for various industries, and for individual end user systems. As an example, the base system 146 may be a system that includes a scheduling system, an inventory management system, an electronic mail system, or a wide variety of other systems. It may be customized for individual industries, such as for the airline industry, the cosmetics industry, the wholesale product distribution industry, etc. The end user organizations in each of the individual industries may need highly similar functionality. Therefore, solution package provider 114 can customize the base system 146 by configuring it to provide that common set of similar functionality.

Once customized in this way, solution package 144 can be provided to solution package verification and distribution system 104. System 104 runs a verification system that verifies that the solution package 144 meets a set of requirements to be exposed to potential users.

After the verification system is run, system 104 provides a verification notification 147 to solution package provider 114. Notification 147 illustratively either indicates that the solution package 144 has been verified, or that it has not been verified, in which case notification 147 provides the reasons that it was not yet verified. Solution package provider 114 can then revise the solution package 144 and resubmit it for verification.

If it is verified, the solution package is exposed to a set of users that can access and review information about the solution package 144. In one example, solution package provider 114 can scope the various portions of solution package 144 so that they can be viewed by users on a restricted basis. For instance, solution package provider 114 may indicate that certain solution packages or certain portions of solution packages can only be reviewed by certain groups (such as people on the same team as solution package provider 114, people within the same organization, based on the roles of individuals in a given organization, or they can be marked as global, publicly available items that can be reviewed by anyone).

When an end user 122 selects one of the solution packages in system 104, system 104 provides a prospect notification 148 to solution package provider 114. Notification 148 illustratively provides contact information for the end user organization (e.g., the prospective user, or prospect) that selected the solution package 144 for deployment at its end user system 116. In that way, solution package provider 114 can contact the end user organization to prepare the solution package for deployment at the end user system 116. In one example, the deployment automatically (e.g., without substantially any other user input other than starting and perhaps verifying) deploys the solution in the prepared solution package in a given environment and enters data from a data package into the solution.

In one example, end users 122 are end users at an organization that uses a given solution or application. For instance, end user system 116 can include application component 124 that runs an application instance 126. It can also include one or more processors or servers 128, a user interface component 130, user source data store 132, and other items 136. User source data store 132 illustratively stores entities 134, metadata 136, processes 138, workflows 140, and it can include other items 142. It will be noted that the entities 134, processes 138, workflows 140, etc., can have their own metadata 136, or the metadata can be stored separately, or both. Entities 134 illustratively represent items within the computing system deployed at end user system 116 (such as within the application instance 126). Therefore, a product entity illustratively represents and describes a product. A vendor entity illustratively represents and describes a vendor, a purchase order entity illustratively defines and describes a purchase order, an electronic mail entity illustratively describes and defines an item of electronic mail, etc. The application component 124 illustratively runs application instance 126 which operates on entities 134 and performs processes 138, workflows 140, etc. The application instance 126 can be an electronic mail application instance, a document management application instance, or a wide variety of other application instances, or combinations of them, that can be deployed at an end user organization (which may be an enterprise organization).

It may happen that the end user organization may wish to deploy a different application instance (or solution) in end user system 116. For instance, the end user organization may be switching to a different solution, upgrading to a different solution, or deploying a new solution. In doing so, the end user organization (such as through end user 122 or another user) can access solution packages that have been generated by solution package provider 114 and that have been verified and exposed to user 122 within solution package verification and distribution system 104. The user can select one of the solution packages and use solution package deployment system 106 to deploy the solution package at end user system 116. In doing so, solution package deployment system 106 illustratively generates user input mechanisms that can be used to prepare a solution package for deployment in a specific end user system 116, and to prepare data packages that extract source data from user source data store 132 so that it can be loaded into the new solution deployed at end user system 116. All of this is described in greater detail below.

Architecture 100, and its various components will now be described in more detail. It will first be noted that although base system 146 is shown as part of solution package generation system 102, that need not necessarily be the case. Instead, it can be stored remotely or separately from system 102, and accessed by system 102. The same is true of other items stored in system 102.

System 102 illustratively includes one or more system asset libraries 150, processors or servers 152, test component 153, user interface component 154, environment configuration component 156, data configuration component 158, promotional material configuration component 160, model file configuration component 162, methodology configuration component 164, workflow configuration component 166, upload component 168, and it can include other items 170 as well.

Solution package verification and distribution system 104 illustratively includes one or more processors or servers 172, user interface component 174, verification component 176, verification rules 178, package distribution component 180, and verified package store 182 which, itself, illustratively includes a set of one or more verified solution packages 184. System 104 can include other items 186 as well.

Solution package deployment system 106 illustratively includes package selection component 188, deployment component 190, package maintenance component 192, data package generator 194, package preparation component 196, one or more processors or servers 198, user interface component 200, data store 202, and it can include other items 206.

It will also be noted that while each system 102-106 includes a user interface component, that need not be the case. Instead, when all of the systems are deployed on a product life cycle management system 108, it may be system 108 that provides the user interface component for all systems. The same thing can be true of the various data stores. That is, system 108 may provide the data stores for all of systems 102-106. Also, there may be a single set of processors or servers for system 108, instead of a different set for each system 102-106. It will be noted that the functionality of each of the items shown in FIG. 1 can be combined in different ways as well.

Referring again to solution package generation system 102, asset libraries 150 illustratively include one or more assets for base system 146. Therefore, solution package provider 114 can use and reuse various assets in order to customize base system 146. Environment configuration component 156 illustratively interacts with base system 146 and generates user interface displays, with user input mechanisms that allow solution package provider 114 to configure an environment for the solution package. Data configuration component 158 allows the user to configure pre-defined data for the solution package 144. For instance, it may be that each individual industry has a set of common data items that are often used in that industry. By way of example, if solution package 144 is for an airline, then the pre-defined data items may include such things as a list of aircraft, characteristics of each aircraft (such as its booking capacity, fuel capacity, range, speed, size, etc., among a wide variety of other things). Component 158 generates user interface displays with user input mechanisms that can be actuated to configure such pre-defined industry-specific data. Promotional material configuration component 160 illustratively allows solution package provider 114 to generate promotional material that can be included in solution package 144. The promotional material can be exposed by system 104 to potential end user organizations. Model file configuration component 162 illustratively allows solution package provider 114 to configure various model files in solution package 144. Methodology configuration component 164 allows solution package provider 114 to configure various methodologies that are used in preparing and deploying solution package 144. Workflow configuration component 166 illustratively generates user interface displays with user input mechanisms that allow solution package provider 114 to configure various workflows within solution package 144. Test component 153 allows provider 114 to test a solution package. Upload component 168 illustratively allows provider 114 to upload solution package 144 to system 104 for verification and distribution to end user systems.

With respect to solution package verification and distribution system 104, verification component 176 illustratively receives solution package 144 and parses it to identify its contents. It can access verification rules 178 to determine whether the contents of solution package 144 meet the various requirements embodied in rules 178, for verification. It will be noted that the verification rules 178 may vary based upon industry, or based upon other things. In addition, in one example, verification rules 178 do not require verification component 176 to access any of the proprietary information in solution package 144, that is proprietary to solution package provider 114. Instead, for instance, it may simply confirm the presence of content, but not the actual content itself. Package distribution component 180 illustratively exposes various parts of verified solution packages 184 that are stored in store 182. It illustratively allows end user organizations to browse through the various packages 184, to select them for potential deployment at their end user systems, among other things.

Solution package deployment system 106 allows either end user 122 or solution package provider 114 to select a given verified solution package 184 for preparation so that it can be deployed on end user system 116. For instance, where end user 122 has identified a solution package that it wishes to deploy on end user system 116, then prospect notification 148 illustratively notifies provider 114 of this. Provider 114 can then select that particular package 184 using package selection component 188 so that it can be prepared for deployment. Package preparation component 196 illustratively generates user interface displays with user input mechanisms that can be actuated by a user (such as user 122, provider 114, or another developer or user) to prepare the selected solution package for deployment. This can include making customized configurations for the particular end user, etc. Data package generator 194 illustratively generates user interface displays that can be actuated by the user to generate a data package. The metadata used by application instance 126 and stored in user source data store 132 is automatically pulled to identify the various entities, workflows, processes, etc. that are used in application instance 126. It presents that to the user for confirmation or modification, and then automatically pulls the user's data (e.g., from data store 132). It presents that data to the user for confirmation or modification as well. Deployment component 190 deploys the finally configured solution package to end user system 116. It then uses the data packages generated by generator 194 to import the customer's data into the deployed solution. Package maintenance component 192 illustratively generates user interface displays with user input mechanisms that allow a user to perform maintenance on the solution package.

Figure 2A:
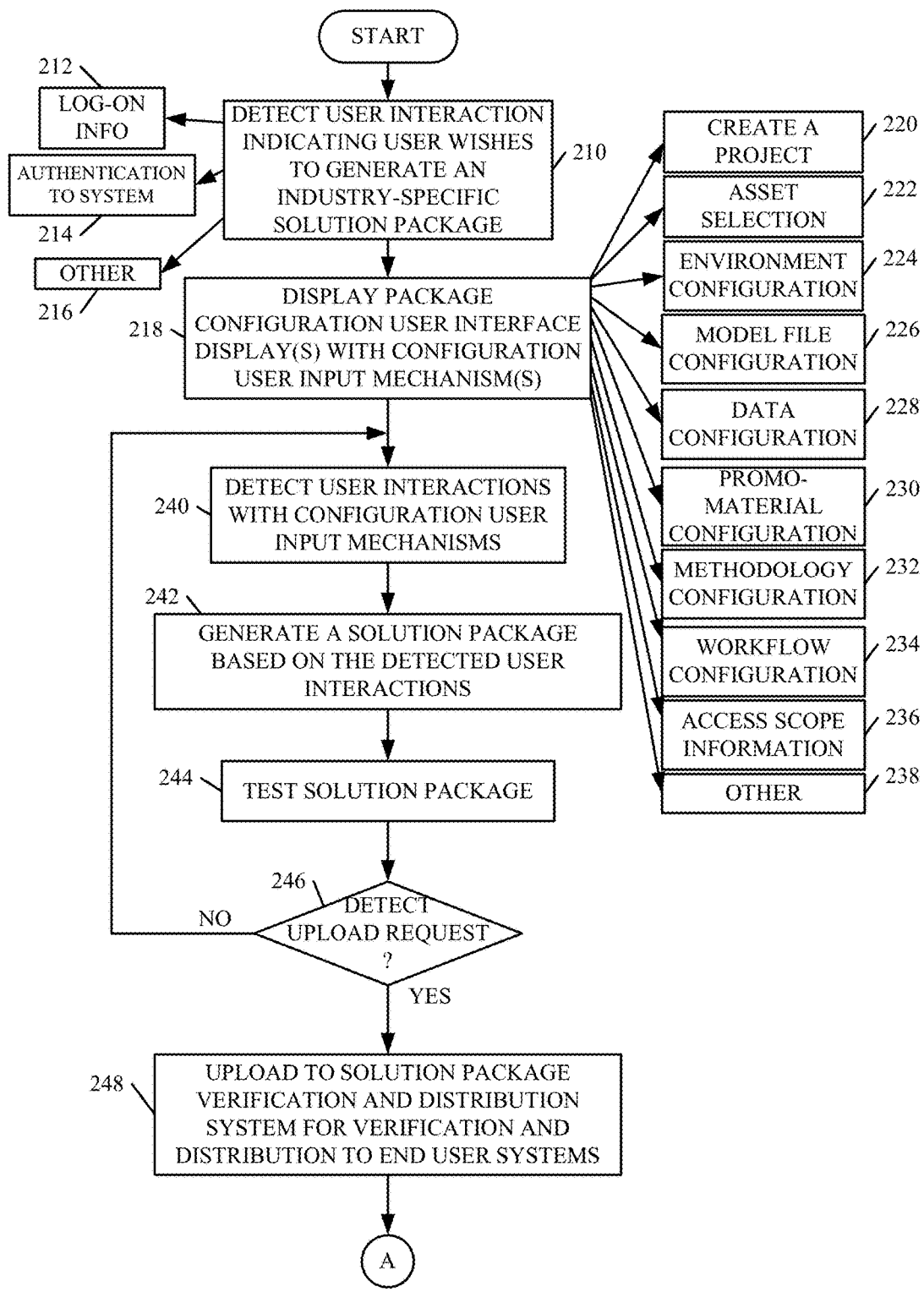
FIGS. 2A and 2B (collectively referred to herein as FIG. 2) show one example of a flow diagram illustrating the overall operation of the solution package generation system shown in FIG. 1.
Figure 2B:
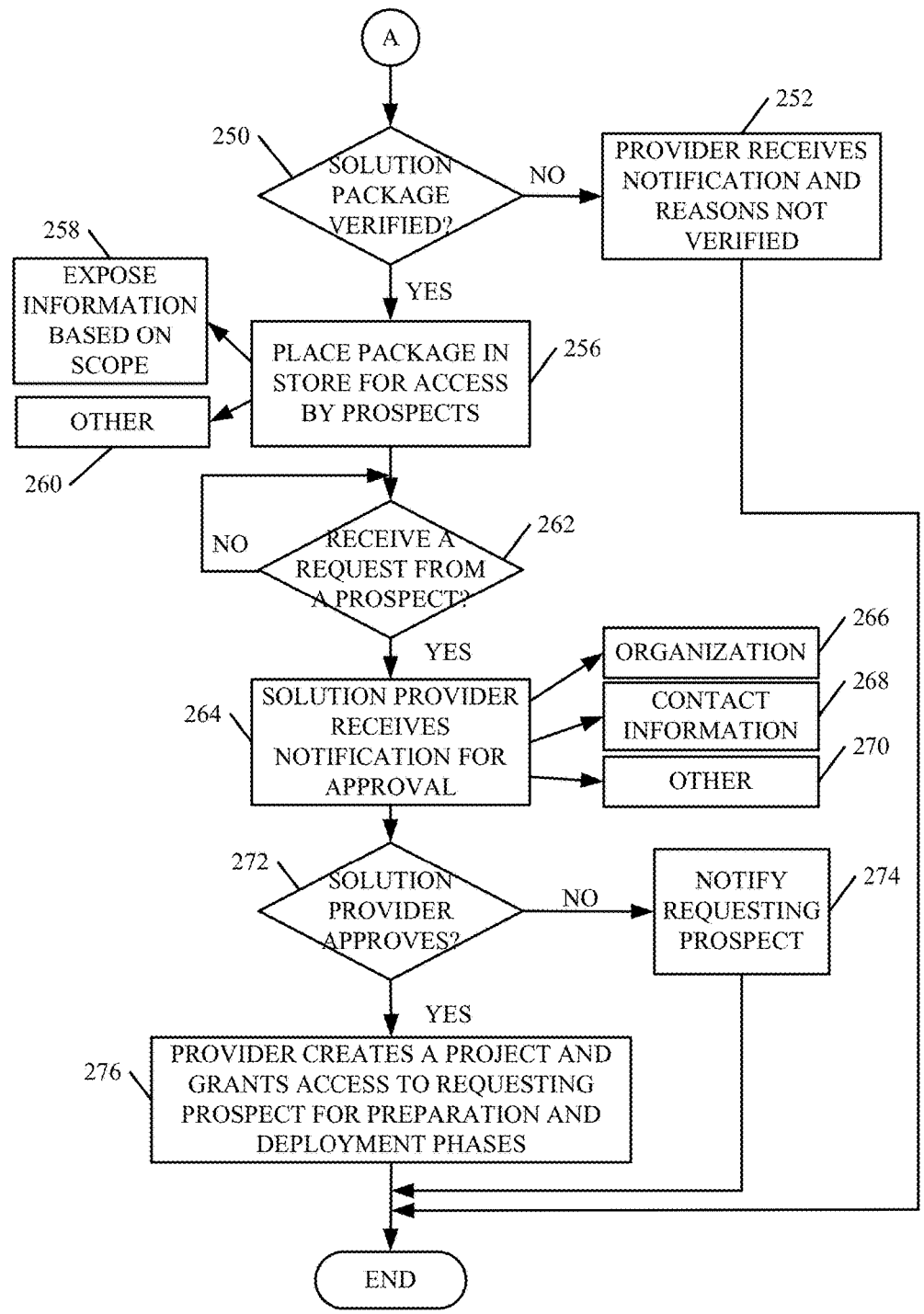

FIGS. 2A-2B (collectively referred to herein as FIG. 2) show a flow diagram illustrating one example of how solution package 144 can be generated, verified and selected by an end user organization for deployment. Solution package generation system 102 first detects user interaction by provider 114 indicating that provider 114 wishes to generate an industry-specific solution package. This is indicated by block 210 in FIG. 2. For instance, provider 114 can log on to system 108 or system 102, as indicated by block 212. Provider 114 can authenticate to the system as indicated by block 214, or provide an input indicating that the user wishes to generate a solution package in other ways, and this is indicated by block 216.

The various components in system 102 then display package configuration user interface displays with configuration user input mechanisms that allow provider 114 to customize the base system 146 (or otherwise pre-configure it for a specific industry). This is indicated by block 218 in FIG. 2. For instance, the user input mechanisms can be actuated to create a project 220 within the development environment of system 102. They can be actuated to perform asset selection selecting assets from various libraries 150. This is indicated by block 222. They can be used to perform environment configuration to configure an environment as indicated by 224. They can be used to configure or select model files for inclusion in solution package 144. This is indicated by block 226. They can be used to perform various data configuration operations to configure or define data within solution package 144. This is indicated by block 228. They can be used to generate promotional material or configure pre-existing material for inclusion in package 144. This is indicated by block 230. They can be used to configure methodology as indicated by block 232, workflows as indicated block 234, set various scopes on the items in solution package 144 to restrict who can see them, as indicated by block 236, or to perform other configurations as indicated by block 238.

The various components within system 102 then detect user interactions with the configuration user input mechanisms. This is indicated by block 240. System 102 then generates a solution package based upon the detected user interactions. This is indicated by block 242. The provider 114 can then use test component 153 to test the solution package to ensure that it works the way provider 114 wishes. This is indicated by block 244. This continues, as indicated by block 256 until upload component 168 detects an upload request from provider 114.

At this point, this indicates that provider 114 has configured solution package 144 to be a customized version of base system 146. It is customized to a pre-configured industry-specific customization so that it can be prepared and deployed at an end user system 116 in that particular industry. Solution package 144 can illustratively be re-used by multiple different organizations in that industry. This can significantly enhance the operation of those systems in uptaking updates, in performing upgrades, or in performing a wide variety of maintenance or operational tasks on the deployed solutions. This is because the solution package used by all of them is common.

When upload component 168 detects an upload request, then it uploads solution package 144 to solution package verification and distribution system 104. This is indicated by block 248. Verification component 176 then verifies the solution package 144 to determine whether it meets the requirements of being exposed to potential users in verified package store 182. This is indicated by block 250. If it is not verified, then verification component 176 provides verification notification 147 to provider 114 indicating that it has not been verified, and also indicating the reasons that it has not been verified. This is indicated by block 252.

However, if package 144 is verified, then verification component 176 also sends verification notification 147 to provider 114, but this time it indicates that the solution package has been verified. It then places the verified solution package in verified package store 182 where it appears as a verified package 184 and where it can be accessed through distribution component 180 by various end user organizations. This is indicated by block 256. In doing so, system 104 illustratively exposes the information in the verified package based on the scope set by provider 114. This is indicated by block 258. For instance, it may be that provider 114 has set a scope on certain portions of the information in package 144 indicating that those portions are only to be exposed to members of his or her own organization, his or her own team, certain roles within end user organizations, etc. Provider 114 may have set the scope on other information indicating that it is globally available or limited in other ways. System 104 can perform other operations in making the verified package available as well, and this is indicated by block 260.

At some point, users at an end user organization (such as user 122, a developer, etc.), will illustratively browse the packages 184 in system 104 looking for a new solution to deploy. When the user finds one, they can select it and package distribution component 180 then initiates a prospect notification 148 to provider 114. This is indicated by blocks 262 and 264 in FIG. 2. Notification 148 may include an identity of the organization that has indicated interest in the solution package. This is indicated by block 366. It may provide contact information 168, and other information 270 as well. In one example, the notification 148 illustratively gives provider 114 a user input mechanism that can be actuated to approve the potential prospect. Approving the prospect may allow them to view additional material in the solution package, or may provide a notification to the end user that provider 114 wishes to contact them. Determining whether provider 114 approves the request by the prospect as indicated by block 272. If not, a notification is sent to the prospect indicating that their request to view additional material in the package has been declined. However, if provider 114 does approve the prospect's request, then provider 114 can use solution package deployment system 106 to create a project and grant access to that project to the prospect (or end user) so that the selected solution package can be prepared and deployed in the end user system 116. This is indicated by block 276.

Before proceeding with a discussion of how the solution package is prepared and deployed at system 106, a more detailed description of how it is generated, verified, and reviewed and selected by end users will first be provided.

Figure 3A:
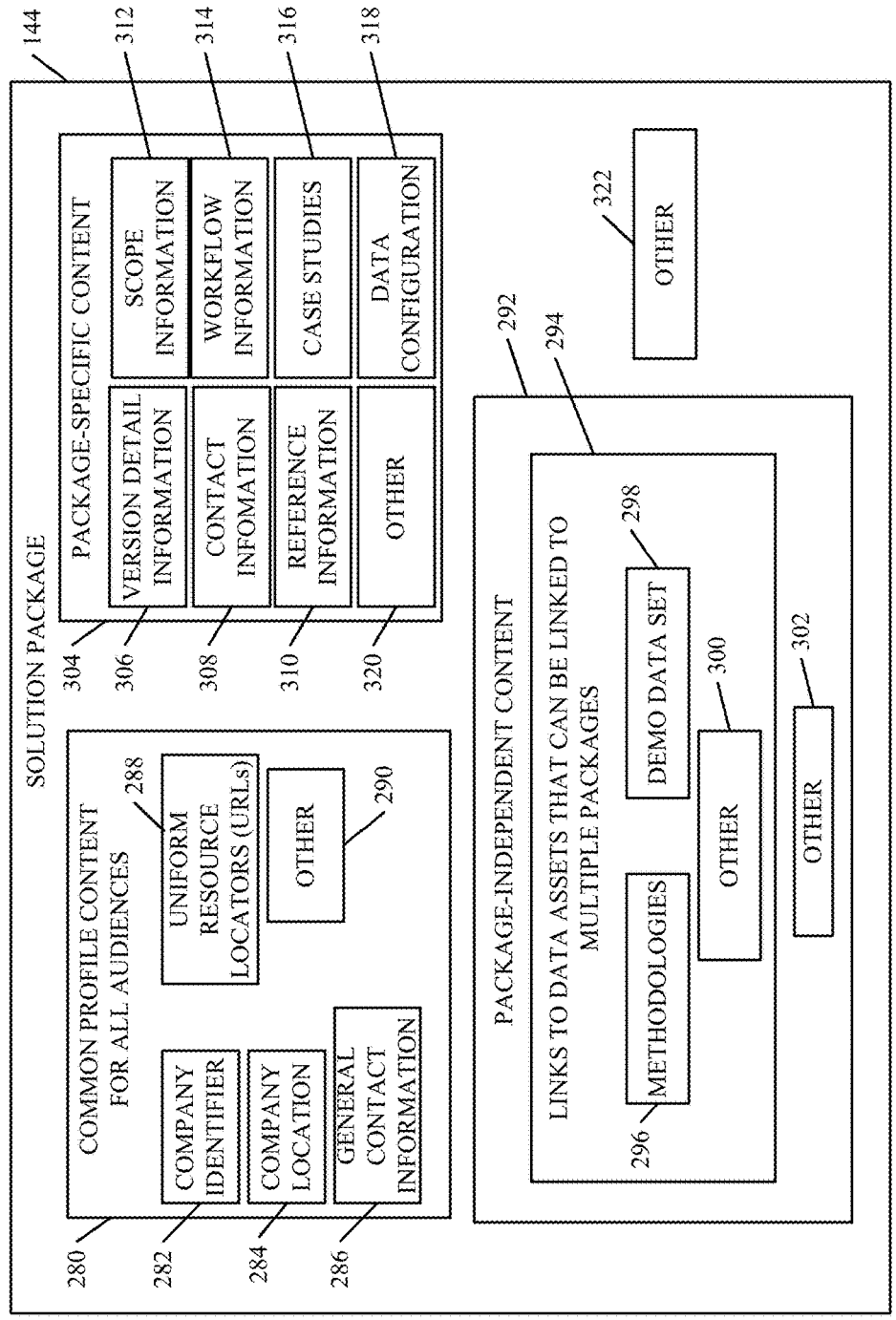
FIGS. 3A and 3B show two example representations of a solution package.
Figure 3B:
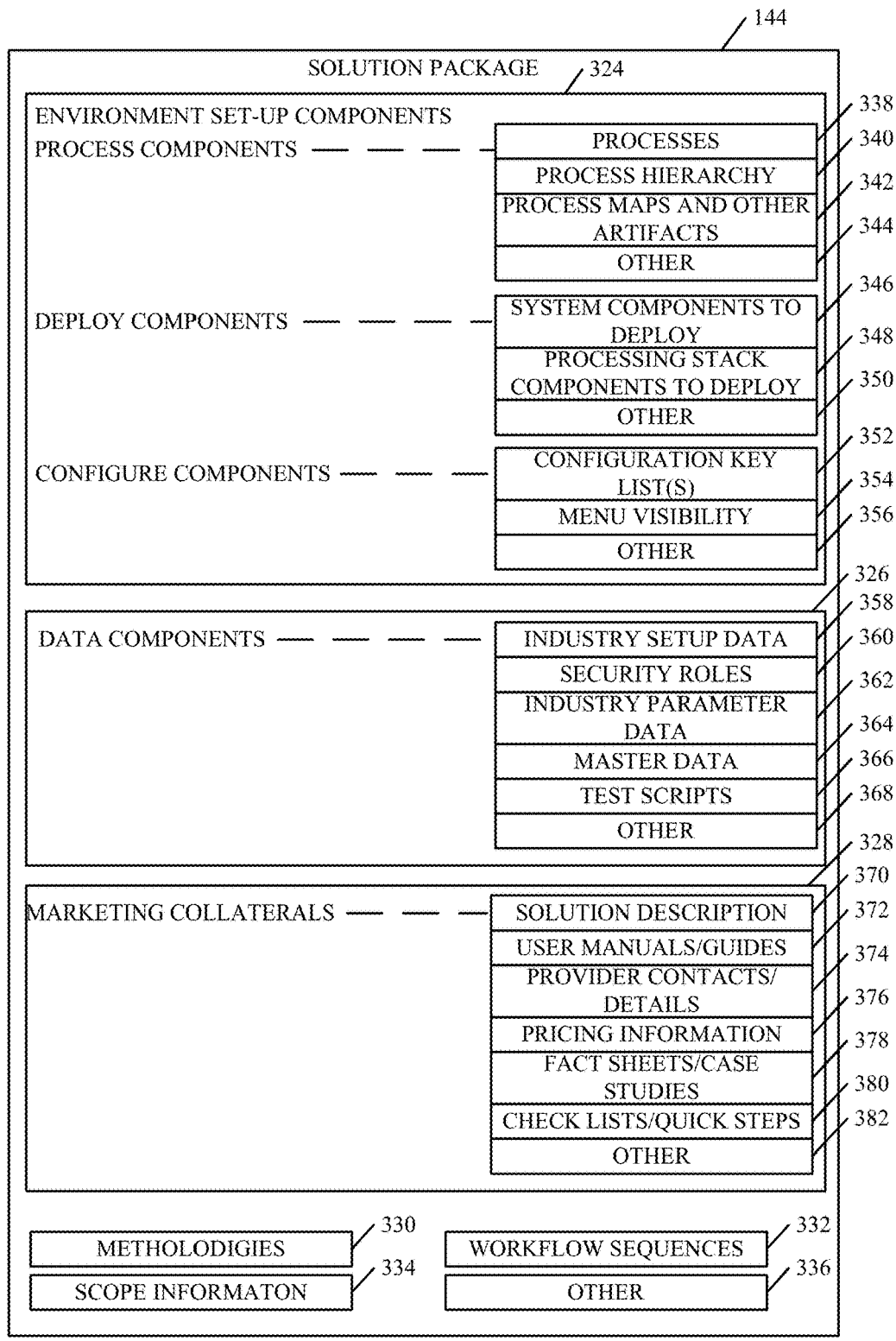

FIGS. 3A and 3B show two different examples of representations of solution package 144, that can be generated by solution package provider 114 using solution package generation system 102. In FIG. 3A, for instance, solution package 144 illustratively includes a set of common profile content for all audiences, as indicated by block 280. This can include, for instance, a company identifier 282 that identifies the solution provider along with a company location 284. It can include general contact information 286 for the solution provider 118, or his or her company. It can include a set of uniform resource locators (URLs) for the company 288, and it can include a wide variety of other globally or generally available items 290. In the example shown in FIG. 3A, package 144 may also illustratively include a set of package-independent content 292. This can include links to data assets that can be linked to multiple different packages, as indicated by block 294. The data assets can be used by methodologies 296, they can include demonstration data sets 298, or other data assets 300. The package-independent content 292 can include other items 302 as well.

The example shown in FIG. 3A also shows that solution package 144 can include a set of package-specific content 304. For instance, this content can include version details information 306 that provides details about the particular version of the base system and corresponding to the solution package. It can include contact information 308, reference information 310, scope information 312, workflow information 314, case studies 316, and a wide variety of other data and process configurations 318. It can include other items 320 as well. The workflow information 314 can be information that is used to configure workflows within the solution package. The case studies 316 can be information that is provided by other organizations that have used the solution package. The data and process configurations 318 can be a wide variety of data, code, model, and other configuration information that is used to configure those items within solution package 144. Scope information 312 can also illustratively indicate what information is available to different users. Of course, solution package 144 can include other items as well, and this is indicated by block 322.

In the example shown in FIG. 3B, solution package 144 includes a set of environment setup components 324. It also includes data components 326, marketing collateral information 328, methodology information 330, workflow sequences 332, scope information 334, and it can include other items 336. Environment setup components 324 can, for instance, include process components such as processes 338, a process hierarchy 340 that identifies a dependency among processes 338, process maps and other artifacts 332 that are used by the processes, and other items 344. The processes can include such things as the various processes or workflows that are to be deployed in the environment. For instance, one organization may want to deploy a merchandizing process while another may want to deploy a back office process, while yet a third may want to deploy both. Components 324 can include a set of deploy components that include system components 346 that are to be deployed with the solution package, processing stack components 348 that are to be deployed, and other components 350 that are to be deployed as well. The system and processing stack components 346 and 348 can include such things as components specific to a given reporting architecture, a manufacturing deployment, etc. The stack components are used as basic stack processing components and can include such things as business intelligence processing components, document management systems, etc.

Components 324 can also include a set of configure components that may include, for instance, configuration key lists 352, menu visibility information 354 and other information 356. The key lists 352 may indicate how the system is to be configured, once it is installed. This may identify such things as what search services are to be used, which localizations are to be deployed, which languages are supported, among a wide variety of other configuration keys.

When the environment setup components 324 have been configured, then data components 326 are configured. The particular data may be very different based upon the particular industry for which package 144 is being generated. By way of example, if it is being generated for a retail industry, the data components may include one set of data. However, if it is being generated for a manufacturing industry, the data components may be entirely different. However, within a given industry, the various solutions may use data items that are highly similar. Thus, data components 326 can pre-define a wide variety of different data items that may likely be used by end user organizations within a given industry. Components 326 can illustratively include industry-specific setup data 358, security roles 360, industry parameter data 362, master data records 364, a variety of different test scripts 366, and it can include other items 368. All of these data items may specifically configure package 144 for the target industry.

Solution package 144 may also include marketing collateral information 328. This is illustratively information that is surfaced by package distribution component 180 in solution package verification and distribution system 104. It is information that can be viewed by perspective end user organizations as they are looking for a given solution to deploy. Such information may include, for instance, a description of the solution 370, user manuals or user guides 372, provider contact information and details about the solution provider's company 374, pricing information 376 for various end user configurations that may deploy the solution package, fact sheets and case studies regarding the particular solution package 378, check lists and quick step guides or procedures 380 and a wide variety of other information 382.

Methodologies 330 can include such things as a series of steps on how the solution package 144 is to be used. This may be similar, for instance, to an automated instruction manual that indicates how to unpack and deploy solution package 144. Workflow sequences 332 may include a wide variety of information as to how workflows are organized or configured, and scope information 334 may set various scopes on the different portions of content within solution package 144.

Figure 3D:
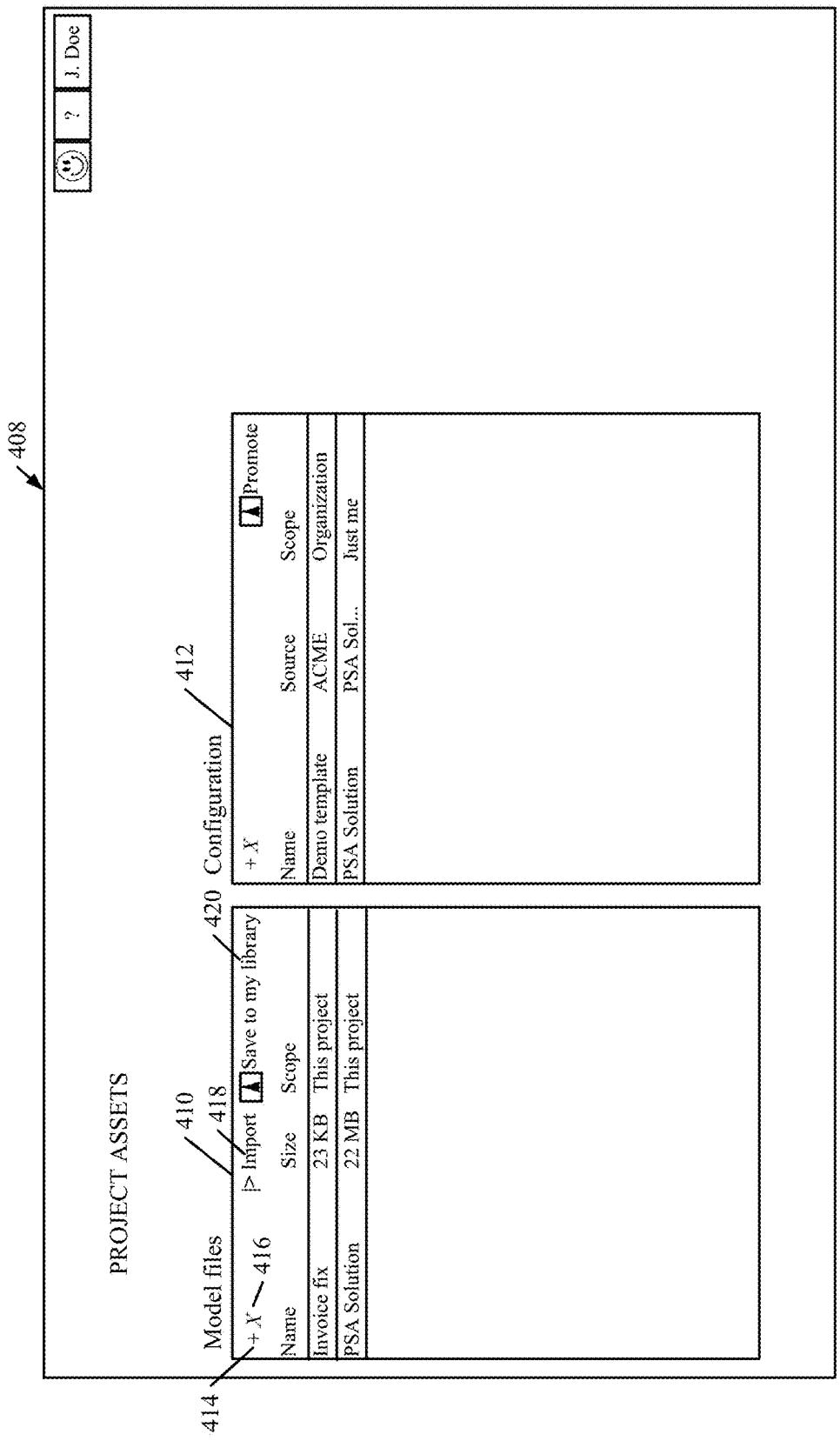

FIGS. 3C and 3D show examples of user interface displays indicating how provider 114 can interact with asset libraries 150. FIG. 3C is one example of a user interface display 390 that displays one example of a shared asset library 150. It will first be noted that the asset libraries can be divided. For instance, there may be a globally shared asset library 150 that can be accessed by any provider. There may be shared asset libraries that are shared within a development environment or organization that provider 114 works for. There may be project libraries that include assets that were loaded into a specific project. All of these are contemplated herein.

Display 390 includes a solution package display portion 392, a code asset display portion 394, a configuration asset display portion 396, and it can include other items as well, such as methodology assets, process model assets, etc. Each portion 392-396 illustratively has a name section 398, and a scope section 400. Name section 398 illustratively includes a name of an asset within that display portion. For instance, solution package display portion 392 has name portion 398 that lists names of solution package assets that are available. Scope portion 400 includes an indicator as to the scope of availability for the individually named item. In display portion 392, for instance, scope portion 400 identifies whether the corresponding solution package named in section 398 is publically available, privately available, or available to a given organization. Each display portion 392-396 also illustratively has an accept mechanism 402, a reject mechanism 404, and a promote mechanism 406.

Mechanisms 402 and 404 can be actuated by provider 114 to accept or reject assets from the library, respectively. Promote actuator 406 can be actuated by provider 114, and the asset library 150 then illustratively allows the user to promote a given asset to change its scope, to change environments or projects, etc.

FIG. 3D shows another user interface display 408 that is an example of a project asset library. In the example shown in FIG. 3D, the assets displayed are stored in a specific project within solution package generation system (or development environment) 102. Display 408 illustratively includes a model file display portion 410 and a configuration display portion 412. Display portions 410 and 412 each include an add actuator 414 and a delete actuator 416 that can be actuated to add assets to the display portion or delete them, respectively. Import actuator 418 can be actuated to import an asset and save actuator 420 can be actuated to save a selected asset to the individual library of provider 114.

It will be appreciated that FIGS. 3C and 3D only show examples of asset libraries. A wide variety of others could be used as well.

Figure 3E:
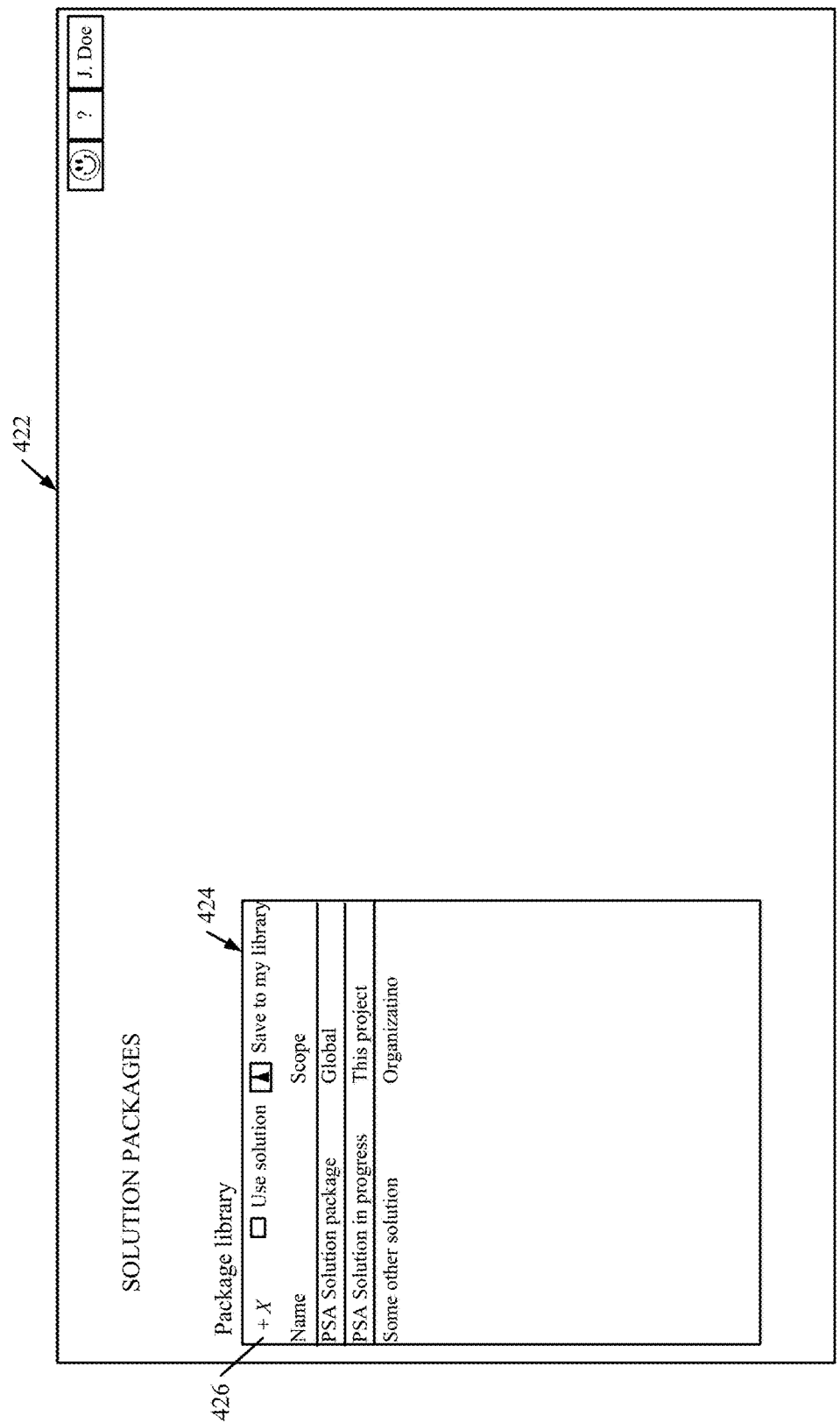

FIGS. 3E-3H show examples of user interface displays that can be generated by various components of solution package generation system 102. They each illustratively include user input mechanisms that can be actuated by provider 114 in order to generate a solution package. FIG. 3E, for instance, shows a user interface display 422 that shows a set of solution packages in package library display portion 424. Display portion 424 also illustratively includes an add user input mechanism 426. When the user actuates mechanism 426, solution package generation system 102 detects this as an indication that provider 114 wishes to generate a new solution package.

FIG. 3F shows one example user interface display 428 that can be displayed when the user does this. A set of user input mechanisms shown generally at 430 allow the user to enter initial information for the solution package to be created. Mechanism 432 allows the user to enter a name and mechanism 434 allows the user to enter a description of the package. User input mechanism 436 allows the user to input, or select from a drop down menu, a methodology that would be used along with the solution package. User input mechanism 438 can be actuated by provider 114 to specify an industry for which the solution package is being generated. Mechanism 440 allows the user to identify a particular version of base system 146 that the solution is intended to be generated for, and user input mechanism 442 illustratively allows the provider 114 to enter, or select, a country or other localization indication. Mechanism 444 can be actuated by provider 114 in order to create, and continue to configure, the solution package.

Figure 3G:
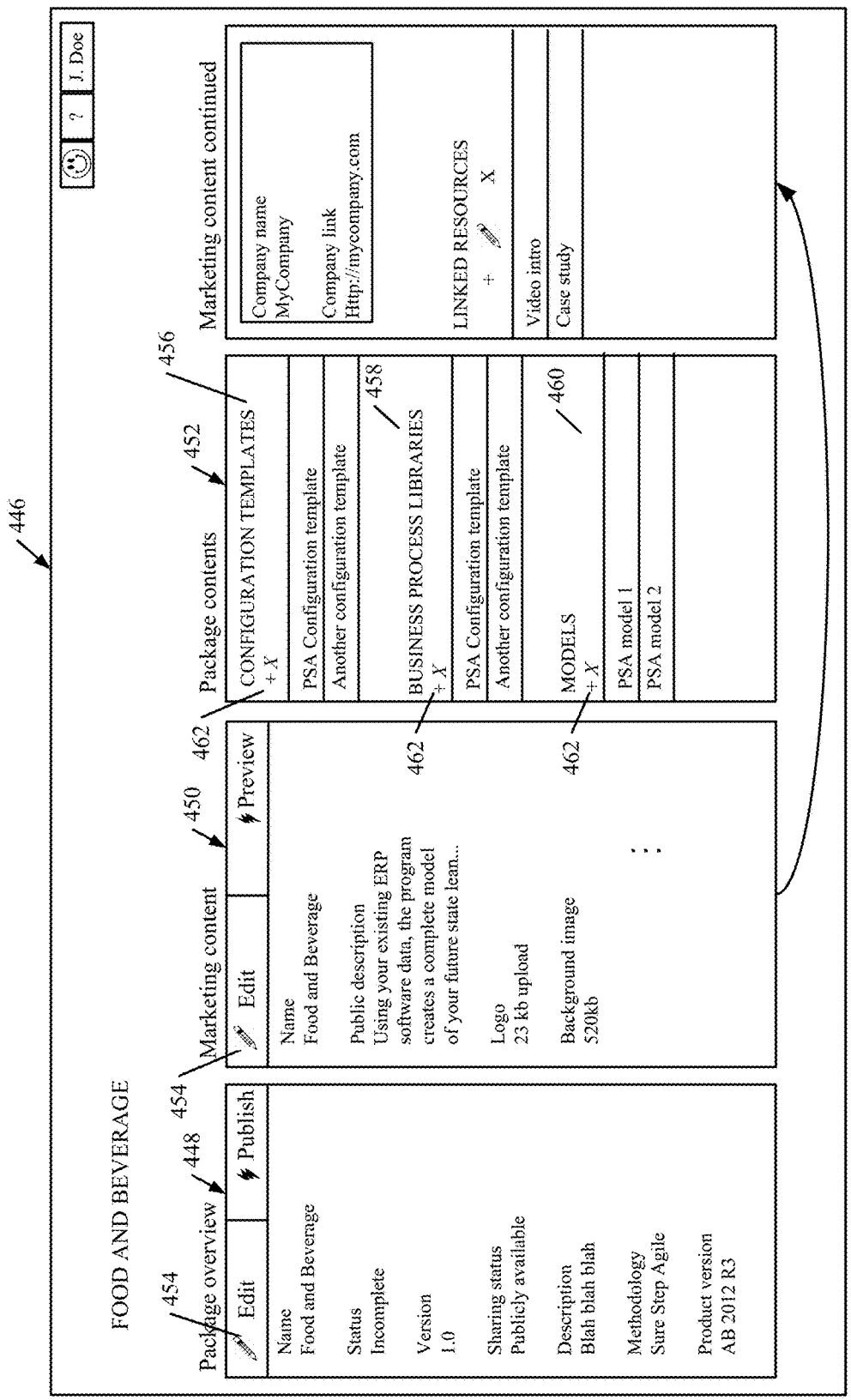

FIG. 3G is one example of a user interface display 446 that displays the contents of a solution package for the food and beverage industry. Of course, it is an example only. User interface display 446 illustratively includes a package overview display portion 448, a marketing content portion 450, and a package contents portion 452. Each of display portions 448 and 450 have an edit user input mechanism 454 that can be actuated by provider 114 in order to edit the content of the solution package displayed in those display portions. For instance, when the user actuates the edit mechanism 454 on package overview display portion 448, the user is illustratively navigated to a display screen similar to that shown in FIG. 3F, where the user can enter or modify overview information. When the user actuates user input mechanism 454 on marketing content display portion 450, the user is illustratively navigated to a user interface display, with user input mechanisms that allow the user to edit marketing content that is included in the solution package.

Package contents display portion 452, in the example shown in FIG. 3G, includes a configuration template display section 456, a business process library display section 458, and a model display section 460. Each of display sections 456-460 include an add user input mechanism 462. When the user actuates the mechanism 462, the user is navigated to a user interface display with user input mechanisms that can be actuated to add a corresponding content item to the solution package.

Figure 3H:
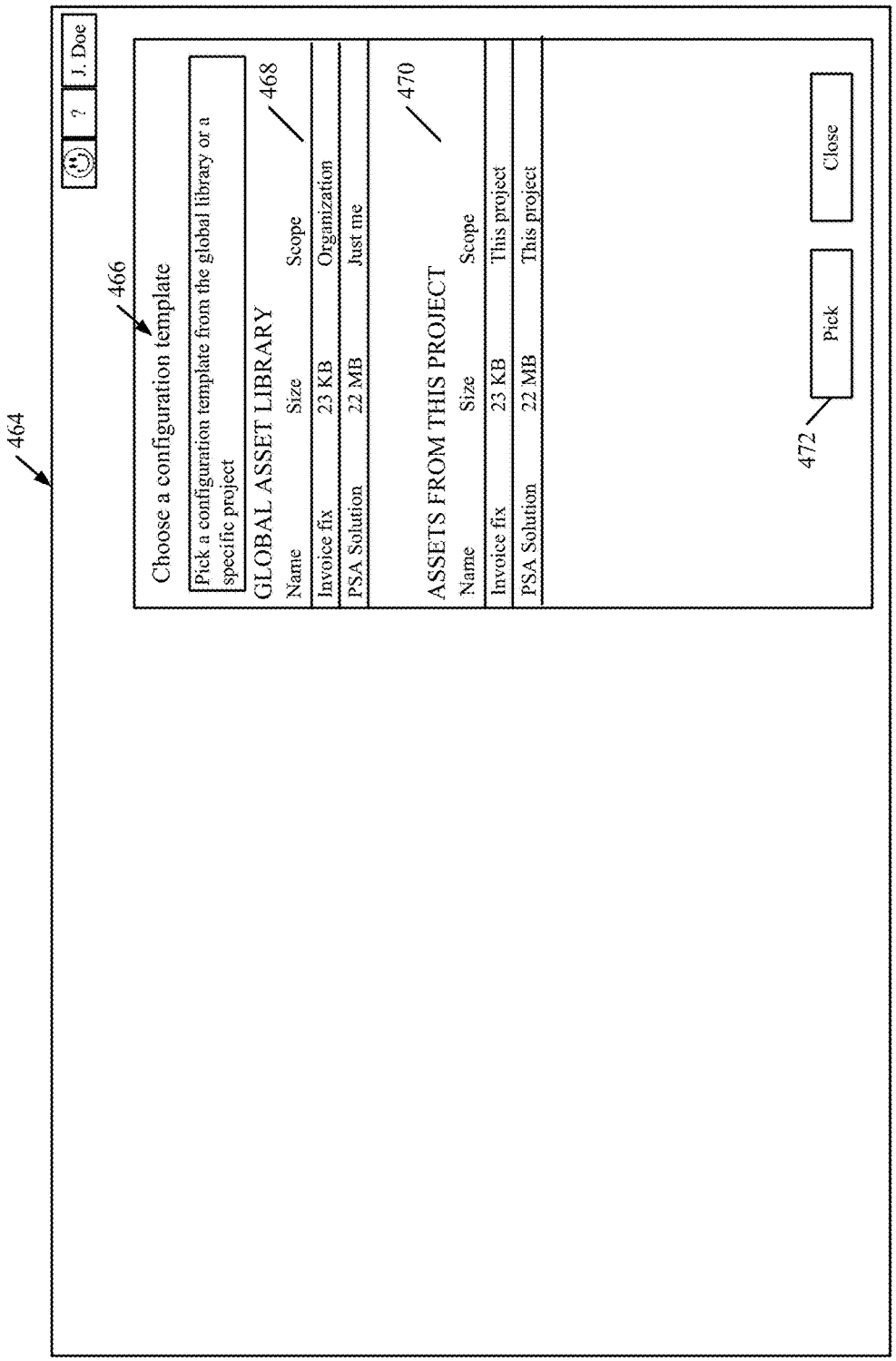

FIG. 3H, for example, shows a user interface display 464 that can be displayed by template configuration system 157 (shown in FIG. 1) when the user actuates the user input mechanism 462 on the configuration templates section 456 of package contents display portion 452 (shown in FIG. 3G). It can be seen in FIG. 3H that the user is navigated to a configuration template selection display portion 466. It displays configuration templates that are available to provider 114. In the example shown in FIG. 3H, it includes a global asset library display portion 468 that displays configuration templates that can be selected by provider 114 from a global asset library 150. It also includes a project asset library display section 470 that displays configuration templates in the project asset library for the present project. Provider 114 can select any of the displayed configuration template assets and then actuate the "pick" user input mechanism 472. In that case, template configuration component 156 will add the selected configuration template to the solution package being generated, and it will be displayed under the corresponding section in FIG. 3G.

Figure 4:
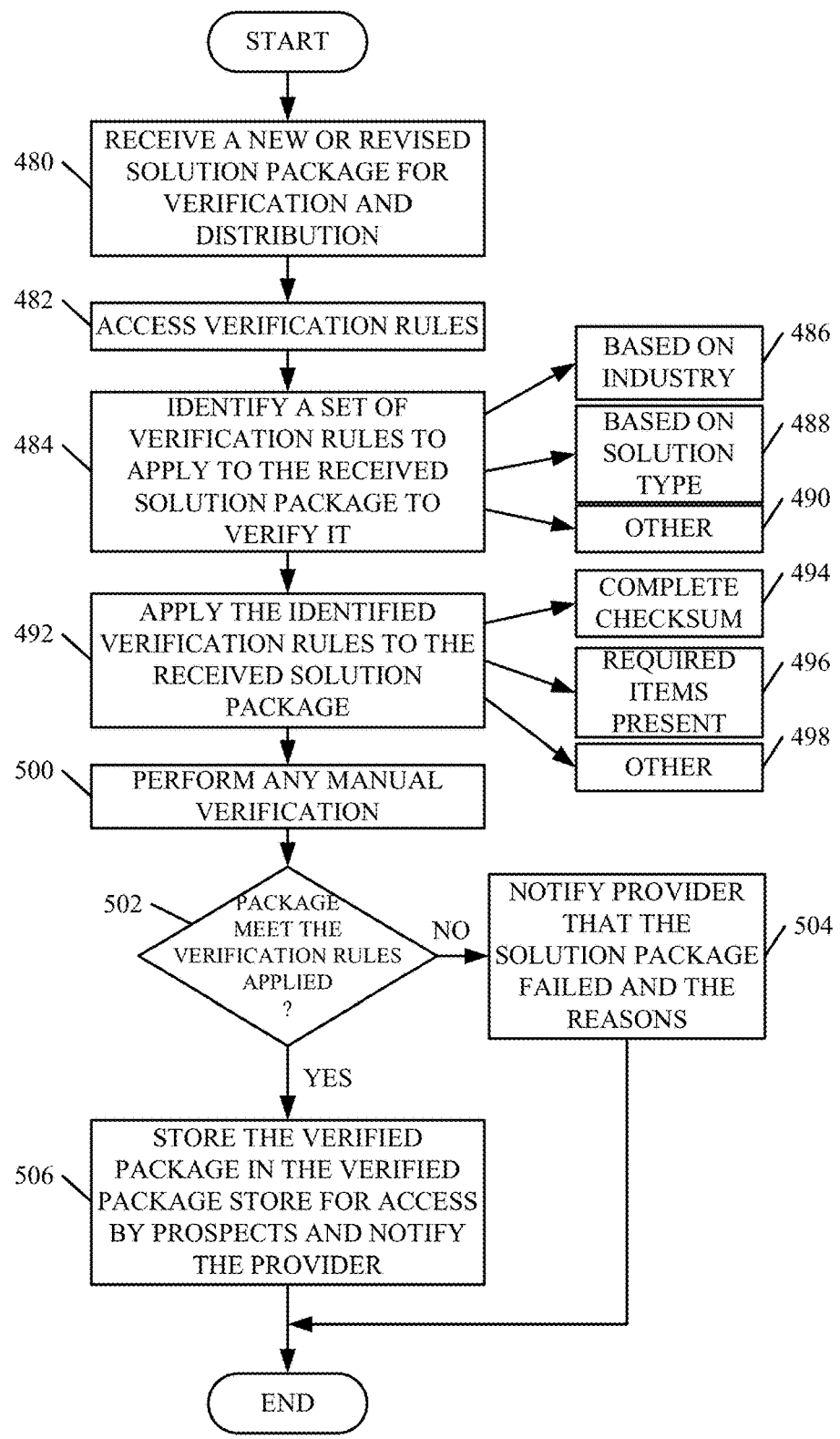
FIG. 4 is a flow diagram illustrating one example of the operation of a solution package verification and distribution system shown in FIG. 1 in receiving and verifying a solution package.

FIG. 4 is a flow diagram illustrating one example of the operation of solution package verification and distribution system 104, in receiving and verifying solution package 144, in more detail. It will be appreciated that solution package verification and distribution system 104 can receive and verify either a newly created solution package, or one that has been revised. For the purposes of the present discussion, it will be assumed that solution package 144 is a newly created solution package, and, once it is verified and placed in verified package store 182, it becomes one of the verified packages 184 that are exposed for access by various potential users. Thus, system 104 first receives a solution package 144. This is indicated by block 480 in FIG. 4.

Verification component 176 then accesses verification rules 178. This is indicated by block 482. As an example, component 176 may identify a particular industry for which solution package 144 has been generated. This can be used by verification component 176 to access a particular set of verification rules 178 that specify what content is to be included in a solution package, for that industry. In another example, the verification rules may vary based on the particular type of solution package that is being generated. Identifying the set of verification rules to apply to the received solution package in order to verify it is indicated by block 484. Identifying those rules based on the target industry is indicated by block 486. Identifying them based on solution type is indicated by block 488, and they can be identified in other ways as well, and this is indicated by block 490. Or, they can be the same rules for all packages. That is contemplated as well.

Verification component 176 then applies the identified verification rules to the received solution package. This is indicated by block 492. This can also be done in a wide variety of different ways. For instance, each solution package 144 may have certain portions that are used to compute a checksum. If the checksum computes properly, then the solution package is deemed to contain the items necessary to be verified. Computing a checksum is indicated by block 494. In another example, the verification rules that are being applied may simply map to required content within a solution package. Component 176 can then compare the contents of the solution package 144 to the required content to determine whether all required items are present. This is indicated by block 496. The solution package can be verified in other ways as well, and this is indicated by block 498.

In one example, all of the verification is performed automatically by component 176. In another example, however, there may be certain manual verifications that are performed as well. Thus, any manual verifications can be performed, and this is indicated by block 500.

Verification component 176 then determines whether the package meets the verification rules applied. This is indicated by block 502. If not, then provider 114 is notified with verification notification 147 that the solution package 144 has failed the verification process, and it also provides the reasons so that provider 114 can remedy those reasons. This is indicated by block 504.

If the solution package 144 is verified, then verification component 176 notifies provider 114 with the verification notification 147 and stores the verified package in the verified package store 182 for access by prospects. This is indicated by block 506 in FIG. 4.

Figure 5:
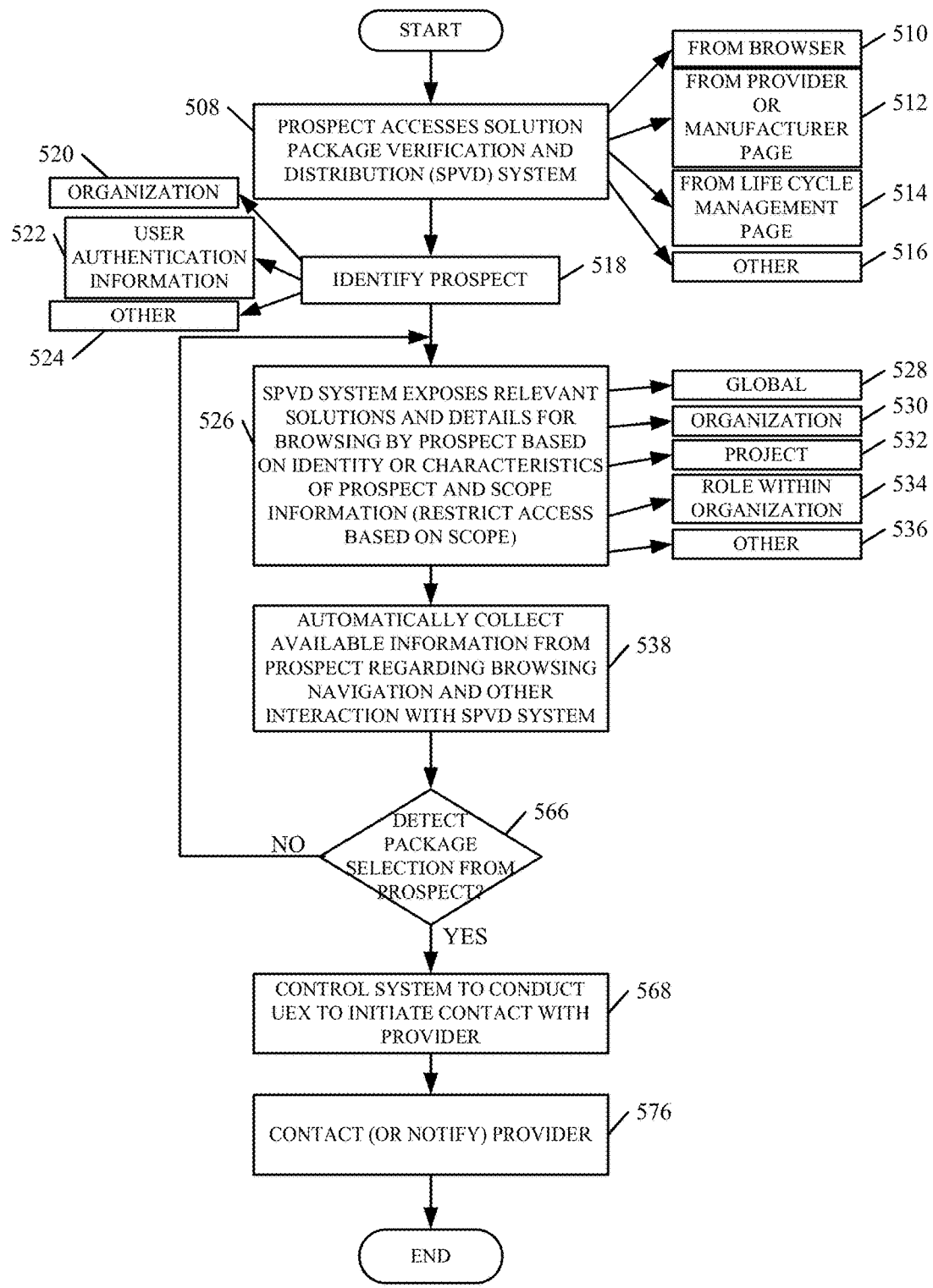
FIG. 5 is a flow diagram illustrating one example of the solution package verification and distribution system shown in FIG. 1 in verifying and exposing the solution package for access by users.

FIG. 5 is a flow diagram illustrating the operation of system 104 in exposing a verified solution package 184 to a user of an end user organization that wishes to browse through various solution packages for possible deployment at end user system 116. FIGS. 5A-5D show examples of user interface displays that can be generated by package distribution component 180 in allowing a user of an end user system 116 to browse verified solution packages 184 and to initiate contact with a provider 114 of one of those verified solution packages. FIGS. 5-5D will now be described in conjunction with one another.

In order for a prospective user of a solution package (e.g., end user 122 or a developer, etc.) to browse through the various verified packages 184 that are available, the end user (also referred to herein as a prospect or prospective user) accesses solution package verification and distribution system 104 (also referred to as SPVD system 104). This is indicated by block 508 in FIG. 5. The prospect can do this in a wide variety of different ways. For instance, they can use a browser on end user system 116. This is indicated by block 510. They can access packages 184 from a webpage of provider 114 or the manufacturer of base system 146. This is indicated by block 512. They can also access it through product life cycle management system 108. This is indicated by block 514. They can access the verified packages 184 in other ways as well, and this is indicated by block 516.

The prospect 122 will then be navigated through an experience by package distribution component 180, through which the prospect 122 can review the marketing content for the various solutions 184 that are available. In doing this, package distribution component 180 illustratively identifies the prospective user or characteristics of the prospective user. This is indicated by block 518. For instance, component 180 can identify the end user organization through which user 122 is accessing the packages 184. This is indicated by block 520. Component 180 can identify the user through the user's authentication information or other logon information, as indicated by block 522. The component 180 can ask the user for his or her identity, or otherwise obtain the identity of the prospect in other ways, as indicated by block 524.

Based upon the identity of the prospective user, page distribution component 180 illustratively exposes relevant solution packages 184 and their details for browsing by the prospective user. This can be done based upon the identity of the prospect or characteristics of the prospect, as well as based upon the scope of the information made available in the solution packages 184 that are being browsed. In other words, component 180 illustratively restricts access to the information in the solution packages 184 based upon the identity of the user or the user organization, and based upon the scope assigned to the information in the packages. This is indicated by block 526. Again, as briefly mentioned above, the scope of the content of the verified solution packages 184 can vary based upon the particular content. It can have a global scope 528 in which case anyone can view it. It can have an organizational or project scope 530 or 532, respectively, in which case the access to the content is restricted based upon the organization or project that the prospective user has access to. It can also be scoped based upon a given prospective user's role within an organization, as indicated by block 534. The access can be restricted based on other types of scope as well, and this is indicated by block 536.

In restricting the access, component 180 illustratively identifies the scope of the content for the various packages 184 and then looks up the relevant information about the prospective user (such as the user's organization, the projects he or she has access to, the role within a given organization, etc.) and determines whether the user meets the scope of the content. If so, the content is displayed by component 180. If not, the content is not displayed or made accessible to this particular prospective user.

In one example, package distribution component 180 also illustratively, and automatically, collects available information from the prospect regarding his or her browsing and navigation behavior, and other interactions with SPVD system 104. This is indicated by block 538. By way of example, it may be that a particular solution package 184 is only being viewed for a few seconds before prospective users navigate off of it in system 104. This may indicate that the promotional material included with that solution package is confusing or otherwise unattractive to prospective users. In that case, system 104 can notify the particular solution provider 114 that generated that solution package and give them feedback as to potential modifications that may enhance the solution package in the eyes of prospective users. A wide variety of other navigation information or user behavior information can be collected and used as well.

Figure 5A:
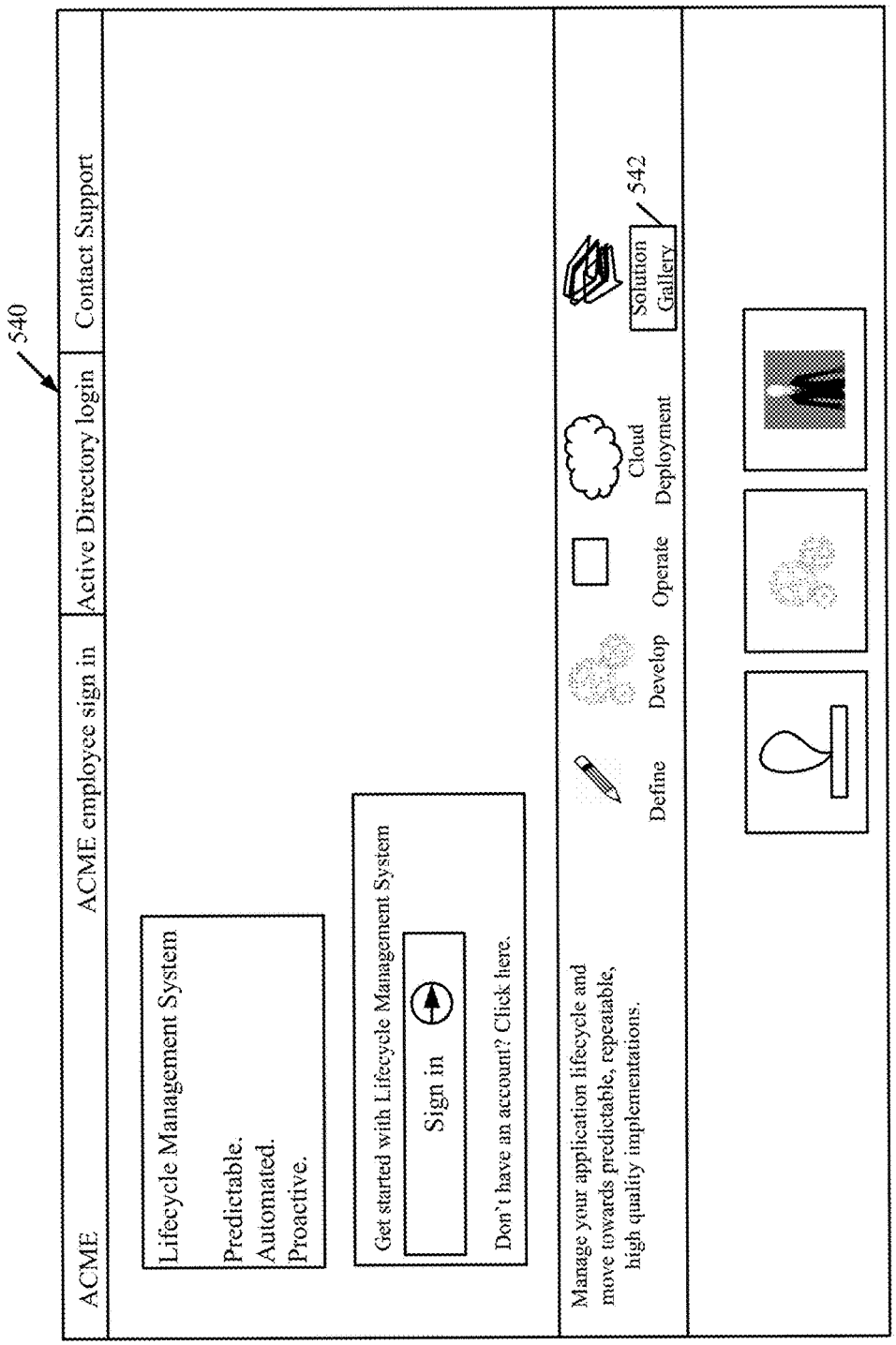
FIGS. 5A-5D show various examples of user interface displays.
Figure 5B:
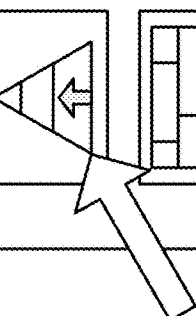
Figure 5C:
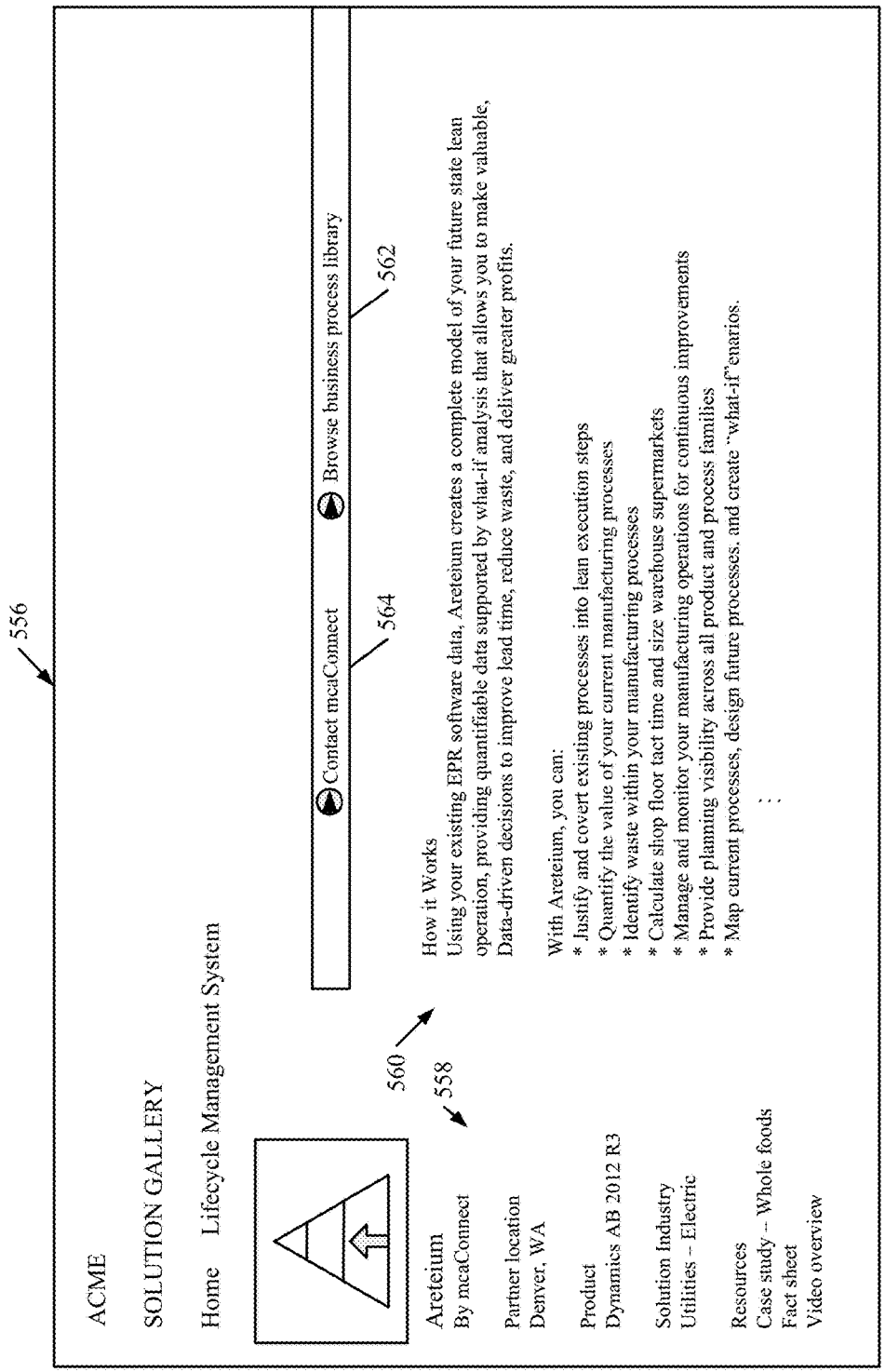
Figure 5D:
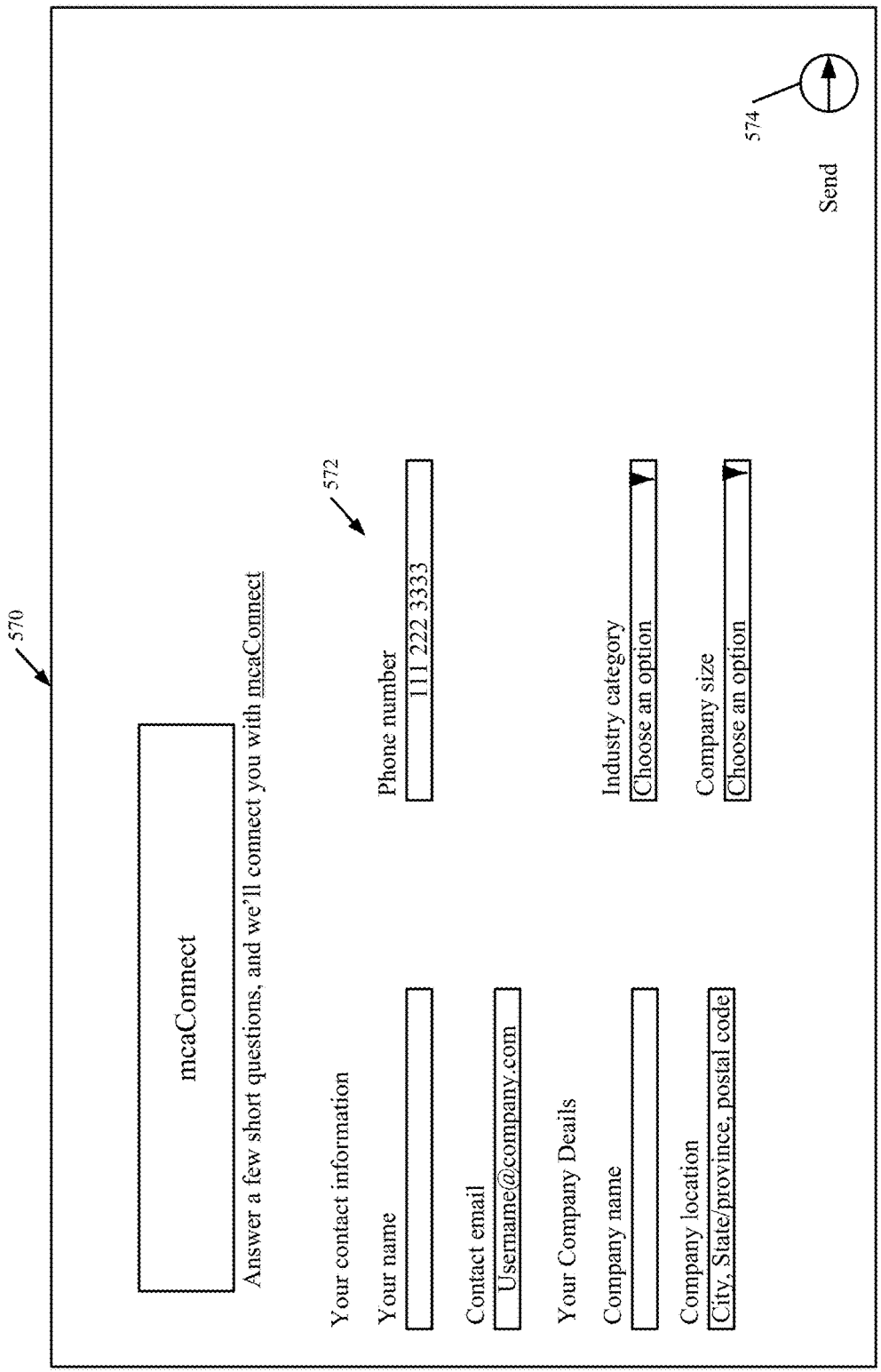

FIGS. 5A-5D show examples of various user interface displays that can be generated by component 180 and displayed by user interface component 174 in system 104. FIG. 5A, for instance, shows a user interface display 540 that can be generated to allow a prospective user to access packages 184 in verified package store 182. As an example, the prospective user has navigated to a landing page for product life cycle management system 108. It can be seen that display 540 illustratively includes a user input mechanism entitled "Solution Gallery" 542. When the user accesses user input mechanism 542, the user is illustratively navigated to a user interface display, such as display 544 shown in FIG. 5B. Display 544 shows a set of available solutions that include a solution name 546, a metric 548 that identifies a usage level of that particular solution, a descriptive portion 550 and a provider identifier portion 552. It also illustratively includes a user actuatable input mechanism 554 that can be actuated by the prospective user in order to view more information.

For instance, FIG. 5C shows one example of a user interface display 556 that can be generated when the user actuates user input mechanism 554. It can be seen in display 556 that the display shows a set of summary information 558 that describes the solution as well as a set of other descriptive or marketing information 560. Further, it illustratively includes an actuator 562 that can be actuated by the prospective user in order to view the various processes that are included in the solution package. It also illustratively includes an actuator 564 that can be actuated by the prospective user in order to select the solution package or to otherwise initiate communication with the solution package provider 114.

At some point during the prospective user's browsing, and for the sake of the present description, it is assumed that the prospective user selects one of the verified solution packages 184 or initiates contact with a solution provider of one of those packages 184. This is indicated by block 566 in the flow diagram of FIG. 5. In response, component 180 illustratively controls user interface component 174 to conduct a user experience that initiates contact with the solution provider 114 of that particular solution package. This is indicated by block 568.

By way of example, FIG. 5D shows a user interface display 570 that indicates this. Display 570 illustratively includes a set of user input mechanisms 572 that allow the prospective user to input information about themselves or their organization. That information can include contact information (such as name, email address, phone number, etc.) as well as information about the prospective user's company (such as company name, company location, industry category, company size, etc.). When the prospective user has completed entering information, he or she can illustratively actuate user input mechanism 574 that sends the information to solution package provider 114. This is also indicated by block 576 in the flow diagram of FIG. 5.

Figure 6A:
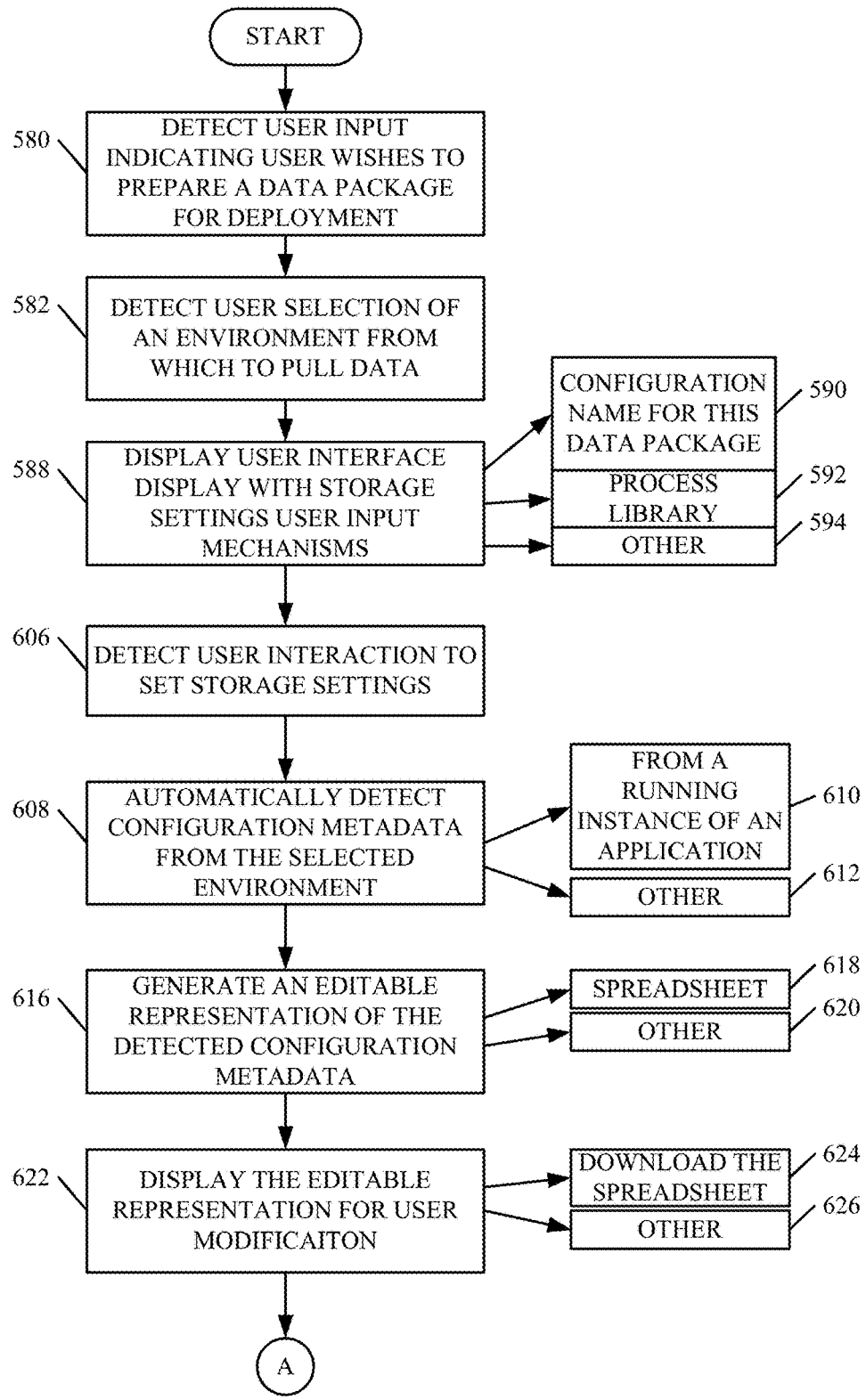
FIGS. 6A and 6B (collectively referred to herein as FIG. 6) illustrate one example of a flow diagram showing how a data package is generated for deployment at an end user system.
Figure 6B:
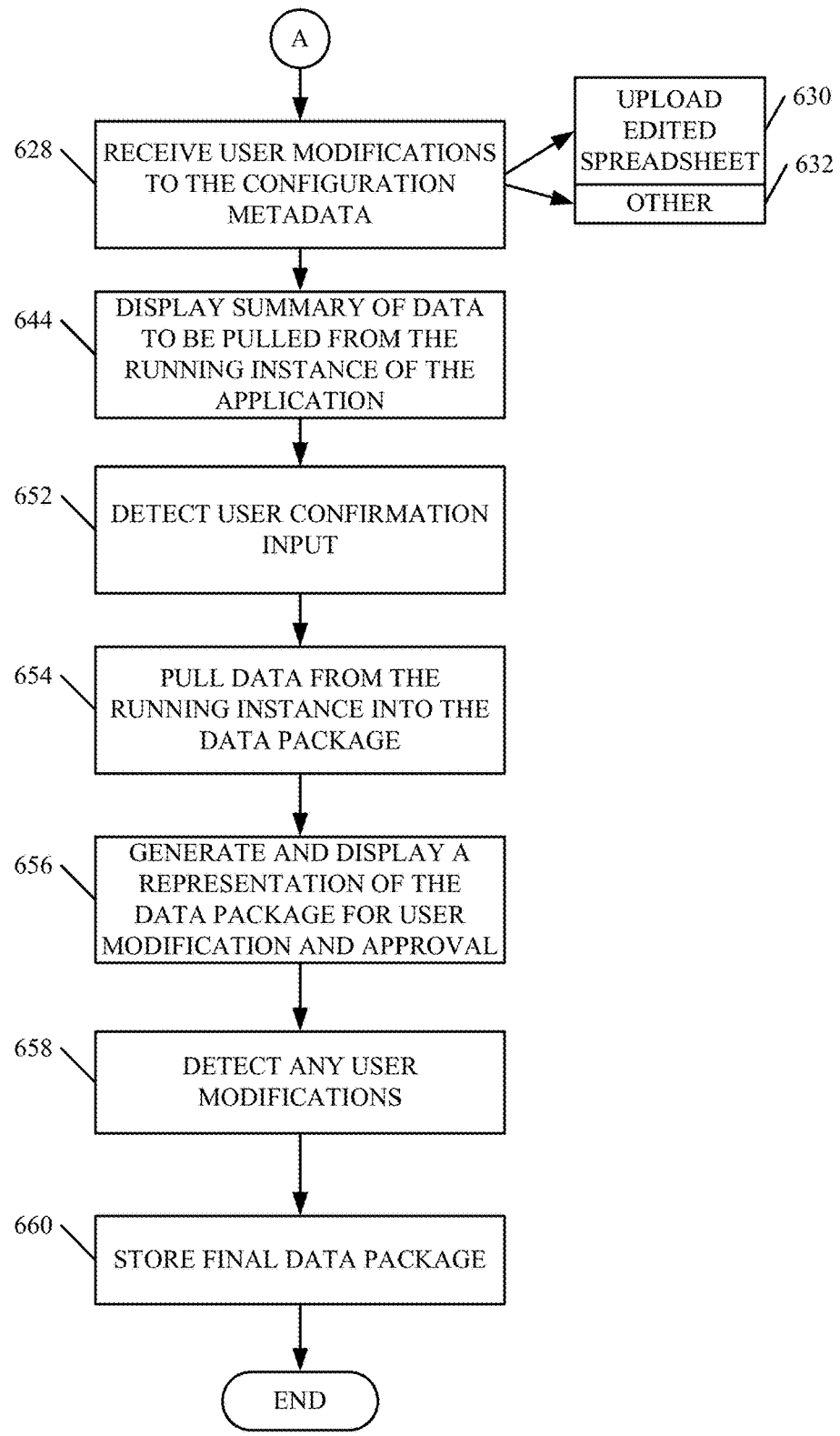
Figure 7:
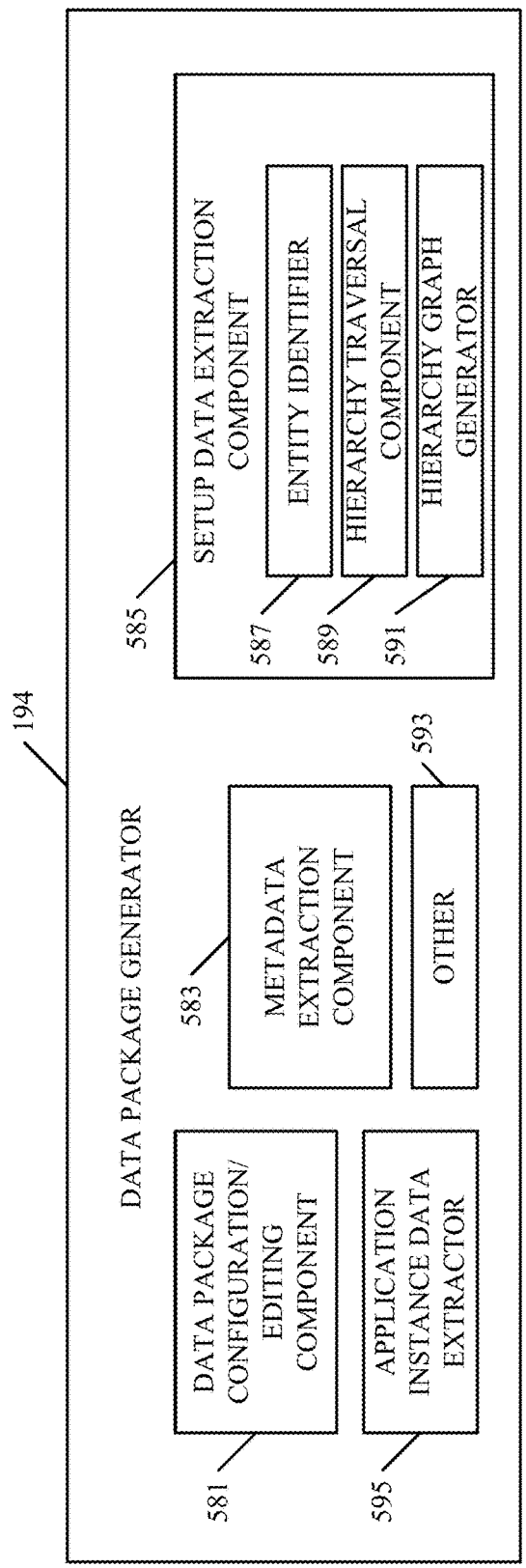
FIG. 7 is a block diagram of one example of a data package generator.
Figure 8:
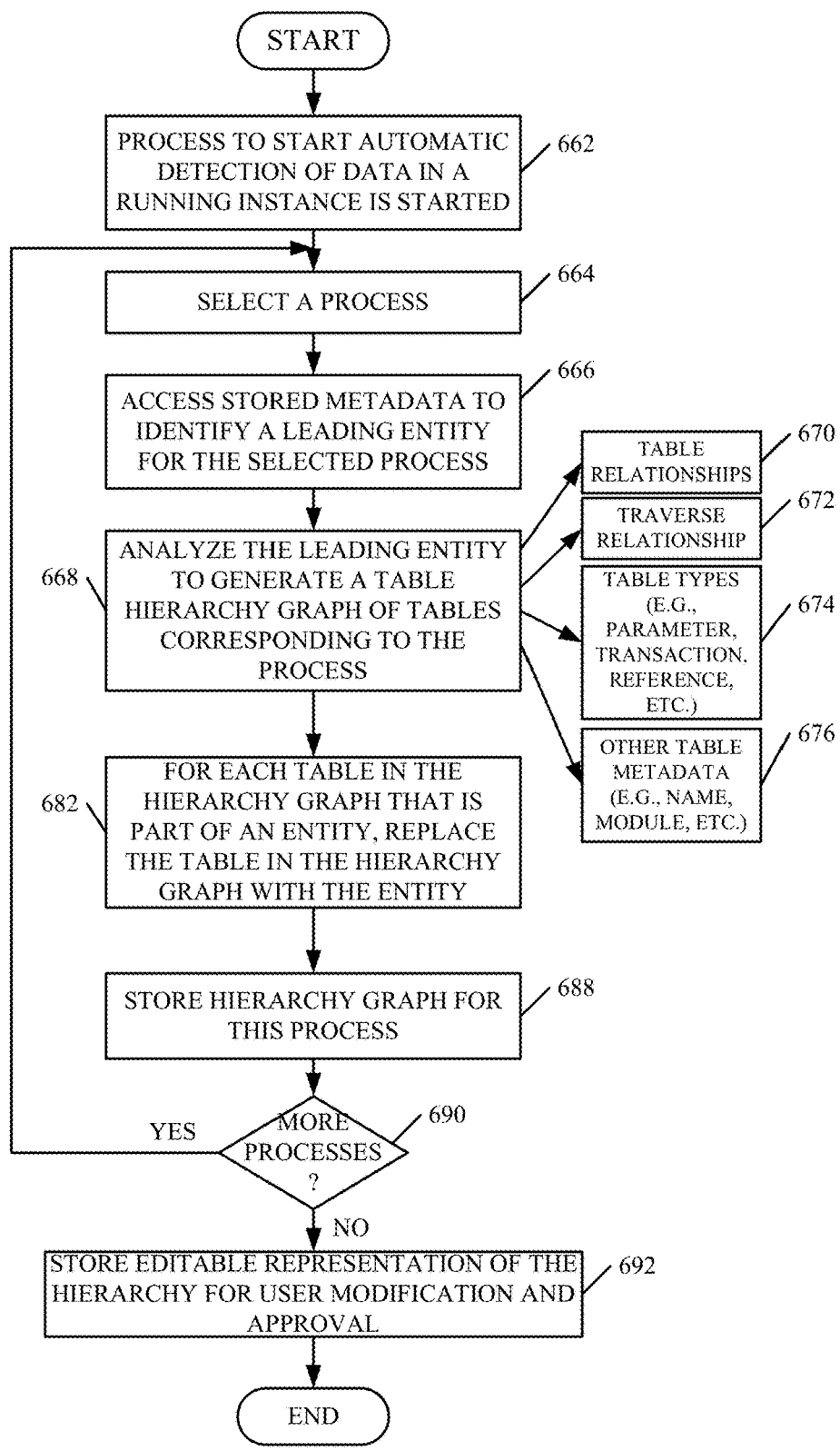
FIG. 8 is a flow diagram illustrating one example of the operation of the data package generator shown in FIG. 7.

Once a prospective user has selected a solution package for deployment, the prospective user (and/or solution package provider 114) illustratively interacts with solution package deployment system 106 in order to prepare the solution package for deployment at the end user system 116, and to create the customer data records and import customer data into the deployed solution. FIGS. 6A and 6B (collectively referred to herein as FIG. 6) show a flow diagram illustrating how a data package can be generated by data package generator 194 in system 106. FIG. 7 is a block diagram showing one example of data package generator 194 in generating a data package, in more detail, and FIG. 8 is a flow diagram illustrating one example of the operation of data package generator 194 in more detail. FIGS. 14-20 show examples of user interface displays that can be generated while doing this.

Data package generator 194, shown in FIG. 7, illustratively includes a data package configuration/editing component 581, metadata extraction component 583, setup data extraction component 585 (which, itself, illustratively includes an entity identifier 587, a hierarchy traversal component 598, and a hierarchy graph generator 591, application instance data extractor 595 and it can include other items 593 as well). Component 581 illustratively generates user input mechanisms that allow the user to configure and edit a data package. Metadata extraction component 583 illustratively extracts some of the metadata from a specified environment, data extraction component 585 extracts the setup data stored in that environment, and application instance data extractor 595 extracts the underlying application data from the application instance where data is being taken.

Beginning with an overall description of generating a data package, data package generator 194 first detects a user input indicating that the user wishes to prepare a data package in order to input data into a deployed solution package. This is indicated by block 580 in FIG. 6. Again, the user can be an end user, a developer, the solution package provider 114, or a wide variety of other users. The user then provides an input selecting an environment from which to pull data. For instance, the environment may be the running application instance 126 in end user system 116. This will be the data used in the newly deployed solution represented by the solution package being prepared for deployment. Detecting the user input identifying an environment from which to pull data is indicated by block 582 in FIG. 6.

Figure 14:
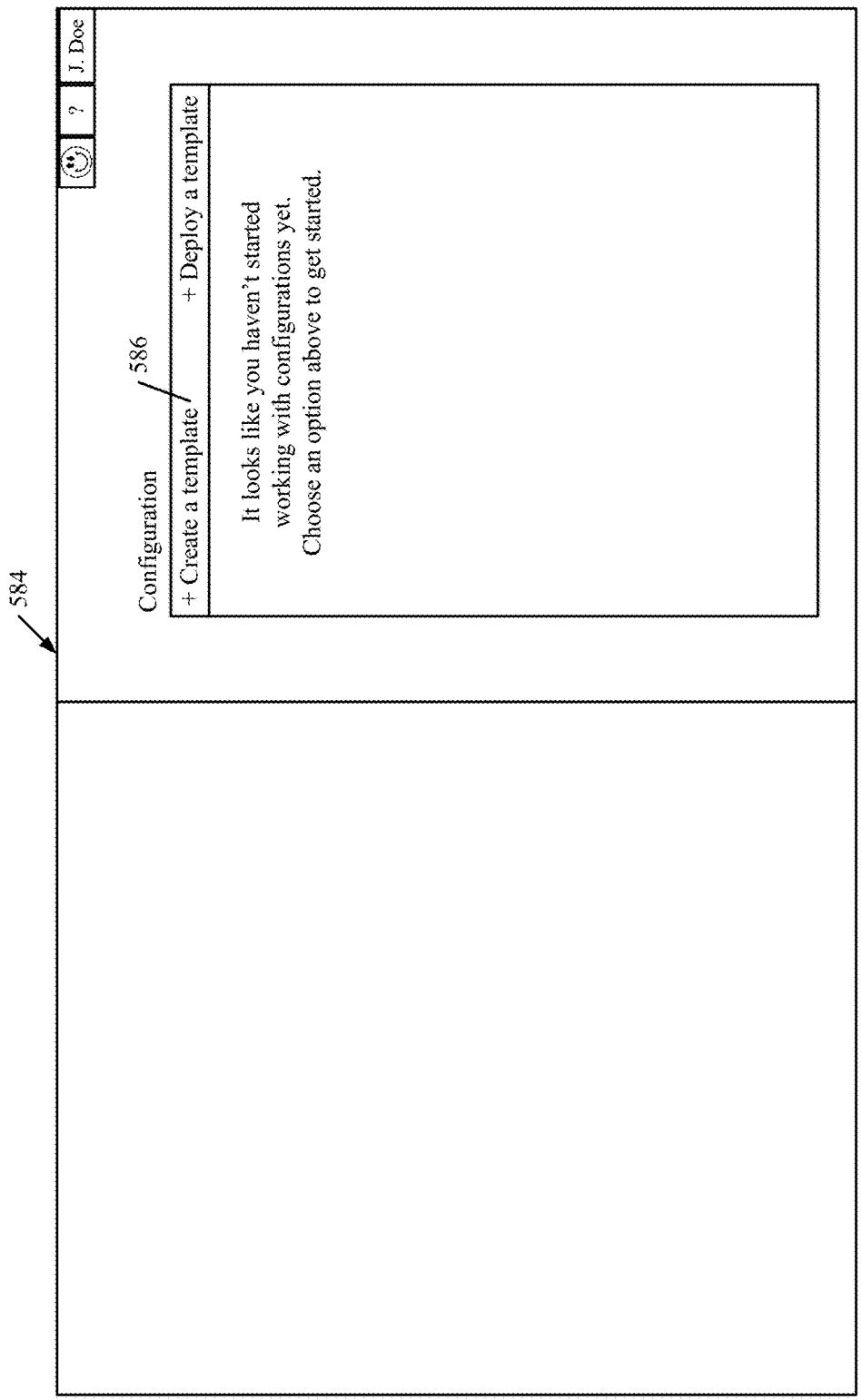

FIG. 14 shows one example of a user interface display 584 in which the user has already selected an environment and can now actuate a user input mechanism in order to prepare a data package on that environment. For instance, the user can actuate a "Create a Template" user input mechanism 586 in order to begin the process of creating a data package.

Data package configuration/editing component 581 in generator 194 then displays a user interface display with storage settings user input mechanisms that allow the user to identify how and where the data is to be stored. This is indicated by block 588 in the flow diagram of FIG. 5. In doing so, the user input mechanisms may allow the user to enter or select a configuration name for this data package, as indicated by block 590. It may also allow the user to specify a process library that is to be integrated with the present data package configuration. This is indicated by block 592. The user input mechanisms can allow the user to identify other storage settings as well, as indicated by block 594.

Figure 15:
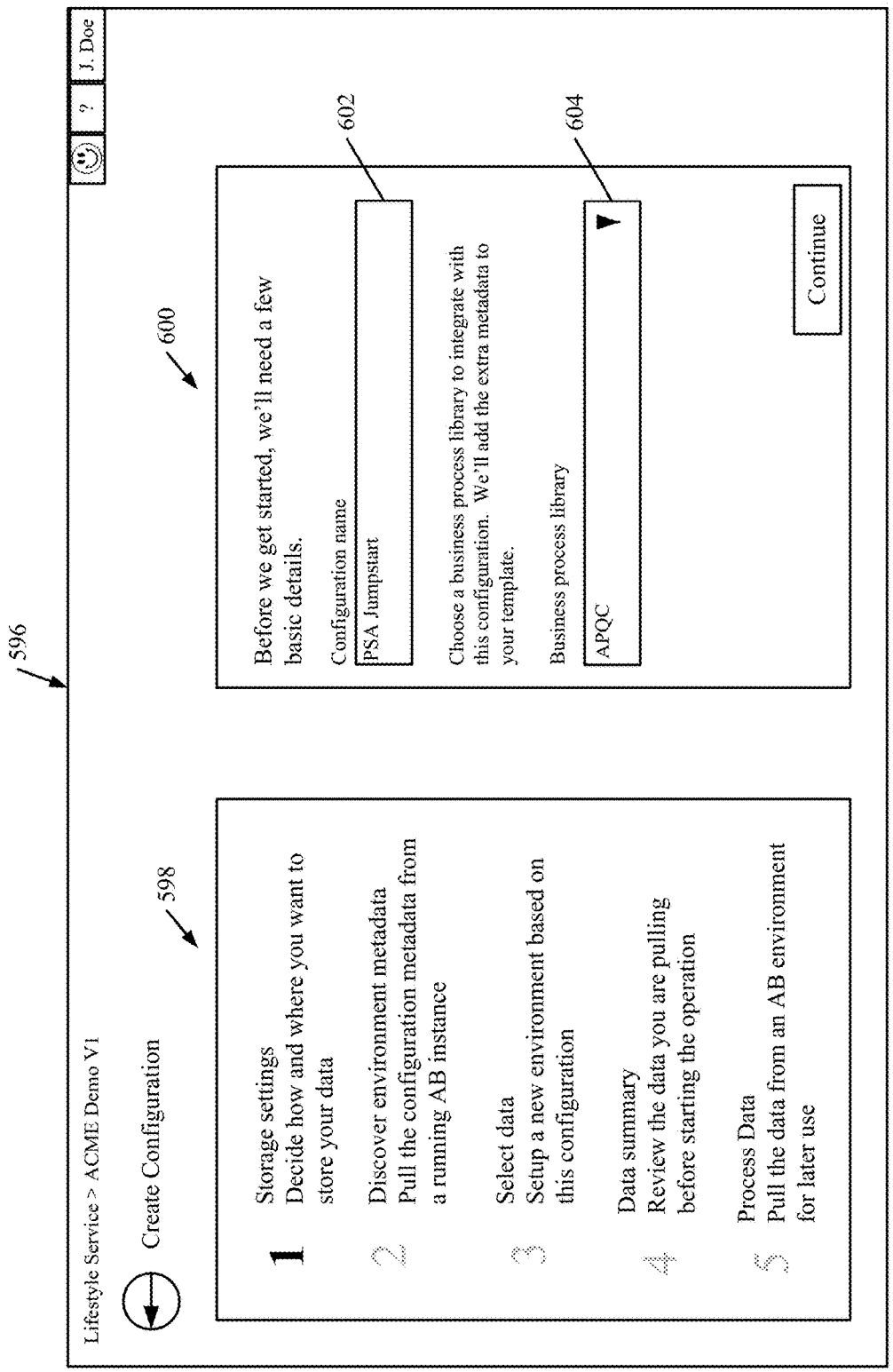

FIG. 15 shows one example of a user interface display 596 that illustrates this. It can be seen that user interface display 596 illustratively includes a step display 598 that displays the various steps used in generating a data package, and a step details display portion 600 that displays the details of a current step. Display portion 600, for instance, displays a configuration name user input mechanism 602 and a process library user input mechanism 604. These allow the user to input the storage settings discussed above. Detecting user interactions to set the storage settings is indicated by block 606 in FIG. 6.

Figure 16:
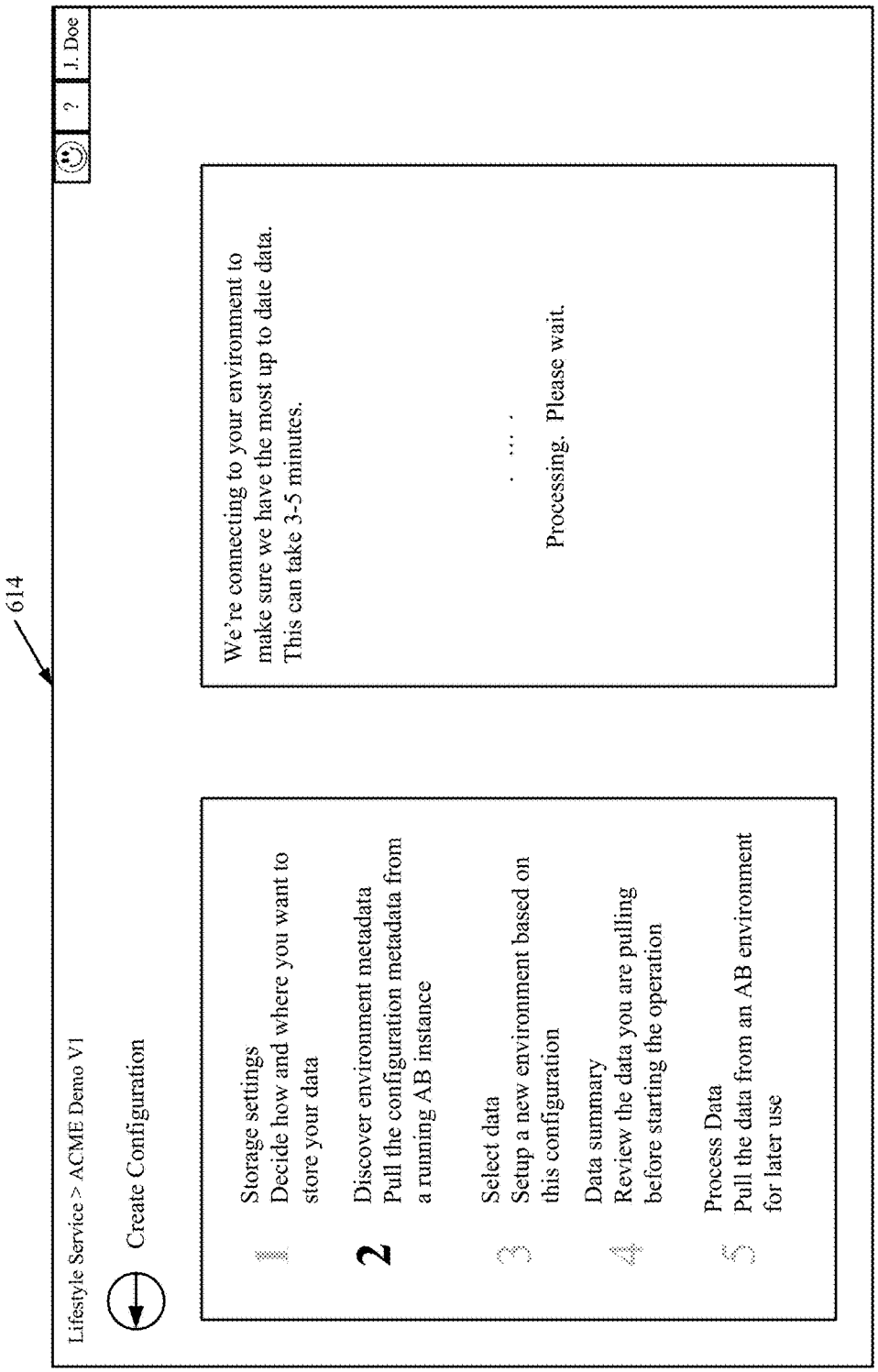

Metadata extraction component 583 then automatically detects configuration metadata from the selected environment. This is indicated by block 608. For instance, it can detect configuration metadata from the running application instance 126 identified by the prospective user as the environment. This is indicated by block 610. It can detect configuration metadata from the selected environment in other ways as well, and this is indicated by block 612. Metadata extraction component 583 can also illustratively generate a user interface display indicative of this. FIG. 16, for instance, shows one example of a user interface display 614 that indicates that the metadata extraction component 583 is connecting to the identified environment to extract its configuration metadata.

Metadata extraction component 583 then generates an editable representation of the detected configuration metadata. This is indicated by block 616 in FIG. 6. For instance, the editable representation can be a spreadsheet 618, or another representation 620 of the configuration metadata that was detected from the identified environment.

It then displays the editable representation for user confirmation or modification. This is indicated by block 622. For instance, component 583 can generate a user input mechanism that allows the user to download the editable representation, modify it, and then upload it back to component 583. As one example, the user can download the spreadsheet, as indicated by block 624. Component 583 can display the editable representation in other ways as well, and this is indicated by block 626.

The user can then affirm or modify the editable representation of the configuration metadata, to ensure that it is the desired configuration metadata that is to be deployed with the new solution package that is being prepared. Receiving user modifications is indicated by block 628. This can be done by uploading the modified spreadsheet as indicated by block 630, or in other ways, as indicated by block 632.

Figure 18:
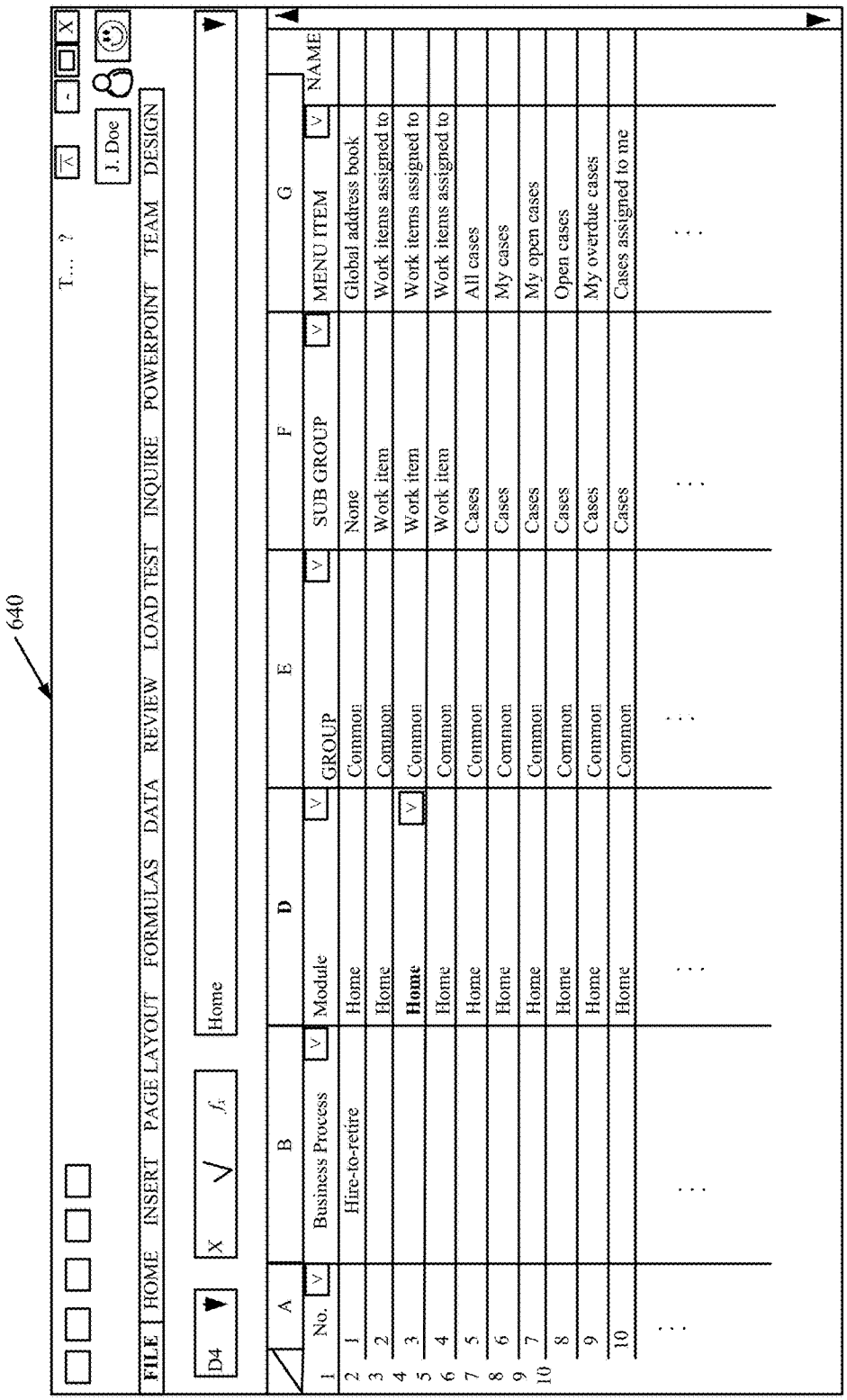

FIGS. 17 and 18 show examples of how component 583 can display the editable representation of the metadata for user approval and modification. FIG. 17, for instance, shows an example of a user interface display 634 that displays the metadata in a spreadsheet form and provides a user input mechanism 636 that enables the user to view it. When the user actuates user input mechanism 636, the spreadsheet showing the various metadata (e.g., identifying the entities, processes, configurations, modules, etc.) in the environment from which data is to be pulled, is displayed. FIG. 18 shows an example of a user interface display 640 that displays such a spreadsheet. The user can then edit the spreadsheet shown in FIG. 18, and upload the new version of the spreadsheet by actuating user input mechanism 642 in FIG. 17.

Figure 19:
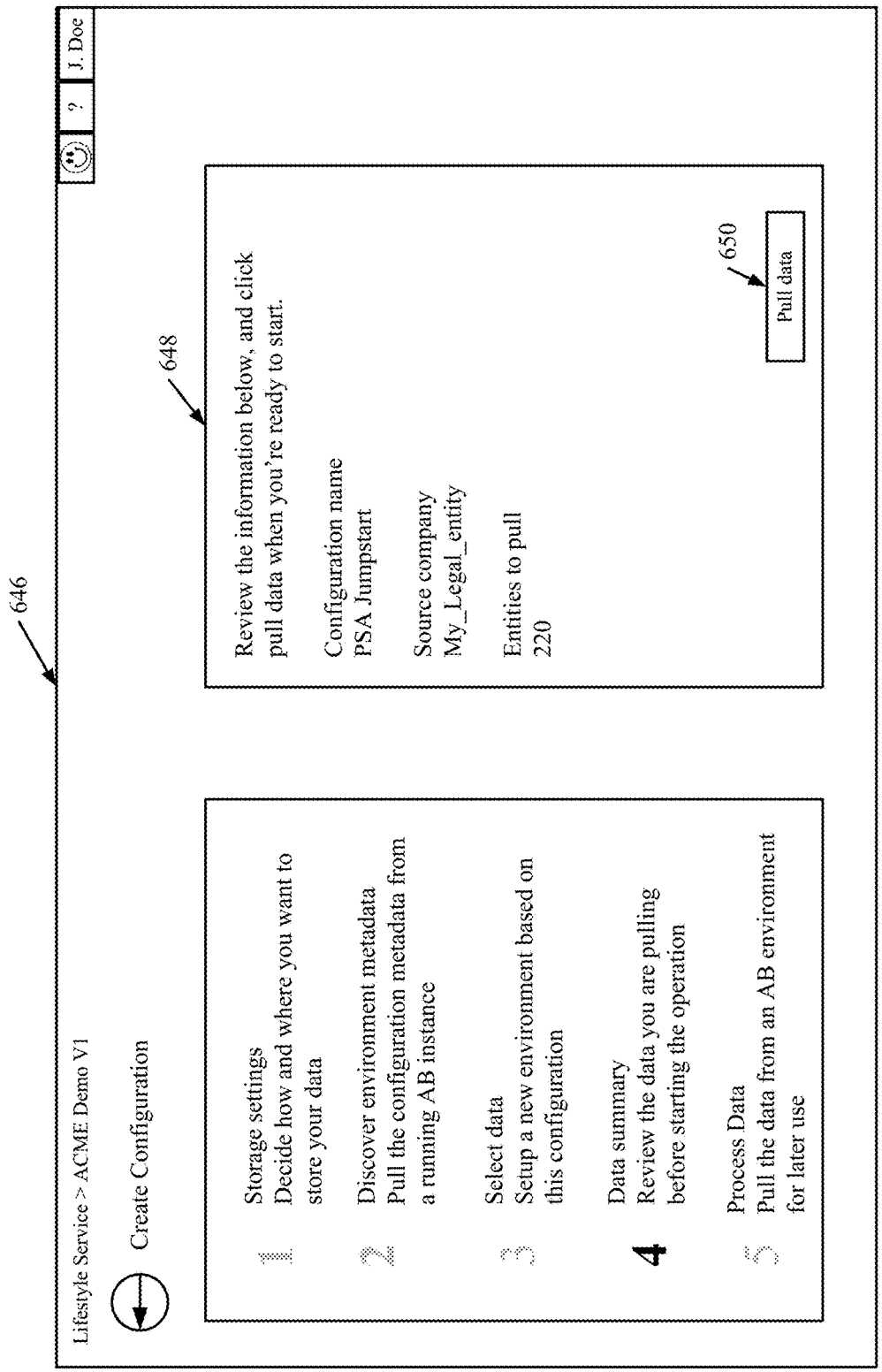

Component 583 then displays a summary of the data that is going to be pulled from the running instance of the application 126 in the identified environment. This is indicated by block 644 in the flow diagram of FIG. 6. FIG. 19 shows one example of a user interface display 646 that indicates this. It can be seen that the summary is displayed in summary display portion 648. It also displays a user input mechanism 650 that allows the user to confirm that the data is to be pulled is specified. Detecting the user actuation of the input mechanism 650 is indicated by block 652 in the flow diagram of FIG. 6.

Figure 20:
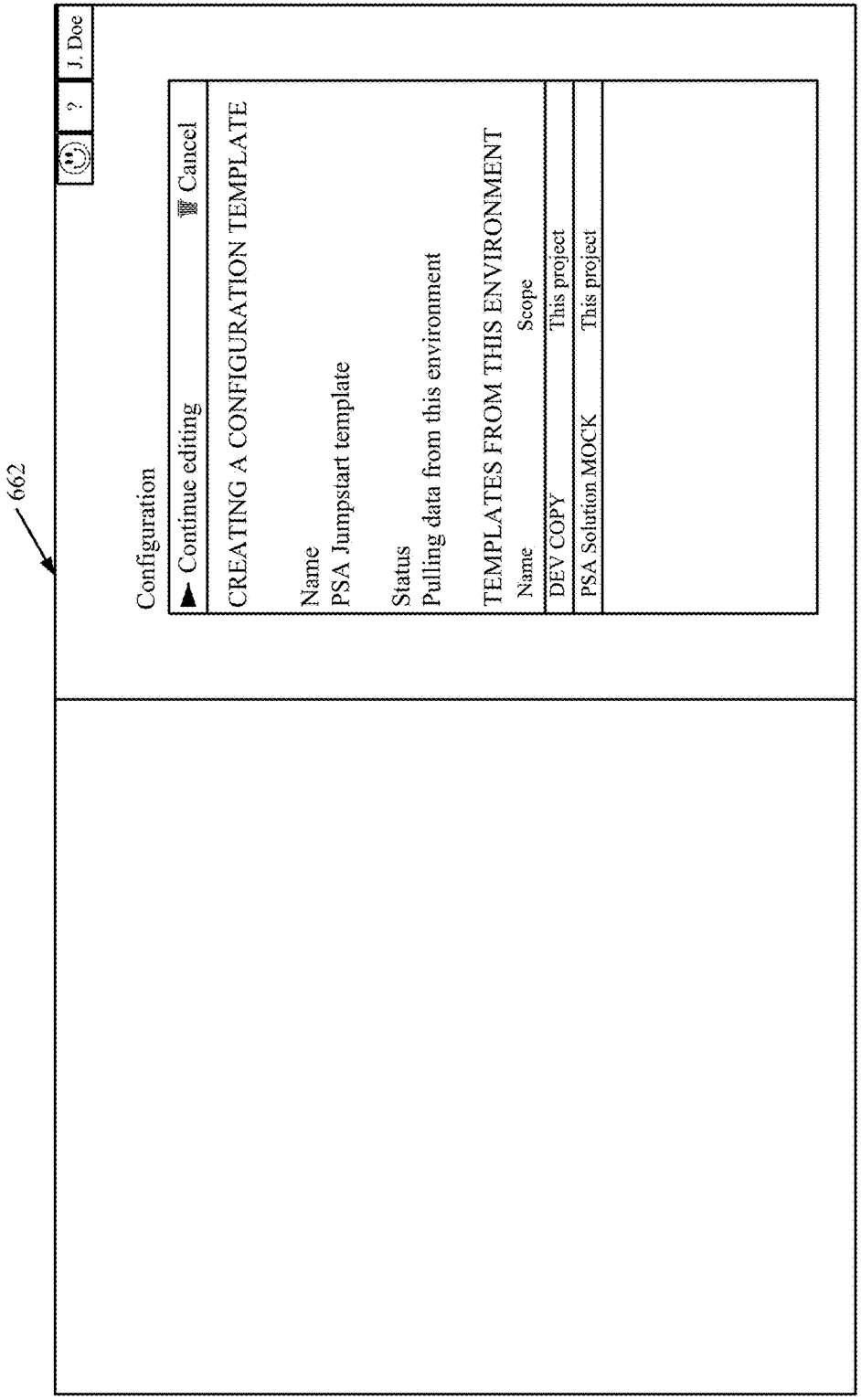

Setup data extraction component 585 can be part of metadata extraction component 583 or separate from it. For purposes of the present discussion it is shown separately. Component 585 extracts the setup data from the specified environment and pulls it into the data package being generated. This is indicated by block 654 in FIG. 6. It then generates and displays a representation of the setup data that was pulled for the data package for user modification and approval. This is indicated by block 656. Data extraction component 585 then detects any user modifications to the setup data that was pulled and stores it in the data package. Application instance data extractor 595 does the same for actual application data in the application instance where the data is to be taken from. It generates an editable representation of that data, surfaces it for user approval or modification, pulls the data from the application instance and stores it in the final data package so it can be imported into the deployed solution package. This is indicated by blocks 658 and 660, respectively, in FIG. 6. FIG. 20 shows one example of a user interface display 662 that illustrates that component 585 is pulling the data from the identified environment.

FIG. 8 is a flow diagram illustrating one example of the operation of data extraction component 585 in data package generator 194, in more detail. It is first assumed that, as described above with respect to FIG. 6, the process to start the automatic detection and extraction of set up data from a running instance of the application has been initiated. This is indicated by block 662 in FIG. 8.

For each of the processes enabled by the solution package, data extraction component 585 first selects one of those processes and accesses stored metadata on the running instance. Entity identifier 587 identifies a leading entity corresponding to the selected process. This is indicated by blocks 664 and 666 in FIG. 8.

Hierarchy traversal component 589 then analyzes the underlying table data that makes up the leading entity to generate a table hierarchy graph of tables that correspond to the process of the leading entity. This is indicated by block 668 in FIG. 8. In analyzing the table data for the leading entity, traversal component 589 illustratively analyzes the table relationships 670 and traverses those table relationships to leaf nodes in the hierarchy as indicated by block 672 to identify all tables that correspond to that entity. It can analyze the table types (such as whether they contain parameter information, transaction information, reference information, etc.). This is indicated by block 674. It can also analyze other table metadata, such as the table name, the module it corresponds to, etc. This is indicated by block 676.

For each table encountered in the table relationships, a node in the table hierarchy graph is entered. By way of example, the tables may have references to one another, or the entity may have a reference to various tables. The relationship information will indicate a hierarchical arrangement of those tables for that particular entity. For instance, a customer entity may have a group of tables. One table may contain the customer name, and another table may contain the customer contact information. The customer contact information table may be dependent on an address table that contains the customer's address, as well as on a telephone number table that contains the customer's telephone number, etc. All of these types of relationships are analyzed to generate a table hierarchy graph that identifies the table, and their hierarchical relationship relative to one another.

Figure 9:
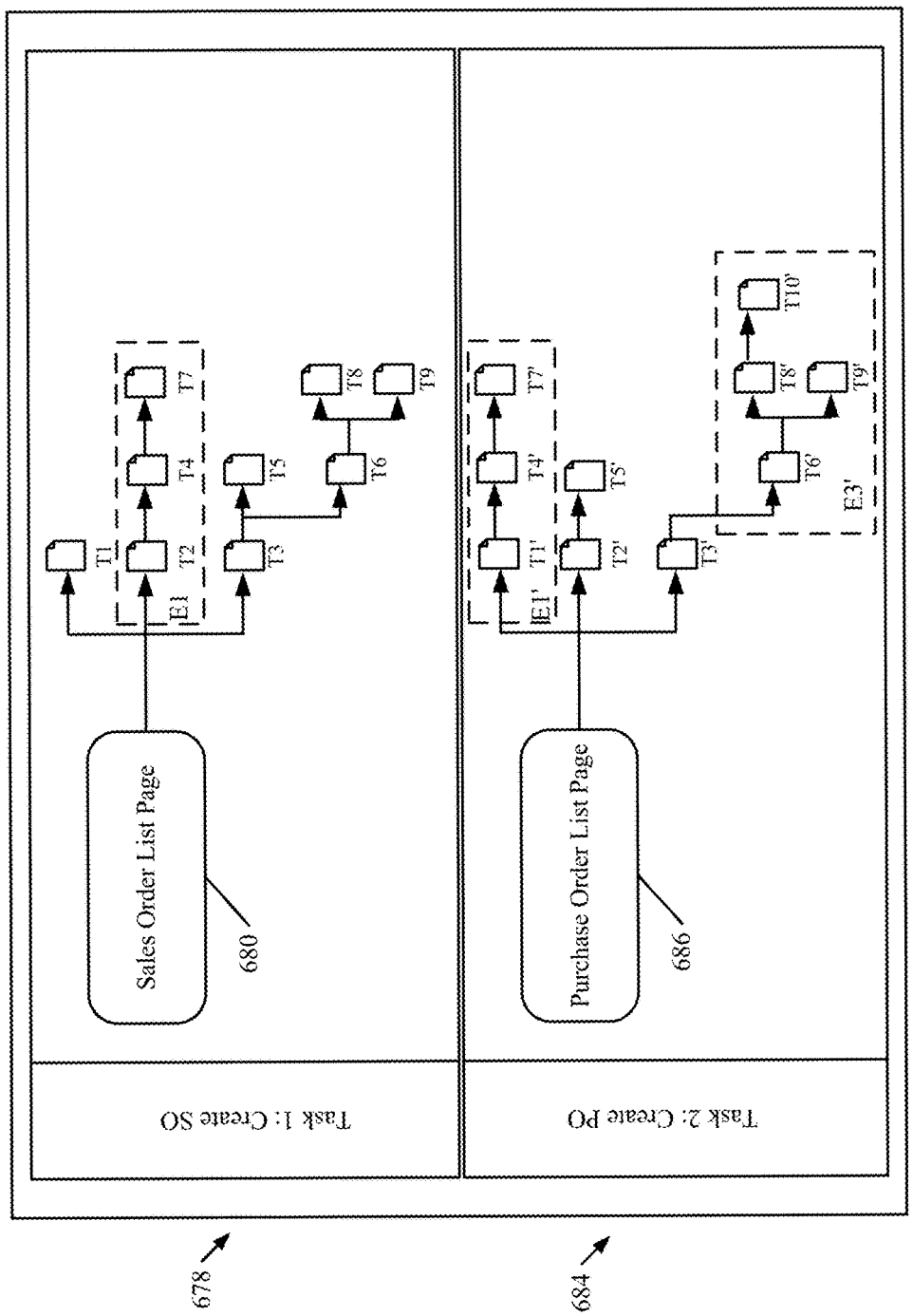
FIG. 9 is a block diagram of one example of a table hierarchy graph for two different tasks or processes.

FIG. 9 shows such a table hierarchy graph for two different processes or tasks. The top part of Table 9 corresponds to create sales order task 678. Entity identifier 587 has identified the "Sales Order List Page" entity 680 as the leading entity for that task. That entity relies on tables T1, T2 and T3. Table T2 relies on table T4 which, itself, relies on table 7. Table T3, itself, illustratively relies on tables T5 and T6 and table T6 relies on tables T8 and T9. By following the table relationships and other table information, hierarchy traversal component 589 identifies tables T1-T9 and creates a table hierarchy graph for them. For each table in the hierarchy graph, graph generator 591 determines whether that table is a part of an entity. If so, it replaces the table in the hierarchy graph with the entity that it belongs to. By way of example, it can be seen that table T2 in FIG. 9 belongs to entity E1. Therefore, graph generator 591 replaces table T2 in the hierarchy shown in FIG. 9 with the entity E1. Replacing a table with an entity in this way is indicated by block 682 in the flow diagram of FIG. 8.

The lower portion of FIG. 9 shows another example in which a table hierarchy graph is generated for the create purchase order task 684. It can be seen that entity identifier 587 has identified the "Purchase Order List Page" entity 686 as the leading entity for that task. FIG. 9 shows that the table hierarchy graph contains a set of tables T1'-T10'. However, table T1' belongs to entity E1' and table T6' belongs to entity E3. Therefore, graph generator 591 has replaced those tables with the corresponding entities.

Data extraction component 585 then stores the hierarchy graph that was generated for the selected process. This is indicated by block 688. It then determines whether there are more processes as indicated by block 690 and, if so, processing reverts to block 664 where the next process is selected. If not, then data extraction component 585 illustratively stores the editable representation of the hierarchy graph so that it can be reviewed by the user and either approved or modified. This is indicated by block 692.

FIG. 21 shows one example of a user interface display 694 that indicates this. It can be seen in display 694 that a template displays the different groups of data (e.g., master, transaction, parameter, setup, etc.) as well as the various entities contained in that data. A user can select one of the entities from the entity list, actuate the download user input mechanism and view a spreadsheet of information corresponding to that entity. The user can modify or approve the entity and upload the spreadsheet and then mark it completed or approved using the "Complete" or "Approved" actuators, respectively. The user can also actuate the tabs in display 694 to see the entities that are needed to deploy the solution, as well as those that have preset values. The user can also review the data groups by type, by process, by module, etc., by actuating the corresponding tabs. In addition, in one example, data package generator 194 illustratively displays a metric indicating how much of each data group has been completed and approved. If the data is completely extracted, then the percent complete will indicate this. If it has been approved, then a check mark will be displayed adjacent that group of information. For instance, FIG. 21 shows that the transaction group of data has been 100% uploaded and has all been approved.

Figure 22:
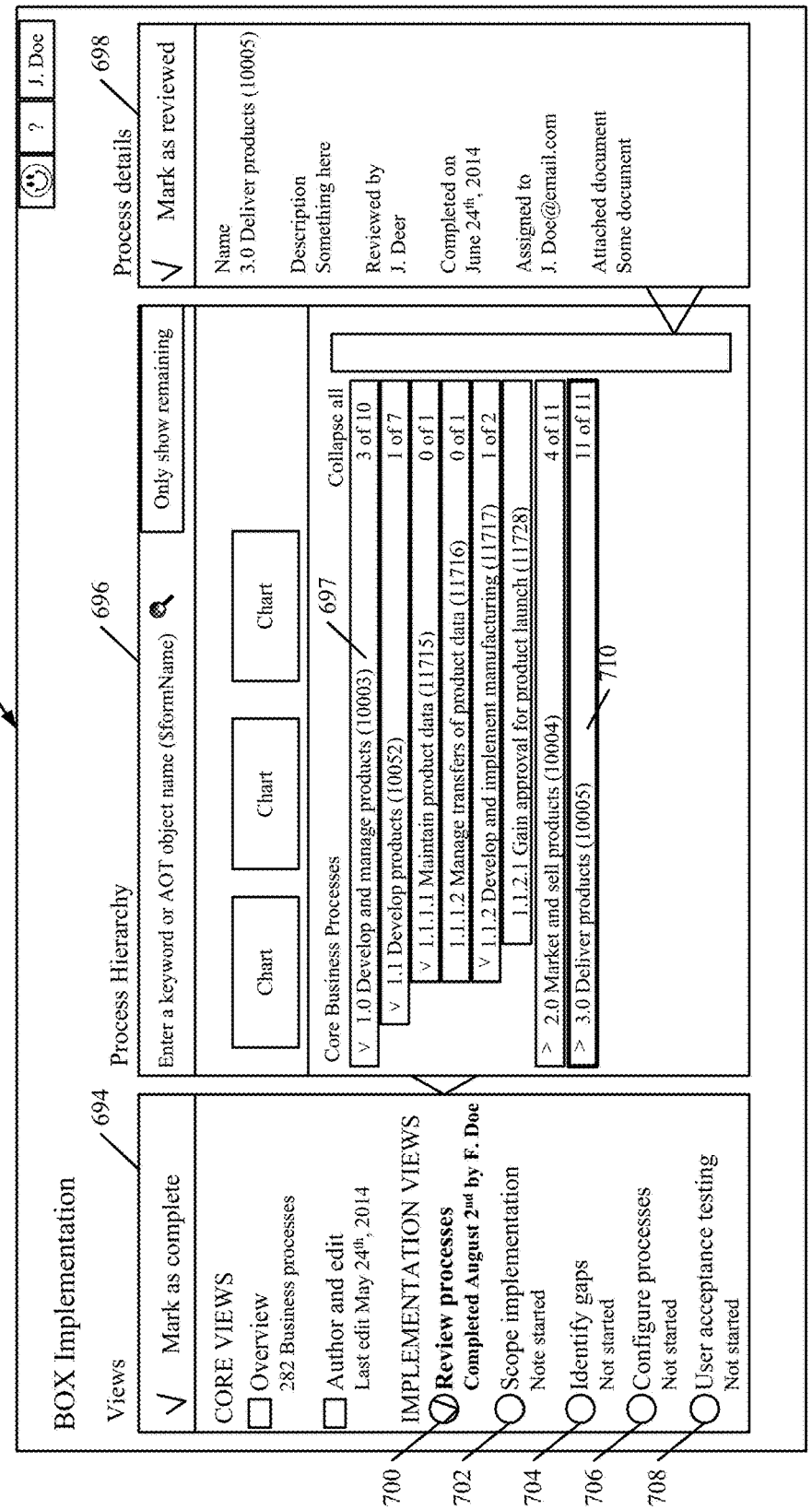

Before describing the deployment process in more detail, a number of additional user interface displays that can be generated by package preparation component 196 in order to prepare a package for deployment will first be described. FIGS. 22-26 are examples of these. FIG. 22 shows one example of a user interface display 692. User interface display 692 can be used to match processes with the particular configuration that is going to be deployed. Display 692 shows a views portion 694, a hierarchy display portion 696 and a process details display portion 698. It can be seen that the user can select one of a plurality of different implementation views by selecting one of user input mechanisms 700-708. For instance, if the user actuates the user input mechanism 700 corresponding to the "Review Processes" process, then the hierarchy displayed at 696 (and particularly the core business processes hierarchy 697) displays the hierarchy for purposes of that selected process. Process details display portion 698 displays the details corresponding to the "Review Processes" process. In the example shown in FIG. 22, the user has actuated mechanism 700. Therefore, the core processes hierarchy 697 identifies the core processes, in their hierarchical relationship, and process details display portion 698 displays the process details for a selected process that is selected in hierarchy 697. It can be seen that the user has selected the "3.0 Deliver Products" process 710 in hierarchy 697. Therefore, the process details portion 698 displays details corresponding to that selected process. The information relates to the "Review Processes" process implementation view that was selected. Therefore, details 698 show who reviewed the selected process 710, when that review was completed, who it was assigned to, etc. All of this information relates to the "Review Processes" implementation view for the "Deliver Products" process 710.

Figure 23:
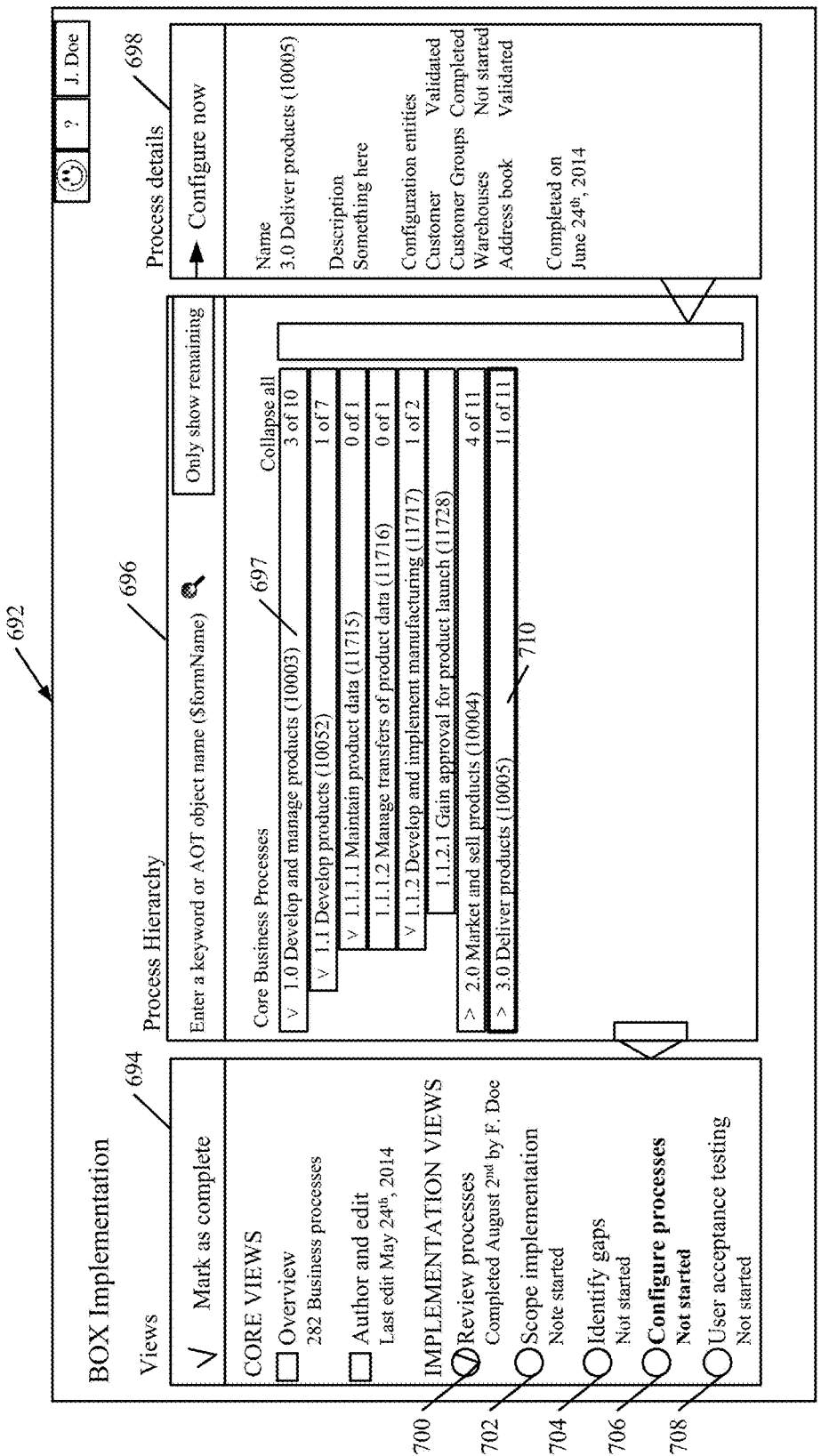

If the user actuates a different user input mechanism corresponding to a different implementation view, then the other information also changes. FIG. 23 shows one example of a user interface display 712 that indicates this. It can now be seen that the user has actuated the user input mechanism 706 corresponding to the "Configure Processes" implementation view. Again, the user has selected the "Deliver Products" process 710 from hierarchy 697. However, it can now be seen that the details display portion 698 displays details for the selected process 710 that relate to the "Configure Processes" implementation view. It thus shows the configuration entities, and the status of the configuration (e.g., validated, completed, not started, etc.).

Figure 24:
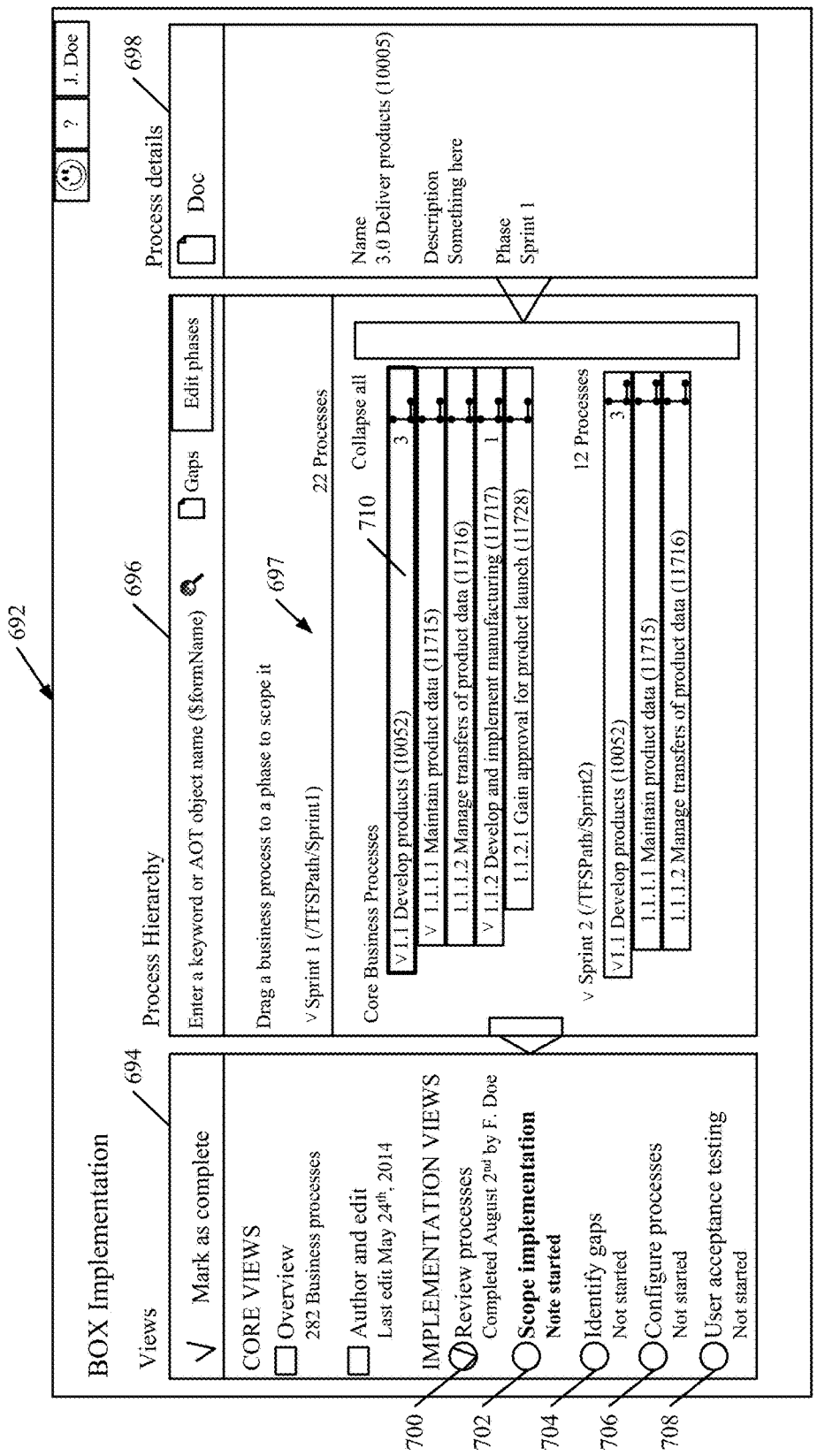

FIG. 24 is similar to FIG. 23, and similar items are similarly numbered. However, it can now be seen that the user has selected user input mechanism 702 corresponding to the "Scope Implementation" view. Therefore, the hierarchy 697 is modified and user input mechanisms are provided that allow the user to change the scope of a given process in process hierarchy section 696. Also, the process details are provided from the perspective of the "Scope Implementation" view instead of the "Configure Processes" implementation view.

Figure 25:
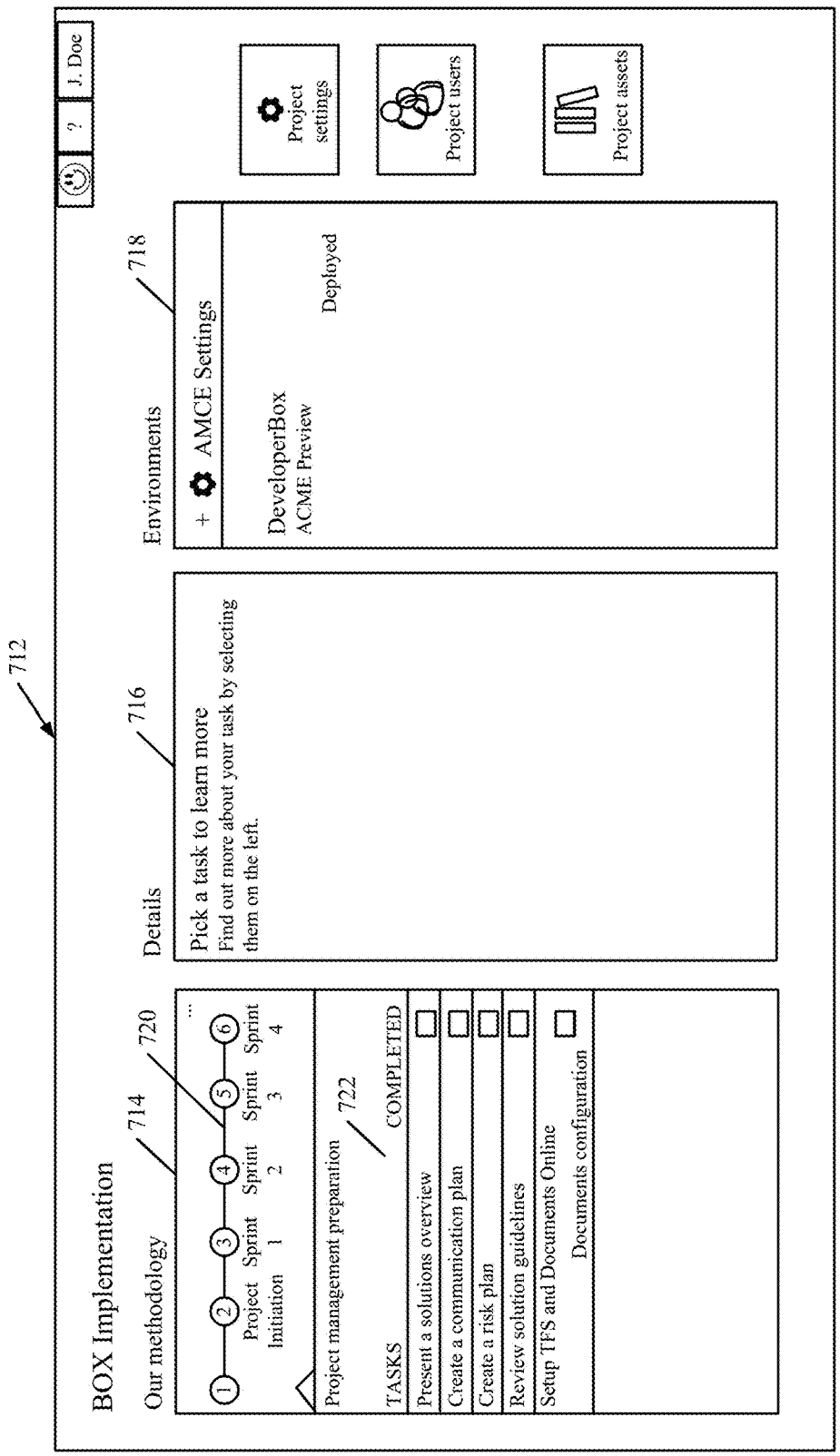

FIG. 25 shows another example of a user interface display 712 that can be generated by package preparation component 196. It illustratively includes a methodology display portion 714, a details display portion 716, and an environments display portion 718. Methodology display portion 714 illustratively includes a graphical representation 720 of a methodology that is used to prepare the solution package for deployment. It includes a grid view 722 that identifies the various tasks that are to be completed according to that methodology. For a selected task, details display portion 716 displays details corresponding to that task.

Figure 26:
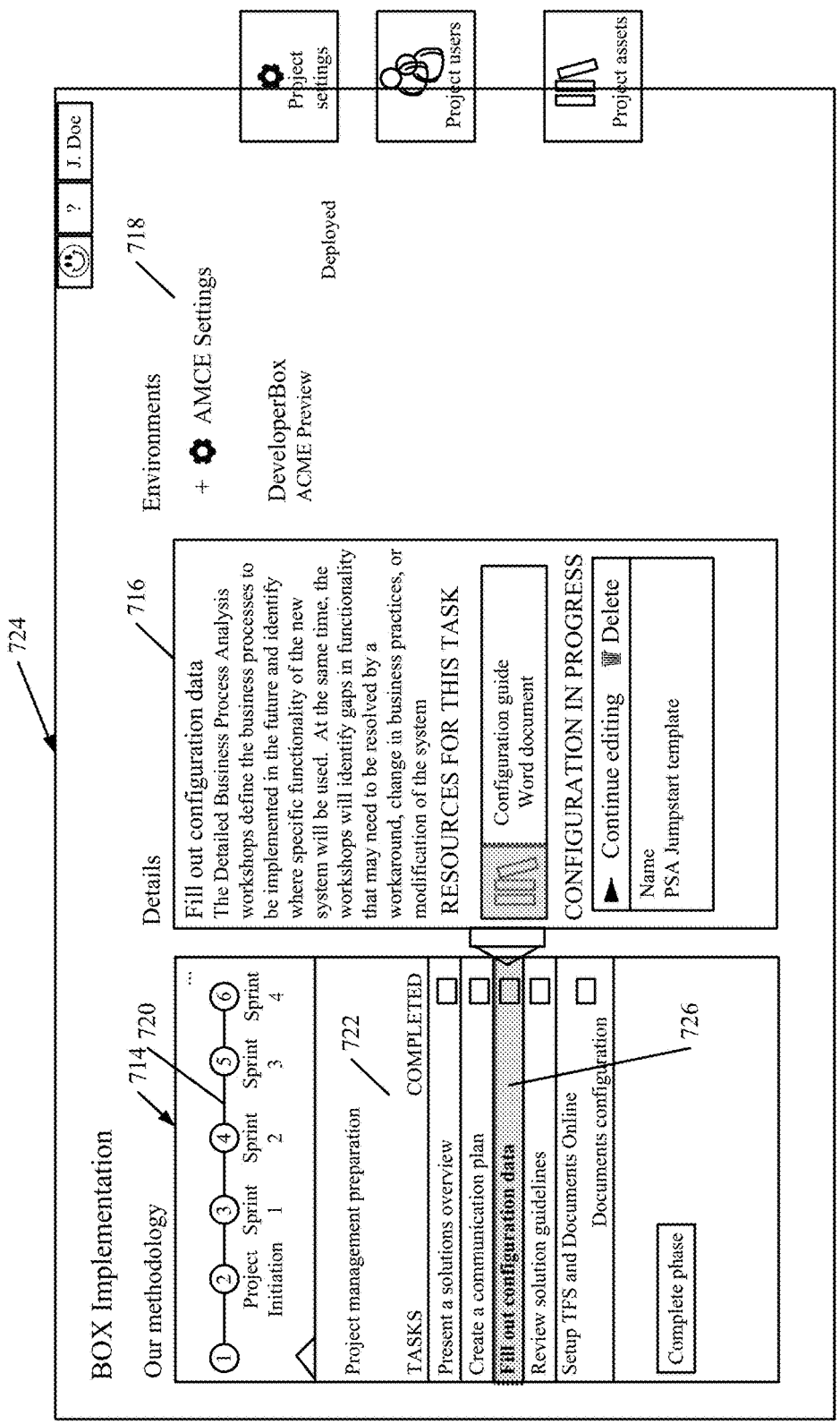

FIG. 26 shows one example of a user interface display 724 that indicates this. It can be seen in display 724 that the user has now selected a "Fill-Out Configuration Data" task represented by 726. Thus, details display portion 716 displays details corresponding to that particular task that is to be done to prepare the selected solution package for deployment. This type of information can be stored in data store 202 on solution package deployment system 106, or in other places.

FIG. 27 shows another example of a user interface display 730 that can be used to deploy a prepared solution package. Display 730 illustratively includes a deploy environment actuator 732 that can be actuated to display information corresponding to the environment where the prepared solution package is to be deployed. It also includes virtual machine information 734 that identifies the various instances of different virtual machines, and their sizes, that will be used in the deployment. Further, it includes a "Deploy Now" user input mechanism 736 that can be actuated for deployment component 190 to begin deployment of the solution package. The prepared solution package can be saved for later deployment by actuating user input mechanism 738.

Figure 28:
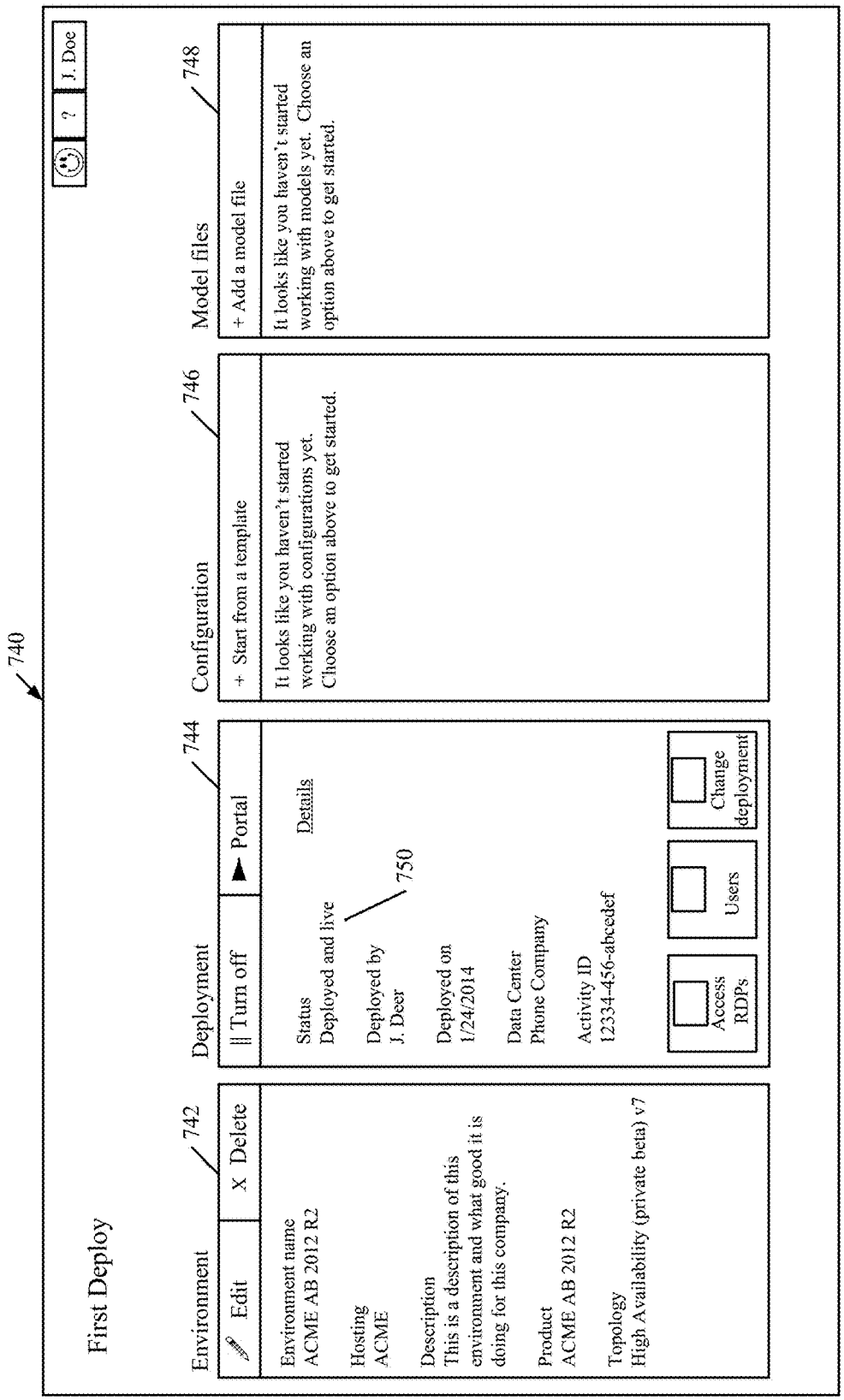

Once deployment component 190 has successfully deployed the solution package, a user interface display can be generated to indicate this. For instance, FIG. 28 shows one example of a user interface display 740 that indicates this. It identifies an environment at 742 and gives details about the deployment at 744. It provides information about configuration at 746, model files at 748, etc. It can be seen in FIG. 28, that the deployment described at 744 is deployed and alive. This is displayed by status indicator 750. A variety of other information corresponding to the deployment can be displayed as well.

Figure 10:
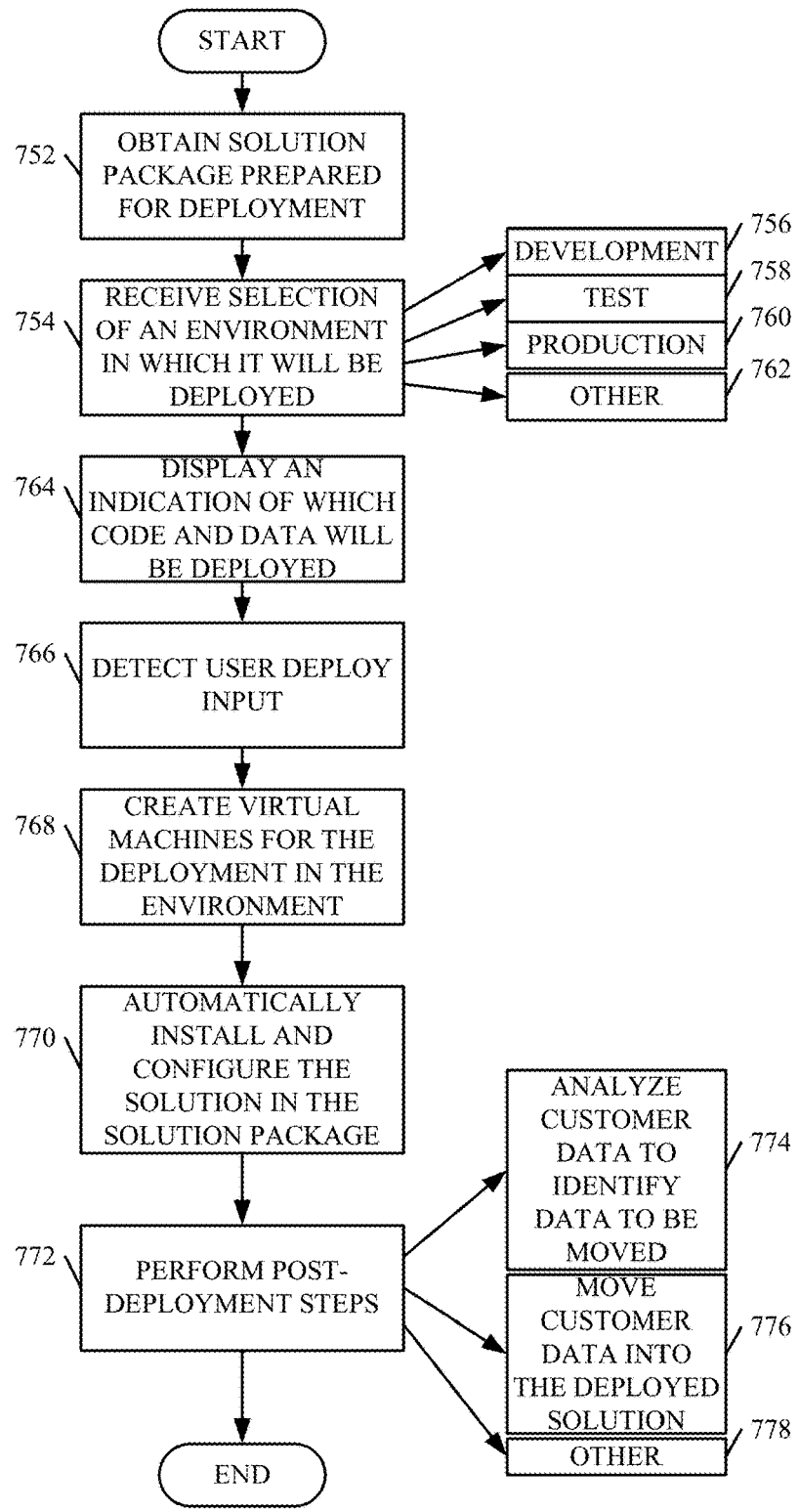
FIG. 10 is a flow diagram illustrating one example of the operation of a solution package deployment system (shown in FIG. 1) in deploying a solution package to an end user system.

FIG. 10 is a flow diagram illustrating one example of the operation of deployment component 190 in deploying a solution package that has already been prepared for deployment. It first obtains that solution package as indicated by block 752. It then receives a selection of an environment in which it will be deployed (if it has not already done so) as indicated by block 754. For instance, the person deploying the solution package may deploy it in a development environment 756, in a test environment 758, in a production environment 760, or in another environment 762. Deployment component 190 then generates a display showing an indication of which code and which data will be deployed in that environment. This is indicated by block 764. It then detects a user deploy input (such as the user actuating user input mechanism 736 in FIG. 27). This is indicated by block 766. It then creates the virtual machines needed for the deployment in the identified environment. This is indicated by block 768. It automatically installs and configures the solution defined by the solution package. This is indicated by block 770. It then performs post-deployment steps, as indicated by block 772. For instance, the post-deployment steps may be to analyze customer data to identify data that is to be moved into the new deployment. This is indicated by block 774. This was described above with respect to creating a data package. It may also involve moving the customer data into the deployed solution as indicated by block 776, or other post-deployment steps as indicated by block 778.

Figure 11:
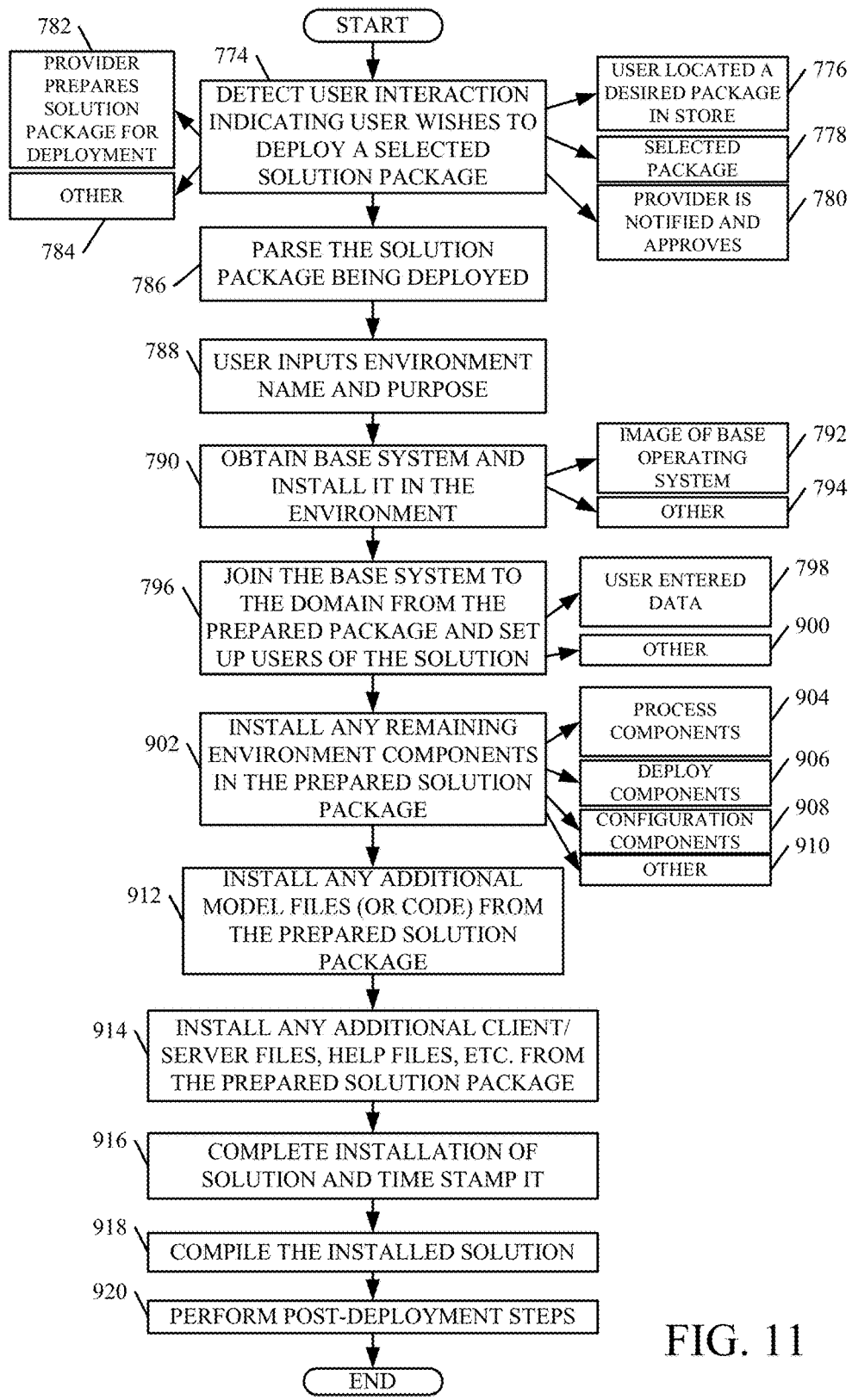
FIG. 11 shows a flow diagram illustrating one example of the operation of the solution package deployment system in more detail.

FIG. 11 shows a flow diagram illustrating one example of the operation of package deployment component 190 in more detail. It is first assumed that component 190 has detected a user interaction indicating that the user wishes to deploy a selected solution package. This is indicated by block 774. It is also assumed that the user located the package in the verified package store 182, as indicated by block 776. The user then selected the package as indicated by block 778. The provider has been notified and approved of the package as indicated by block 780, and the provider (or the user, or both) have prepared the solution package for deployment. This is indicated by block 782. Other steps can be taken as well, as indicated by block 784.

Deployment component 190 then parses the solution package being deployed, as indicated by block 786. It detects user inputs identifying an environment name and purpose for the deployment, as indicated by block 788. It obtains a base system, upon which the solution package was generated, and installs it in the identified environment. This is indicated by block 790. This may include an image of the base operating system as indicated by block 792, and other information as indicated by block 794.

It then joins the base system to the domain of the environment, from the prepared solution package, and sets up users of the deployed solution. This is indicated by block 796. The users can be generated based on user-entered data, as indicated by block 798, or otherwise as indicated by block 900.

It then installs any remaining environment components in the prepared solution package. This is indicated by block 902. For instance, they can include process component 904, deployment components 906, configuration components 908, or other components in the prepared solution package as indicated by block 910.

Deployment component 190 then installs any additional model files (or code) from the prepared solution package. This is indicated by block 912. It installs any additional client-server files, help files, etc., from the prepared solution package. This is indicated by block 914. It then completes the installation of the solution and marks it with a timestamp. This is indicated by block 916. It then compiles the installed solution as indicated by block 918 and finally performs post-deployment steps as indicated by block 920.

At this point, the solution is fully deployed, and is available for use in the environment in which it was deployed (e.g., in the development environment, test environment, production environment, etc.).

Figure 12:
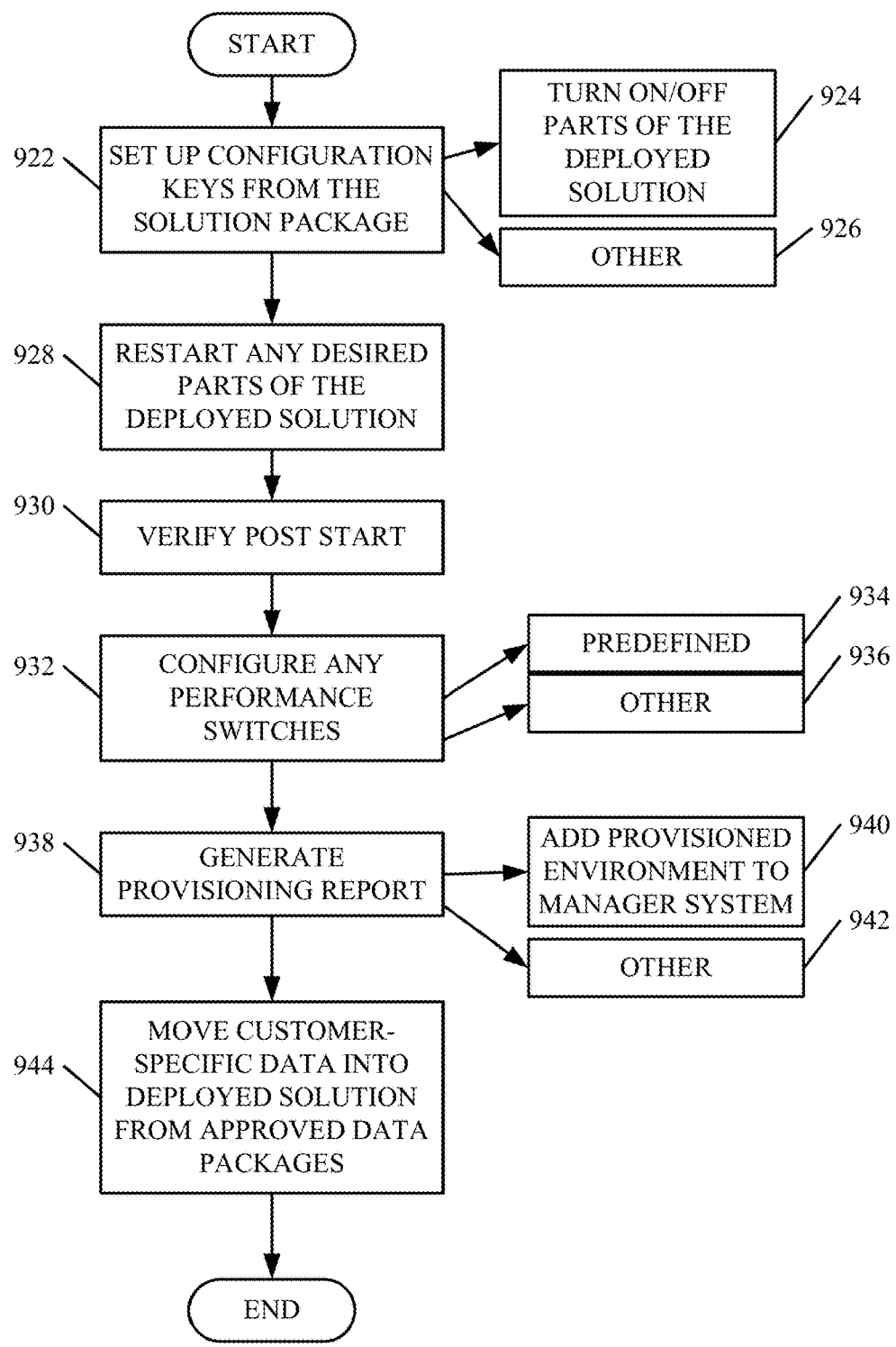
FIG. 12 is a flow diagram illustrating one example of the operation of the solution package deployment system of FIG. 1 in performing post-deployment steps.

FIG. 12 is a flow diagram illustrating one example of different post-deployment steps that can be performed by deployment component 190. For instance, once the solution is deployed, a set of setup configuration keys can be applied from the solution package. This is indicated by block 922. These keys can be used, for instance, to turn on and off parts of the deployed solution, as indicated by the configuration keys. This is indicated by block 924. They can be used to perform other configuration steps as well, as indicated by block 926.

Component 190 then restarts any desired parts of the deployed solution and verifies that they are up and running, after they are restarted. This is indicated by blocks 928 and 930, respectively.

It can then configure any desired performance switches as indicated by block 932. The performance switches are switches which can further modify or configure the operation of the deployed solution in order to enhance its performance. These performance switches can be predefined as indicated by block 934, or they can be derived or obtained elsewhere, as indicated by block 936.

Deployment component 190 then illustratively generates a provisioning report as indicated by block 938. This can include adding the provision environment to a management system that can be used to manage the deployed solution. This is indicated by block 940. Generating the provisioning report can include other steps as well, as indicated by block 942. Deployment component 190 can move customer-specific data into the deployed solution from the approved data packages. This is indicated by block 944.

Figure 13:
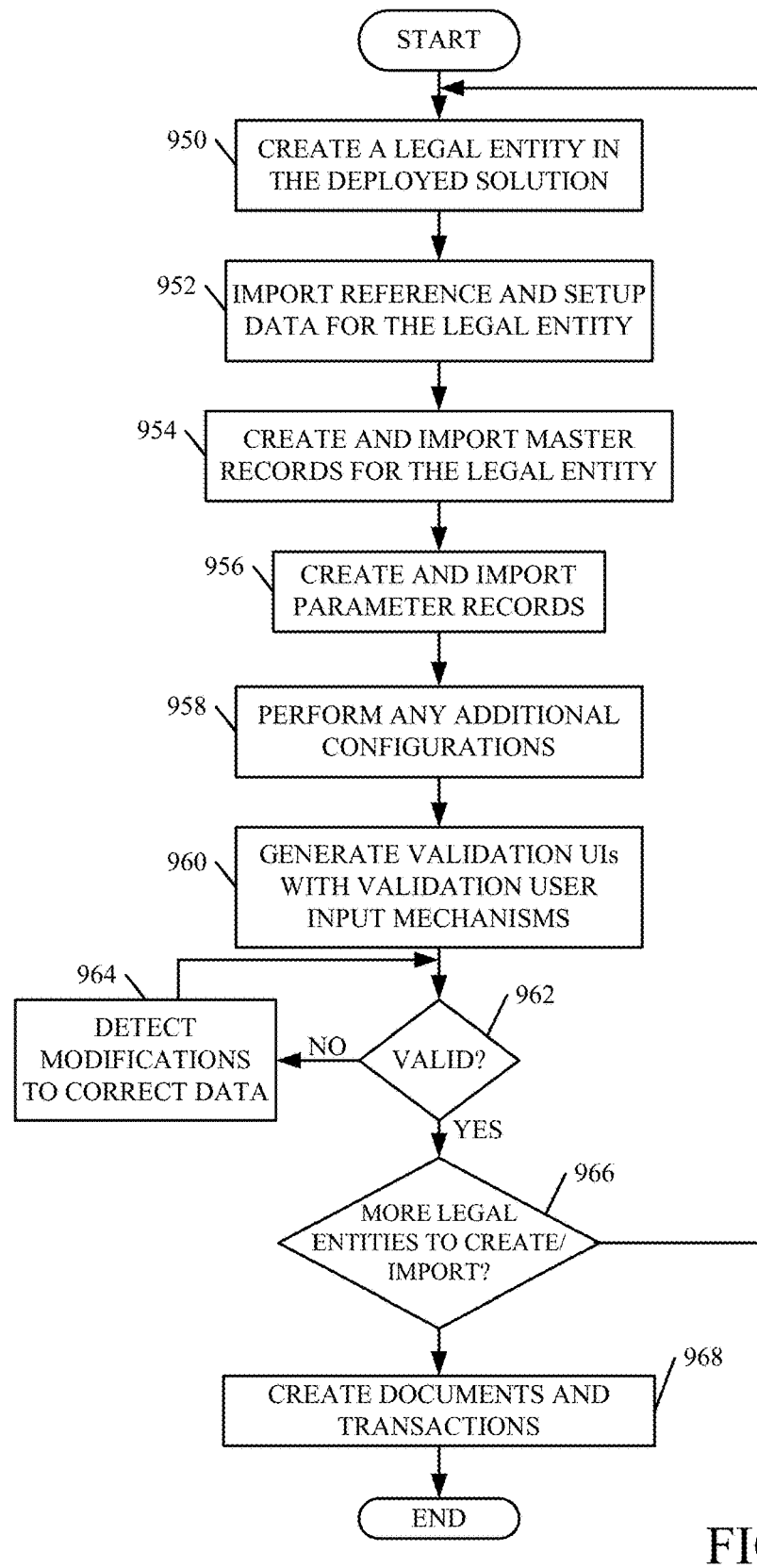
FIG. 13 is a flow diagram illustrating one example of the operation of the solution package deployment system shown in FIG. 1 is moving data from a data package to a deployed solution.

FIG. 13 is a flow diagram illustrating one example of how data is moved from the approved data packages into the deployed solution, in more detail. Deployment component 190 first creates a legal entity in the deployed solution. This is indicated by block 950. The legal entity, for instance, may be the name of an organization, a customer, a vendor, etc. It then imports reference data and setup data for the legal entity, from the prepared data package. This is indicated by block 952.

Component 190 then creates and imports master data records for that legal entity. This is indicated by block 954. The master data records, for instance, may include master data records that are used by the end user organization. If the end user organization is an airline, for instance, then the master data records may include such things as plane types that are used by that airline, etc.

Component 190 then creates parameter records and imports the parameter data from the data package. This is indicated by block 956. Continuing on with the airline scenario, the parameter records may include such things as how much the airline will overbook its capacity for each type of airplane.

Component 190 then performs any additional configurations as indicated by block 958 and generates validation user interface displays, with validation user input mechanisms, so that the data can be validated before it is used. This is indicated by block 960. If it is not valid, then a user can modify it so that it can be validated. This is indicated by blocks 962 and 964 in FIG. 13.

Component 190 then determines whether there are any more legal entities to create, and for which data is to be imported. This is indicated by block 966. If so, processing reverts to block 950. If not, however, then component 190 creates any documents and/or transactions, as well as the data for those, in the system. This is indicated by block 968. By way of example, just before the solution is to go live, all of the current documents and transactions being used on the existing instance of the application in the end user system need to be moved as well. This is so that users that are using those documents and transactions can continue to operate on them.

The present system thus provides significant advantages. The system enables a provider 114 to generate a solution package for a given industry that can be reused multiple times for different end user organizations in that industry. Because the end user organizations start from a common solution package, they can more easily and quickly deploy updates and perform maintenance on the system. This reduces errors and increases the efficiency of the computing system itself.

The verification and distribution system advantageously exposes the solution packages, on a restricted basis, to a variety of different end users. The end users can see different information, depending upon who they are, the organization they work for, their role within that organization, etc. This allows a plurality of end user organizations to browse available solutions at one location, without disclosing proprietary information of the providers 114. This significantly saves on the processing overhead for both the end user organizations and system 104, because the end user organizations need not navigate to a plurality of different provider sites, and the providers themselves need not host traffic in that way. This advantageously reduces network traffic and improves the efficiency of all systems involved.

Deployment system 106 advantageously deploys a solution package with virtually no interaction by a user. The user need only provide an input indicating that the prepared solution package is to be deployed, and it is automatically deployed. This greatly enhances the efficiency of the deployment system. It can deploy a solution based on a solution package in a fraction of the time that is needed to deploy a solution from a customized base system, without starting from a solution package. This is because each such deployment is a highly customized deployment which requires a great deal of processing overhead, memory, and network traffic. Instead, by starting from a solution package and automatically deploying the solution from that package, it reduces processing overhead, network traffic, and it greatly enhances the accuracy of the deployment and thus the accuracy of the deployed computing system. Further, it greatly enhances the maintenance operations for the deployed solution.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 29:
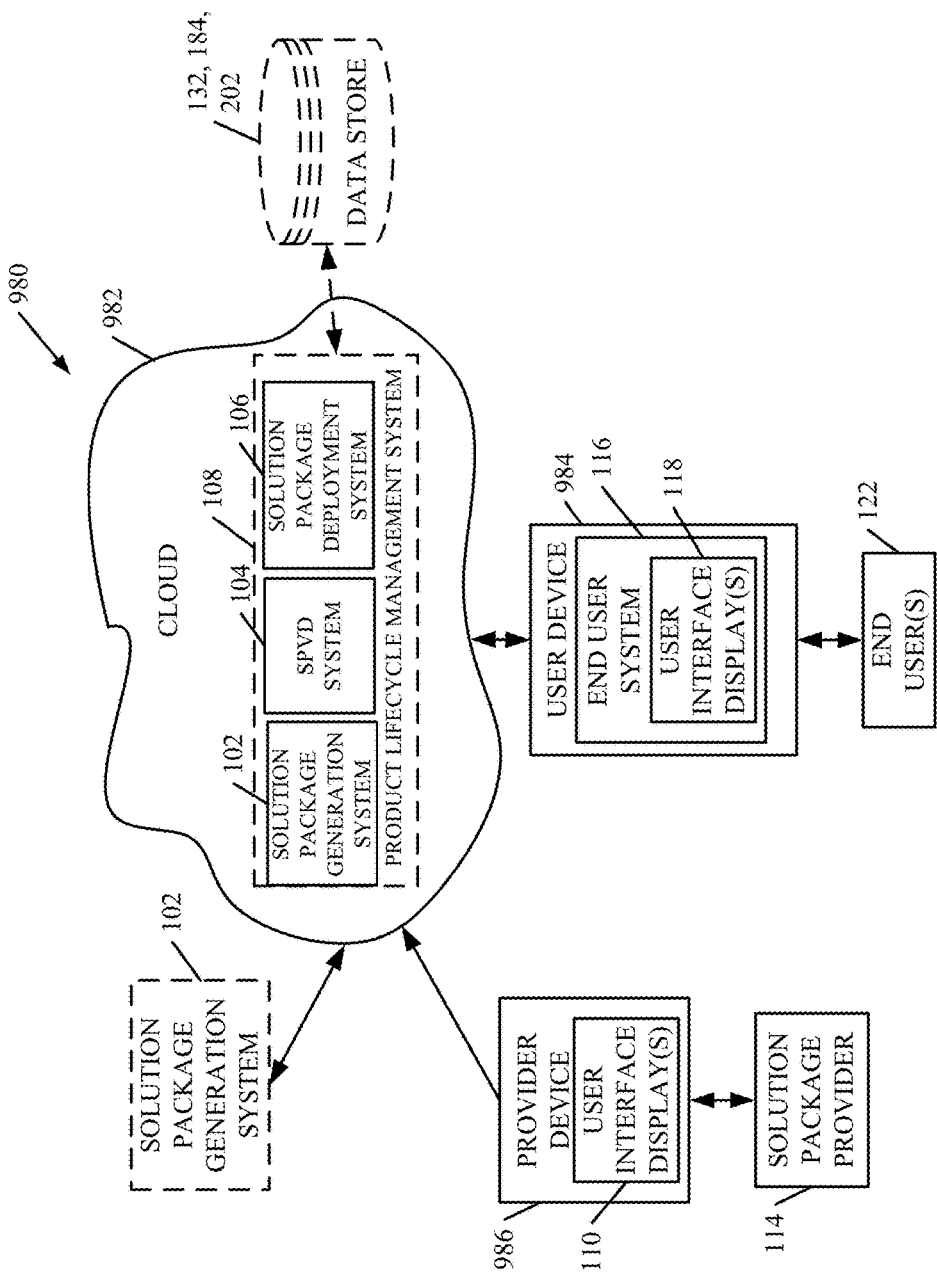
FIG. 29 shows a block diagram of the architecture of FIG. 1, deployed in a cloud computing architecture.

FIG. 29 is a block diagram of architecture 100, shown in FIG. 1, except that its elements are disposed in a cloud computing architecture 980. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 29, some items are similar to those shown in FIG. 1 and they are similarly numbered. FIG. 29 specifically shows that systems 102, 104, 106 and/or 108 can be located in cloud 982 (which can be public, private, or a combination where portions are public while others are private). Therefore, user 122 can use a user device 984 to access those systems through cloud 982. Provider 114 can also use a provider device 986 to access systems 102-108.

FIG. 29 also depicts another example of a cloud architecture. FIG. 29 shows that it is also contemplated that some elements of architecture 100 can be disposed in cloud 982 while others are not. By way of example, data stores 132, 184 and 202 can be disposed outside of cloud 982, and accessed through cloud 982. In another example, solution package generation system 102 can also be outside of cloud 982. Regardless of where they are located, they can be accessed directly by devices 984 and 986, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 30:
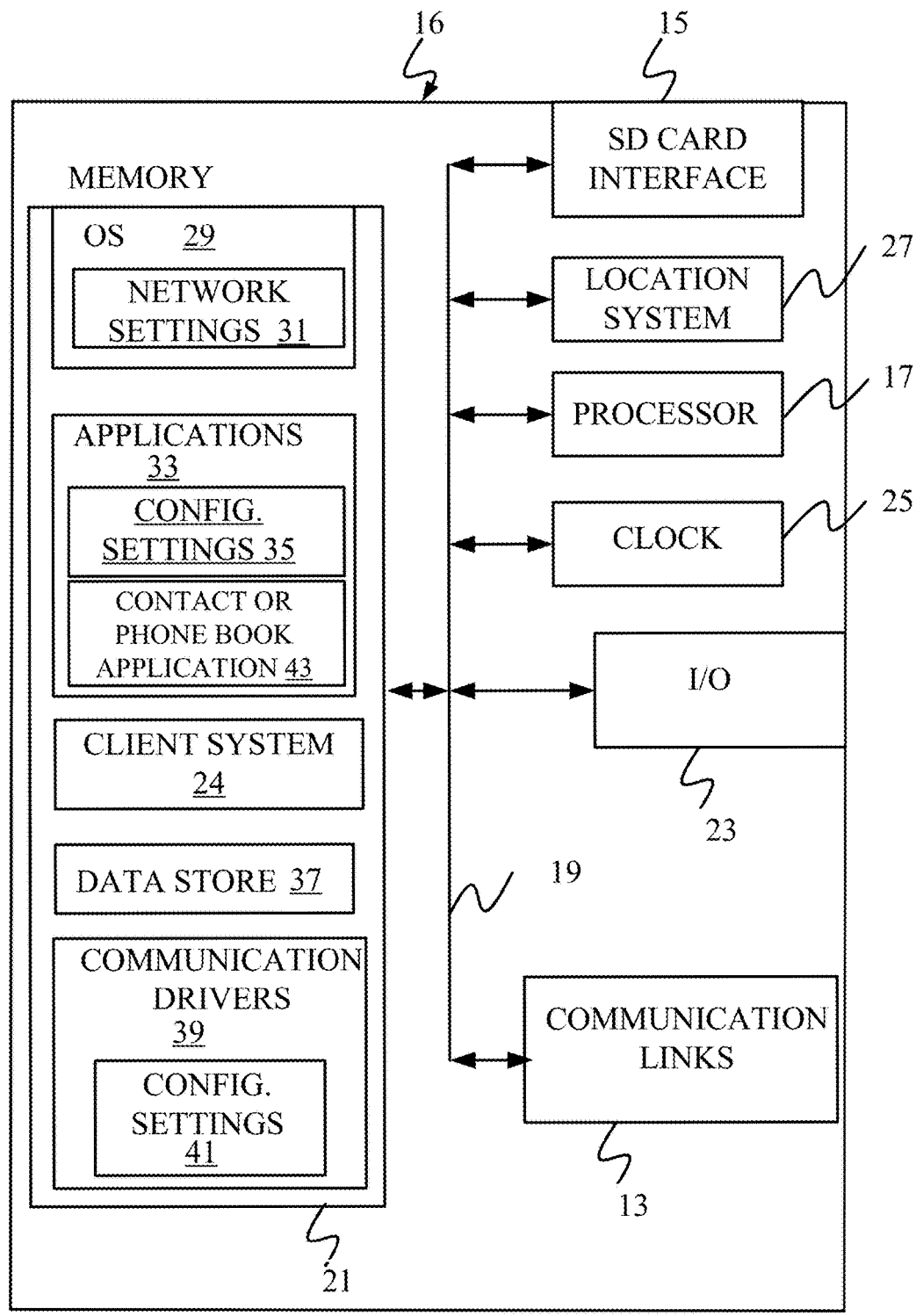
FIGS. 30-32 show examples of mobile devices that can be used in the above architectures.
Figure 31:
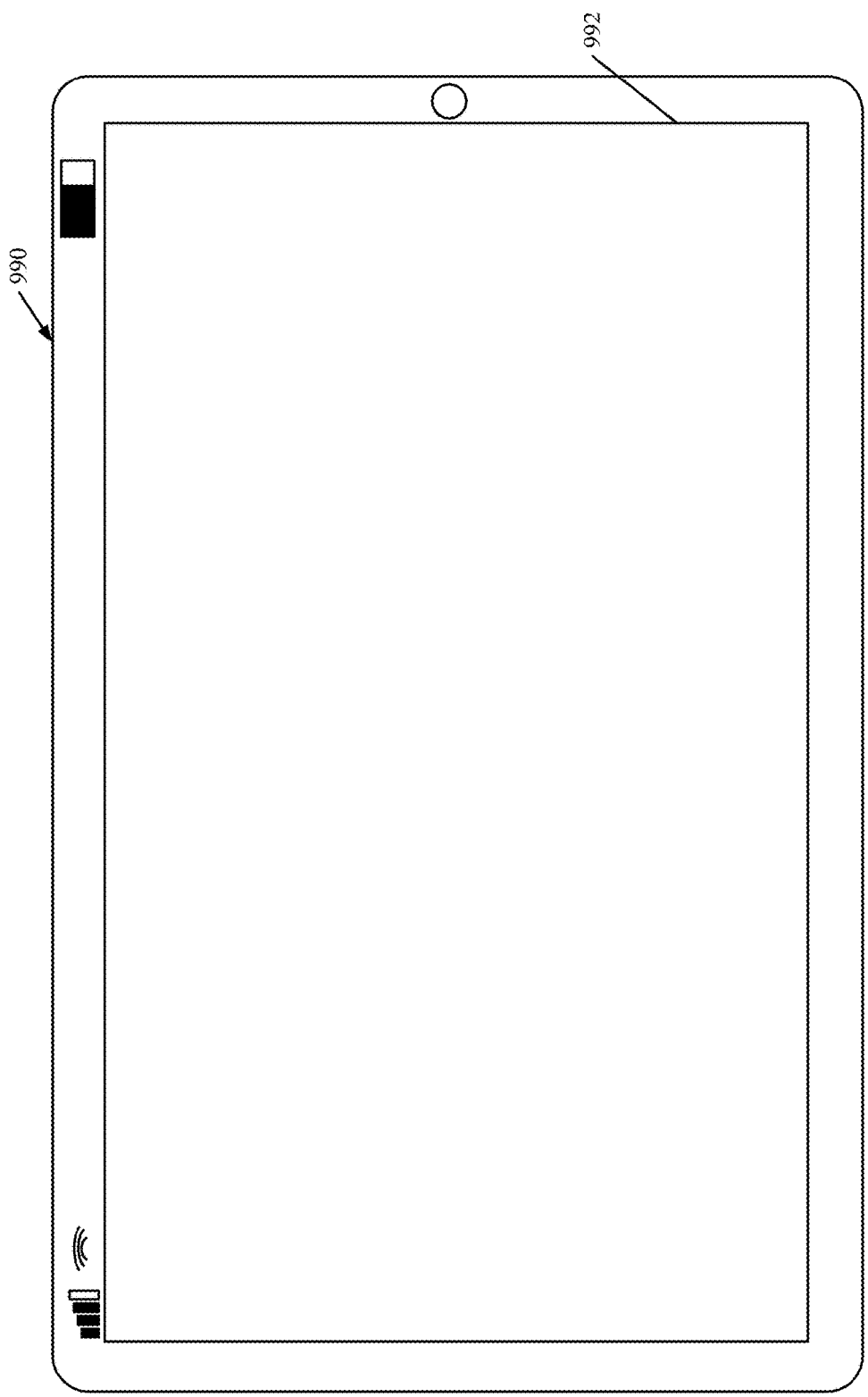
Figure 32:
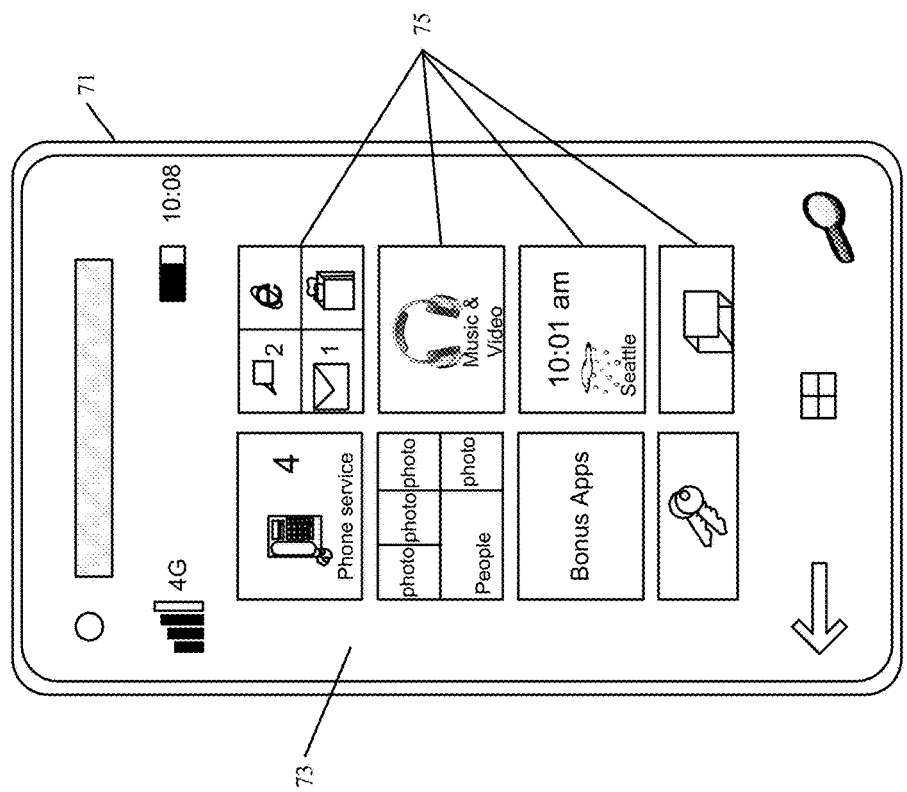

FIG. 30 is a simplified block diagram of one illustrative embodiment of a handheld or mobile computing device that can be used as a user's or client's hand held device 16, in which the present system (or parts of it) can be deployed. FIGS. 31-32 are examples of handheld or mobile devices.

FIG. 30 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

Under other examples, applications or systems are received on a removable Secure Digital (SD) card that is connected to a SD card interface 15. SD card interface 15 and communication links 13 communicate with a processor 17 (which can also embody any of the processors from FIG. 1 or those in devices 984 and/or 986) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 31 shows one example in which device 16 is a tablet computer 600. In FIG. 31, computer 990 is shown with user interface screen 992. Screen 992 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 990 can also illustratively receive voice inputs as well.

Additional examples of device 16 can be used as well. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1×rtt, and Short Message Service (SMS) signals. In some examples, the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 32 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 33:
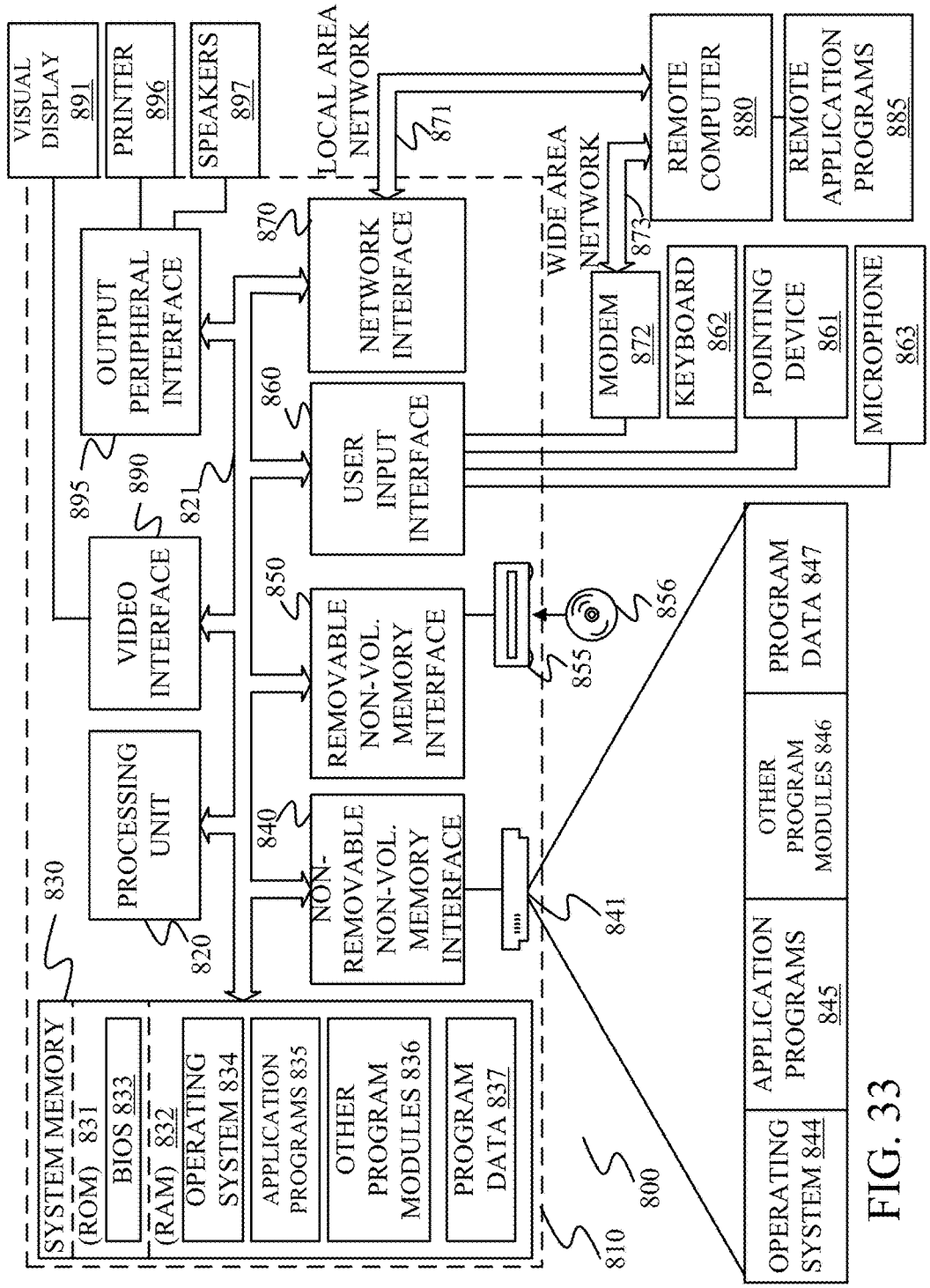
FIG. 33 is a block diagram of one example of a computing environment.

FIG. 33 is one example of a computing environment in which architecture 100, or parts of it, (for example) can be deployed. With reference to FIG. 33, an example system for implementing some embodiments includes a general-purpose computing device in the form of a computer 810. Components of computer 810 may include, but are not limited to, a processing unit 820 (which can comprise processors mentioned above), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 33.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 33 illustrates operating system 834, application programs 835, other program modules 836, and program data 837.

The computer 810 may also include other removable/non-removable volatile/nonvolatile computer storage media. By way of example only, FIG. 33 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 33, provide storage of computer readable instructions, data structures, program modules and other data for the computer 810. In FIG. 33, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 33 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 33 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a user interface component;
a data package configuration editing component that controls the user interface component to display an environment selection display with an environment selection user input mechanism and detects actuation of the environment selection user input mechanism to identify an environment from which data is to be pulled to generate a data package for incorporation into a solution package for deployment of a solution in the solution package;
a setup data extraction component that automatically extracts setup data from an instance of an application that is to be replaced by the solution to be deployed and controls the user interface component to display an editable representation of the setup data and receives user modification of the editable representation; and
a data extraction component that extracts data according to modified setup data in the editable representation.

Example 2 is the computing system of any or all previous examples wherein the setup data extraction component comprises:
an entity identifier component that identifies an entity in a selected process in the instance of the application.

Example 3 is the computing system of any or all previous examples wherein the entity identifier component identifies that entity by accessing hierarchical metadata for the selected process to identify a leading entity in the hierarchical metadata.

Example 4 is the computing system of any or all previous examples wherein the setup data extraction component comprises:
a hierarchy traversal component that traverses the hierarchical metadata for the process from the leading entity to leaf nodes in the hierarchy to identify a table hierarchy.

Example 5 is the computing system of any or all previous examples wherein the hierarchy traversal component traverses the hierarchical metadata by identifying table relationships in tables and traversing the table relationships.

Example 6 is the computing system of any or all previous examples wherein the setup data extraction component comprises:
a hierarchy graph generator that generates a hierarchical table graph of the tables identified during traversal of the hierarchical metadata.

Example 7 is the computing system of any or all previous examples wherein the hierarchy graph generator identifies each given table in the hierarchical table graph that are part of an entity in the process and replaces the given table with the corresponding entity to obtain a modified hierarchical table graph.

Example 8 is the computing system of any or all previous examples wherein the setup data extraction component generates the editable representation of the setup data from the modified hierarchical table graph.

Example 9 is the computing system of any or all previous examples wherein the hierarchy traversal component traverses the metadata hierarchical metadata for each process in the instance of the application.

Example 10 is the computing system of any or all previous examples wherein the hierarchy graph generator generates a hierarchical table graph for each process in the instance of the application.

Example 11 is the computing system of any or all previous examples wherein the hierarchy graph generator identifies a table type for each table in the modified hierarchical table graph.

Example 12 is a computer implemented method, comprising:
controlling a user interface component to display an environment selection display with an environment selection user input mechanism;
detecting actuation of the environment selection user input mechanism to identify an environment from which data is to be pulled to generate a data package for incorporation into a solution package for deployment of a solution in the solution package;
automatically extracting setup data from an instance of an application that is to be replaced by the solution to be deployed;
controlling the user interface component to display an editable representation of the setup data;
detecting user modification of the editable representation; and
automatically extracting data according to modified setup data in the editable representation.

Example 13 is the computer implemented method of any or all previous examples automatically extracting setup data comprises:
accessing hierarchical metadata for a selected process and the instance of the application; and
identifying a leading entity in the hierarchical metadata.

Example 14 is the computer implemented method of any or all previous examples wherein automatically extracting setup data comprises:
traversing the hierarchical metadata for the process from the leading entity to leaf nodes in the hierarchy to identify a table hierarchy by identifying table relationships in tables and traversing the table relationships.

Example 15 is the computer implemented method of any or all previous examples wherein extracting setup data comprises:
generating a hierarchical table graph of the tables identified during traversal of the hierarchical metadata.

Example 16 is the computer implemented method of any or all previous examples wherein generating a hierarchical table graph comprises:

identifying each given table in the hierarchical table graph that is part of an entity in the process; and replacing the given table with the corresponding entity to obtain a modified hierarchical table graph. of any or all previous examples claim 16 wherein generating the editable representation comprises:

generating the editable representation of the setup data from the modified hierarchical table graph.

Example 18 is a computing system, comprising:

a user interface component;

a data package configuration editing component that controls the user interface component to display an environment selection display with an environment selection user input mechanism and detects actuation of the environment selection user input mechanism to identify an environment from which data is to be pulled to generate a data package for incorporation into a solution package for deployment of a solution in the solution package;

an entity identifier component that identifies an entity in a selected process in an instance of an application that is to be replaced by the solution to be deployed by accessing hierarchical metadata for the selected process to identify a leading entity in the hierarchical metadata;

a hierarchy traversal component that traverses the hierarchical metadata for the process from the leading entity to leaf nodes in the hierarchy to identify a table hierarchy;

a hierarchy graph generator that generates a hierarchical table graph of the tables identified during traversal of the hierarchical metadata;

a setup data extraction component that controls the user interface component to display an editable representation of the hierarchical table graph and receives user modification of the editable representation; and a data extraction component that extracts data according to the modified setup data in the editable representation.

Example 19 is the computing system of any or all previous examples wherein the hierarchy traversal component traverses the hierarchical metadata by identifying table relationships in tables and traversing the table relationships.

Example 20 is the computing system of any or all previous examples wherein the hierarchy graph generator identifies each given table in the hierarchical table graph that are part of an entity in the process and replaces the given table with the corresponding entity to obtain a modified hierarchical table graph.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising: a processor; memory coupled to the processor and storing instructions that, when executed by the processor, provide a user interface component, a data package configuration editing component, a setup data extraction component, a data extraction component, and a deployment component; wherein the data package configuration editing component is configured to control the user interface component to display an environment selection display with an environment selection user input mechanism and to detect actuation of the environment selection user input mechanism to identify a source environment to generate a data package for incorporation into a solution package; wherein the setup data extraction component is configured to automatically extract setup data from an instance of an application that is to be replaced by the solution to be deployed and to control the user interface component to display an editable representation of the setup data and receive user modification of the editable representation; wherein the data extraction component is configured to automatically extract data according to modified setup data in the editable representation; and the deployment component being configured to: parse the solution package, detect the environment selection, obtain a base system related to the solution package and install the base system to the selected environment, join the base system to a domain of the selected environment, and compile at least some files of the solution package.

2. The computing system of claim 1 wherein the setup data extraction component comprises: an entity identifier component that identifies an entity in a selected process in the instance of the application.

3. The computing system of claim 2 wherein the entity identifier component identifies that entity by accessing hierarchical metadata for the selected process to identify a leading entity in the hierarchical metadata.

4. The computing system of claim 3 wherein the setup data extraction component comprises: a hierarchy traversal component that traverses the hierarchical metadata for the process from the leading entity to leaf nodes in the hierarchy to identify a table hierarchy.

5. The computing system of claim 4 wherein the hierarchy traversal component traverses the hierarchical metadata by identifying table relationships in tables and traversing the table relationships.

6. The computing system of claim 5 wherein the setup data extraction component comprises: a hierarchy graph generator that generates a hierarchical table graph of the tables identified during traversal of the hierarchical metadata.

7. The computing system of claim 6 wherein the hierarchy graph generator identifies each table in the hierarchical table graph that is part of an entity in the process and replaces the table with the corresponding entity to obtain a modified hierarchical table graph.

8. The computing system of claim 7 wherein the setup data extraction component generates the editable representation of the setup data from the modified hierarchical table graph.

9. The computing system of claim 4 wherein the hierarchy traversal component traverses the metadata hierarchical metadata for each process in the instance of the application.

10. The computing system of claim 9 wherein the hierarchy graph generator generates a hierarchical table graph for each process in the instance of the application.

11. The computing system of claim 8 wherein the hierarchy graph generator identifies a table type for each table in the modified hierarchical table graph.

12. A computer implemented method, comprising: controlling a user interface component to display an environment selection display with an environment selection user input mechanism: detecting actuation of the environment selection user input mechanism to identify an environment from which data is to be pulled to generate a data package for incorporation into a solution package for deployment of a solution in the solution package; automatically extracting setup data from an instance of an application that is to be replaced by the solution to be deployed; controlling the user interface component to display an editable representation of the setup data; detecting user modification of the editable representation; automatically extracting data according to modified setup data in the editable representation; and obtaining a base system, upon which the solution package was generated, and installing the base system to the environment; and compiling at least some files of the base system and the solution package to provide a deployed system in the environment.

13. The computer implemented method of claim 12 automatically extracting setup data comprises: accessing hierarchical metadata for a selected process and the instance of the application; and identifying a leading entity in the hierarchical metadata.

14. The computer implemented method of claim 13 wherein automatically extracting setup data comprises: traversing the hierarchical metadata for the process from the leading entity to leaf nodes in the hierarchy to identify a table hierarchy by identifying table relationships in tables and traversing the table relationships.

15. The computer implemented method of claim 14 wherein extracting setup data comprises: generating a hierarchical table graph of the tables identified during traversal of the hierarchical metadata.

16. The computer implemented method of claim 15 wherein generating a hierarchical table graph comprises: identifying each table in the hierarchical table graph that is part of an entity in the process; and replacing the each identified table with the corresponding entity to obtain a modified hierarchical table graph.

17. The computer implemented method of claim 16 wherein generating the editable representation comprises: generating the editable representation of the setup data from the modified hierarchical table graph.

18. A computing system, comprising: a processor: memory coupled to the processor and storing instructions that, when executed by the processor, provide a user interface component, a data package configuration editing component, an entity identifier component, a hierarchy traversal-6-component, a hierarchy graph generator, a setup data extraction component, a data extraction component, and a deployment component: the data package configuration editing component being configured to control the user interface component to display an environment selection display with an environment selection user input mechanism and detects actuation of the environment selection user input mechanism to identify an environment to generate a data package for incorporation into a solution package for deployment of a solution in the solution package; the entity identifier component being configured to identify an entity in a selected process in an instance of an application that is to be replaced by the solution by accessing hierarchical metadata for the selected process to identify a leading entity in the hierarchical metadata; the hierarchy traversal component being configured to traverse the hierarchical metadata for the process from the leading entity to leaf nodes in the hierarchy to identify a table hierarchy; the hierarchy graph generator being configured to generate a hierarchical table graph of the tables identified during traversal of the hierarchical metadata; the setup data extraction component being configured to control the user interface component to display an editable representation of the hierarchical table graph that represents the instance of the application that is to be replaced and receives user modification of the editable representation; the data extraction component being configured to automatically extract data according to the modified setup data in the editable representation; and the deployment component being configured to obtain a base system upon which the solution package was generated, join the base system to a domain of the environment, set up users of the deployed solution, install files, and compile at least some of the installed files to generate a deployed solution using the solution package.

19. The computing system of claim 18 wherein the hierarchy traversal component-7-traverses the hierarchical metadata by identifying table relationships in tables and traversing the table relationships.

20. The computer implemented method of claim 12, wherein obtaining a base system includes installing the entire base system to the environment.

* * * * *